US007954709B1

(12) United States Patent
Leon et al.

(10) Patent No.: US 7,954,709 B1
(45) Date of Patent: Jun. 7, 2011

(54) COMPUTER-BASED VALUE-BEARING ITEM CUSTOMIZATION SECURITY

(75) Inventors: J. P. Leon, Marina del Rey, CA (US); Richard Stables, Venice, CA (US); Daniel David Farino, Santa Monica, CA (US); Geoffrey Charles Begen, Lake Forest, CA (US)

(73) Assignee: Stamps.com Inc., Los Angeles, CA (US)

( * ) Notice: Subject to any disclaimer, the term of this patent is extended or adjusted under 35 U.S.C. 154(b) by 902 days.

(21) Appl. No.: 11/729,148

(22) Filed: Mar. 27, 2007

Related U.S. Application Data

(62) Division of application No. 10/994,768, filed on Nov. 22, 2004, now Pat. No. 7,243,842.

(60) Provisional application No. 60/591,433, filed on Jul. 27, 2004.

(51) Int. Cl.
*G06K 5/00* (2006.01)
*G06F 7/08* (2006.01)

(52) U.S. Cl. ........................................ 235/381; 235/382

(58) Field of Classification Search .................. 235/381, 235/382, 488, 375, 380
See application file for complete search history.

(56) References Cited

U.S. PATENT DOCUMENTS 4,831,554 A 5/1989 Storace et al.

(Continued)

FOREIGN PATENT DOCUMENTS

JP 2005132049 5/1993

(Continued)

OTHER PUBLICATIONS

McBride, et al.; Customized Computer-Based Value-Bearing Item Quality Assurance; U.S. Appl. No. 10/944,914, filed Nov. 22, 2004; pp. 1-6 and 85-93.

(Continued)

*Primary Examiner* — Thien M Le

(74) *Attorney, Agent, or Firm* — Khorsandi Patent Law Group, A Law Corporation; Marilyn R. Khorsandi

(57) ABSTRACT

The exemplary embodiment of the present invention will provide computer systems and methods for protecting the security of processing for customization of computer-based value-bearing items, such as, for example, securing processing of exemplary image-customized computer-based postage label 1 in an exemplary embodiment of the present invention, as depicted in FIG. 1. The exemplary embodiment of the present invention will further provide computer systems and methods for securing computer-based value-bearing items, such as, for example, securing image-customized computer-based postage label 1 as depicted in FIG. 1. With reference to FIG. 1, the exemplary customized computer-based postage label 1 will bear an image 2 that would be provided by a corresponding user, namely by the user that orders the customized computer-based postage label. The user may provide image 2 in an electronic form, such as by uploading a digital representation of image 2. In a variation of the exemplary embodiment, a user could alternatively provide a hardcopy image. The exemplary customized computer-based postage label 1 will bear a human-readable indication of the country 4 for which the postage is approved. The exemplary customized computer-based postage label 1 will also bear a human-readable indication of an amount of postage 5. The exemplary customized computer-based postage label 1 will also bear a human-readable identifier (such as a serial number) 6 that will uniquely identify the particular customized computer-based postage label. The exemplary customized computer-based postage label 1 will also bear a machine-readable set of information 7.

8 Claims, 32 Drawing Sheets

U.S. PATENT DOCUMENTS 4,831,555 A 5/1989 Sansone et al.
4,872,706 A 10/1989 Brewen et al.
5,360,628 A 11/1994 Butland
5,410,642 A 4/1995 Hakamatsuka et al.
5,423,573 A 6/1995 De Passille
5,425,586 A 6/1995 Berson et al.
5,449,200 A 9/1995 Andric et al.
5,471,925 A 12/1995 Heinrich et al.
5,494,445 A 2/1996 Sekiguchi
5,510,992 A 4/1996 Kara
5,524,995 A 6/1996 Brookner et al.
5,554,842 A * 9/1996 Connell et al. ................ 235/491
5,612,889 A 3/1997 Pintsov et al.
5,617,519 A 4/1997 Herbert
5,651,238 A 7/1997 Belec et al.
5,666,215 A 9/1997 Fredlund et al.
5,682,318 A 10/1997 Kara
5,717,597 A 2/1998 Kara
5,717,980 A 2/1998 Oka et al.
5,737,729 A 4/1998 Denman
5,801,944 A 9/1998 Kara
5,812,991 A * 9/1998 Kara ............................ 705/410
5,819,240 A 10/1998 Kara
5,923,406 A 7/1999 Brasington et al.
5,932,139 A 8/1999 Oshima
5,936,865 A 8/1999 Pintsov et al.
5,995,985 A 11/1999 Cai
6,005,945 A 12/1999 Whitehouse
6,033,751 A 3/2000 Kline
6,175,826 B1 1/2001 Malandra et al. ............. 705/410
6,181,433 B1 1/2001 Hayama et al.
6,208,980 B1 3/2001 Kara
6,234,694 B1 5/2001 Brookner
6,249,777 B1 6/2001 Kara
6,296,404 B1 10/2001 Pierce et al.
6,311,240 B1 10/2001 Boone et al.
6,322,192 B1 11/2001 Walker
6,385,504 B1 5/2002 Pintsov et al.
6,415,983 B1 7/2002 Ulvr et al.
6,427,021 B1 7/2002 Fischer et al.
6,438,530 B1 8/2002 Heiden et al.
6,461,063 B1 10/2002 Miller
6,505,179 B1 1/2003 Kara
6,505,980 B1 1/2003 Allday
6,523,014 B1 2/2003 Pauschinger .................. 705/410
6,526,391 B1 2/2003 Cordery et al. ................. 705/60
6,594,374 B1 7/2003 Beckstrom et al.
6,595,412 B2 7/2003 Manduley ..................... 235/375
6,655,579 B1 12/2003 Delman et al.
6,671,813 B2 12/2003 Ananda
6,692,031 B2 2/2004 McGrew et al.
6,697,822 B1 2/2004 Armatis et al.
6,701,304 B2 * 3/2004 Leon ............................ 705/401
6,722,563 B1 4/2004 Johnson et al.
6,735,575 B1 5/2004 Kara
6,820,201 B1 11/2004 Lincoln et al.
6,834,112 B1 * 12/2004 Brickell ........................ 380/279
6,834,273 B1 12/2004 Sansone et al.
6,868,406 B1 3/2005 Ogg et al.
6,904,168 B1 6/2005 Steinberg et al.
6,946,960 B2 * 9/2005 Sisson et al. .................. 340/540
7,069,253 B2 6/2006 Leon
7,085,725 B1 8/2006 Leon
7,117,363 B2 10/2006 Lincoln et al.
7,127,434 B2 10/2006 Burningham
7,149,726 B1 12/2006 Lingle et al.
7,162,460 B2 1/2007 Cleckler et al.
7,191,158 B2 3/2007 Ogg et al.
7,194,957 B1 3/2007 Leon et al.
7,201,305 B1 4/2007 Correa
7,222,236 B1 * 5/2007 Pagel ........................... 713/176
7,234,645 B2 * 6/2007 Silverbrook et al. ......... 235/494
7,243,842 B1 7/2007 Leon et al.
7,266,531 B2 9/2007 Pintsov et al.
7,305,556 B2 * 12/2007 Slick et al. .................... 713/169
7,396,048 B2 7/2008 Janetzke et al.
7,418,599 B2 * 8/2008 Peters .......................... 713/193
7,509,291 B2 3/2009 McBride et al.
7,577,618 B2 8/2009 Raju
7,828,223 B1 11/2010 Leon
7,831,518 B2 11/2010 Montgomery et al.
2001/0042052 A1 11/2001 Leon ............................ 705/401
2001/0054153 A1 12/2001 Wheeler et al.
2002/0023057 A1 2/2002 Goodwin et al.
2002/0033598 A1 3/2002 Beasley
2002/0046195 A1 4/2002 Martin et al. ................. 705/401
2002/0073039 A1 6/2002 Ogg et al.
2002/0083020 A1 6/2002 Leon ............................ 705/401
2002/0083021 A1 6/2002 Ryan, Jr. et al.
2002/0149195 A1 10/2002 Beasley
2002/0190117 A1 12/2002 Manduley ..................... 235/375
2003/0002709 A1 1/2003 Wu
2003/0030270 A1 2/2003 Franko et al.
2003/0037008 A1 2/2003 Raju et al.
2003/0059635 A1 3/2003 Naasani
2003/0078893 A1 4/2003 Shah et al.
2003/0088426 A1 5/2003 Benson et al.
2003/0101143 A1 5/2003 Montgomery et al.
2003/0101147 A1 5/2003 Montgomery et al.
2003/0101148 A1 5/2003 Montgomery et al.
2003/0140017 A1 7/2003 Patton et al.
2003/0144972 A1 7/2003 Cordery et al. ............... 705/401
2004/0070194 A1 4/2004 Janetzke et al.
2004/0174012 A1 9/2004 Hagen
2004/0200902 A1 10/2004 Ishioroshi
2004/0215523 A1 10/2004 Wulff et al.
2004/0220935 A1 11/2004 McGraw et al. ................ 707/10
2004/0236938 A1 11/2004 Callaghan ..................... 713/150
2004/0241424 A1 12/2004 Barbera-Guillem
2004/0254898 A1 12/2004 Parker et al.
2005/0065897 A1 3/2005 Ryan, Jr. et al.
2005/0071296 A1 3/2005 Lepkofker
2005/0071297 A1 3/2005 Kara
2005/0080751 A1 4/2005 Burningham
2005/0082818 A1 4/2005 Mertens
2005/0114276 A1 5/2005 Hunter et al.
2005/0195214 A1 9/2005 Reid et al.
2006/0116971 A1 6/2006 Beckstrom et al.
2006/0136347 A1 6/2006 Reichelsheimer et al.
2006/0173796 A1 8/2006 Kara
2006/0287096 A1 12/2006 O'Kelley et al. ................ 463/42
2007/0005518 A1 1/2007 Beckstrom et al.
2007/0011995 A1 1/2007 Weaver et al.
2007/0017985 A1 1/2007 Lapstun et al.
2007/0100672 A1 5/2007 McBride et al.
2007/0198441 A1 8/2007 Kara
2007/0255664 A1 11/2007 Blumberg et al.
2009/0125561 A1 5/2009 Garcia

FOREIGN PATENT DOCUMENTS

JP 2005215905 8/2005
WO 9519016 7/1995

OTHER PUBLICATIONS

Huebner, et al.; Printing of Customized Computer-Based Value-Bearing Items; U.S. Appl. No. 10/994,728, filed Nov. 22, 2004; pp. 1-4 and 82-86.

Leon, et al.; Image-Customized of Computer-Based Value-Bearing Items; U.S. Appl. No. 10/944,698, filed Nov. 22, 2004; pp. 1-5 and 84-90.

Clem, et al.; Quality Assurance of Image-Customization of Computer-Based Value-Bearing Items; U.S. Appl. No. 11/114,964, filed Apr. 25, 2005; pp. 1-84, Figs. 1-30; Throughout.

Canada Post Corporation; "Collecting—Picture Postage", 3 pages, © 2004, http://www.canadapost.ca/personal/collecting/default-e.asp?stamp=postage.

Personal Postage Corporation; "Personal Postage", 1 page, Undated http://www.personalpostage.com, Printed Jul. 20, 2004.

Personal Postage Corporation; "Personal Postage", 2 pages, Undated, http://www.personalpostage.com/home.htm, printed Jul. 20, 2004.

Canada Post International, LLC; "Personal Postage", 2 pages, Undated http://www.personalpostage.com/Canada%20Post.htm, printed Jul. 20, 2004.

Personal Postage Corporation; "Quick Reference Guide"; 8 pages; Undated http://www.personalpostage.com/Om_page1.htm, page2.htm, page3.htm, page4.htm, printed Jul. 20, 2004.
Avery Dennison Corporation; "Avery Creative Postage Labels", 4 pages, http://www.creativepostagelabels.avery.com/postage_aap.html; © 1996-2004.
Avery Dennison Corporation; "Avery Creative Postage Labels", 2 pages, http://www.creativepostagelabels.avery.com/order.php; © 1996-2004.
Canadian Post; picture stamp sample, undated prior to Jul. 27, 2004, 1 page.
Canadian Post; Set of pictures and address labels; sample undated, prior to Jul. 27, 2004, 1 page.
"It's in the mail: a personalized postcode for life", an article about Royal Mail picture stamps, date unknown (prior to Jul. 27, 2004), publication unknown, 1 page.
Australian Post sample; Jul. 7-16, 2000; Anaheim, CA, 1 page.
Office Action for U.S. Appl. No. 10/991,241, dated Dec. 31, 2007, 15 pages, USPTO.
Office Action for U.S. Appl. No. 10/991,241, dated Jul. 7, 2008, 13 pages, USPTO.
Examiner's Answer for U.S. Appl. No. 10/991,241, dated Feb. 19, 2009, 14 pages, USPTO.
Administrative Judge Anton W. Fetting, Board of Patent Appeals and Interferences, Appeal Decision for U.S. Appl. No. 10/991,241, dated Apr. 20, 2010, 9 pages, USPTO.
Notice of Abandonment for U.S. Appl. No. 10/991,241, dated Jun. 30, 2010, 2 pages, USPTO.
Notice of Allowance for U.S. Appl. No. 11/435,453, dated Aug. 5, 2010, 23 pages, USPTO.
Office Action for U.S. Appl. No. 10/994,914 dated Jul. 21, 2010, 38 pages, USPTO.
Menezes, A.J., et al., "Handbook of Applied Cryptography", CRC Press LLC, 1997, Excerpt—cover page and pages 512-515, 6 pages.
"What's selling: from bricks and mortar to bricks and clicks," Playthings Magazine, Feb. 1, 2003, 3 pages.
Porter, William, "Personal Postage Candians take to vanity stamps in a very big way," Denver Post, Jul. 9, 2000, 2 pages.
"Picture It Postage by Endicia," http://www.pictureitpostage.com/PhotoEditor/EditImage.cfm, Endicia, printed on Nov. 17, 2006, 1 page.
"Zazzle Custom Stamps for Business; Zazzle.com Pitney Bowes," http://www.zazzle.com/stamps/design.asp, Pitney Bowes, printed on Nov. 16, 2006, 2 pages.
"Information-Based Indicia Program (IBIP) Performance Criteria for Information-Based Indicia and Security Architecture for Closed IBI Postage Metering systems (PCIBI-C)," United States Postal Service, Published Jan. 12, 1999. 49 pages.
Jay Bigalke, "Small business personalized stamps," publication date unknown, undated, article show stamp label bearing a date of Jan. 14, 2006, 1 page.
Pitney Bowes, "Create personal postage—Custom postage Stamp Expressions Printer, How the Stamp Expression Printer Works," http://www.stampexpressions.com/how_it_works.cfm, undated, printed Nov. 11, 2009, 2 pages.
Kenneth Thomas McBride, et al., "Image-Customized Labels Adapted for Bearing Computer-Based, Generic Value-Bearing Items, and Systems and Methods for Providing Image-Customized Labels," U.S. Appl. 11/475,298, filed Jun. 26, 2006, 51 pages (specification, pp. 1-37; claims, pp. 38-41; abstract, p. 42; and drawings, pp. 43-51).
John Roland Clem, "Rolls of Image-Customized Value-Bearing Items and Systems and Methods for Providing Rolls of Image-Customized Value-Bearing Items," U.S. Appl. No. 11/435,453, filed May 15, 2006, 62 pages (specification, pp. 1-46; claims, pp. 47-51; abstract, p. 52; and drawings, pp. 53-62).
JP Leon, "Systems and Methods for Creating and Providing Shape-Customized, Computer-Based, Value-Bearing Items," U.S. Appl. No. 11/644,458, filed Dec. 20, 2006, 74 pages (specification, pp. 1-44; claims, pp. 45-52; abstract, p. 53; and drawings, pp. 54-74).
Office Action for U.S. Appl. No. 10/991,241, dated Jul. 12, 2007, 16 pages, USPTO.
JP Leon, et al., "Computer-Based, Value-Bearing Item Customization Security," U.S. Appl. No. 11/729,239, filed Mar. 28, 2007, 136 pages (preliminary amendment, pp. 1-8, specification, pp. 9-92; claims, pp. 93-100; abstract, p. 101; and drawings, pp. 102-136).
JP Leon, "Mail Piece Processing," U.S. Appl. No. 12/316,542, filed Dec. 8, 2008, 72 pages (specification, pp. 1-49; claims, 50-57; abstract, p. 58; and drawings, p. 59-72).
John Roland Clem, "Automatic Guarantee Delivery Tracking and Reporting for United States Postal Service Postage Refunds for Paid Computer-Based Postage," U.S. Appl. No. 12/500,970, filed Jul. 10, 2009, 67 pages (specifications, pp. 1-39; claims, 40-48; abstract, p. 49; and drawings, p. 50-67).
Notice of Allowance for U.S. Appl. No. 10/197,044, dated Nov. 24, 2008, 10 pages, USPTO.
Office Action for U.S. Appl. No. 10/994,914, dated Apr. 17, 2008, 22 pages, USPTO.
Office Action for U.S. Appl. No. 10/994,914, dated Dec. 10, 2008, 28 pages, USPTO.
Office Action for U.S. Appl. No. 10/994,914, dated Aug. 26, 2009, 35 pages, USPTO.
Office Action for U.S. Appl. No. 10/994,914, dated Mar. 15, 2010, 31 pages, USPTO.
Office Action for U.S. Appl. No. 10/994,728, dated May 29, 2008, 18 pages, USPTO.
Office Action for U.S. Appl. No. 10/994,728, dated Jan. 26, 2009, 16 pages, USPTO.
Office Action for U.S. Appl. No. 10/994,728, dated Aug. 19, 2009, 14 pages, USPTO.
Office Action for U.S. Appl. No. 10/994,728, dated Mar. 16, 2010, 14 pages, USPTO.
Office Action for U.S. Appl. No. 10/994,698, dated Aug. 19, 2008, 19 pages, USPTO.
Office Action for U.S. Appl. No. 10/994,698, dated Mar. 4, 2009, 16 pages, USPTO.
Office Action for U.S. Appl. No. 10/994,698, dated Aug. 3, 2009, 14 pages, USPTO.
Office Action for U.S. Appl. No. 10/994,698, dated May 11, 2010, 22 pages, USPTO.
Notice of Allowance for U.S. Appl. No. 10/994,768, dated Jan. 5, 2007, 8 pages, USPTO.
Office Action for U.S. Appl. No. 11/114,964, dated Nov. 26, 2008, 15 pages, USPTO.
Office Action for U.S. Appl. No. 11/114,964, dated Jun. 23, 2009, 14 pages, USPTO.
Office Action for U.S. Appl. No. 11/114,964, dated Dec. 23, 2009, 21 pages, USPTO.
Office Action for U.S. Appl. No. 11/114,964, dated Jun. 30, 2010, 27 pages, USPTO.
Office Action for U.S. Appl. No. 11/475,298, dated Jan. 21, 2009, 14 pages, USPTO.
Office Action for U.S. Appl. No. 11/475,298, dated Sep. 15, 2009, 22 pages, USPTO.
Office Action for U.S. Appl. No. 11/435,453, dated Aug. 11, 2009, 10 pages, USPTO.
Office Action for U.S. Appl. No. 11/435,453, dated Apr. 22, 2010, 10 pages, USPTO.
Office Action for U.S. Appl. No. 11/644,458, dated Apr. 16, 2009, 16 pages, USPTO.
Office Action for U.S. Appl. No. 11/644,458, dated Dec. 4, 2009, 17 pages, USPTO.
Office Action for U.S. Appl. No. 11/644,458, dated May 7, 2010, 99 pages, USPTO.
Office Action for U.S. Appl. No. 11/635,871, dated Jun. 19, 2007, 5 pages, USPTO.
Office Action for U.S. Appl. No. 11/635,871, dated Dec. 12, 2007, 6 pages, USPTO.
Office Action for U.S. Appl. No. 11/635,871, dated Jul. 15, 2008, 10 pages, USPTO.
Notice of Allowance for U.S. Appl. No. 11/635,871, dated Nov. 17, 2008, 12 pages, USPTO.
Office Action for U.S. Appl. No. 11/729,239, dated Dec. 9, 2009, 7 pages, USPTO.
Notice of Allowance for U.S. Appl. No. 11/729,239, dated Jun. 24, 2010, 21 pages, USPTO.

Office Action for U.S. Appl. No. 10/991,241, dated Jul. 19, 2005, 16 pages, USPTO.
Office Action for U.S. Appl. No. 10/991,241, dated Jan. 31, 2006, 13 pages, USPTO.
Office Action for U.S. Appl. No. 10/991,241, dated Oct. 31, 2006, 14 pages, USPTO.
JP Leon, "Systems And Methods For Facilitating Replacement Of Computer-Based Value-Bearing Items," U.S. Appl. No. 12/316,240, filed Dec. 9, 2008, pp. 1-155 (including specification pp. 1-104, claims pp. 105-115, abstract p. 116 and drawings pp. 117-155).
John Roland Clem, "Rolls of Image-Customized Value-Bearing Items and Systems and Methods for Providing Rolls of Image-Customized Value-Bearing Items," U.S. Appl. No. 12/943,519, filed Nov. 10, 2010, pp. 1-70 (including preliminary amendment pp. 1-8, specification pp. 9-54, claims pp. 55-59, abstract p. 60 and drawings pp. 61-70).
Interview Summary for U.S. Appl. No. 11/644,458, dated Sep. 2, 2010, pp. 1-7.
Office Action for U.S. Appl. No. 11/644,458, dated Nov. 4, 2010, pp. 1-42.
Bruce Brown, Internet Postage Services, PC Magazine, dated Jun. 6, 2000, p. 133, Ziff-Davis Publishing Company, 3 pages.
Notice of Allowance for U.S. Appl. No. 10/994,698, dated Dec. 2, 2010, 41 pages.
J.P. Leon, et al.; "Image-Customization of Computer-Based Value-Bearing Items"; U.S. Appl. No. 13/038,029, filed Mar. 1, 2011 (including Specification pp. 1-90, Drawing pp. 91-122 and Preliminary Amendment pp. 123-131).
Notice of Allowance for U.S. Appl. No. 11/114,964, dated Feb. 3, 2011, pp. 1-31.
Office Action for U.S. Appl. No. 12/943,519, dated Feb. 23, 2011, pp. 1-40.
J.P. Leon, et al.; "Computer-Based Value-Bearing Item Customization Security"; U.S. Appl. No. 13/081,356, filed Apr. 6, 2011 (including Specification pp. 1-93, Drawing pp. 94-125 and Preliminary Amendment pp. 126-135).

* cited by examiner

FIG. 1
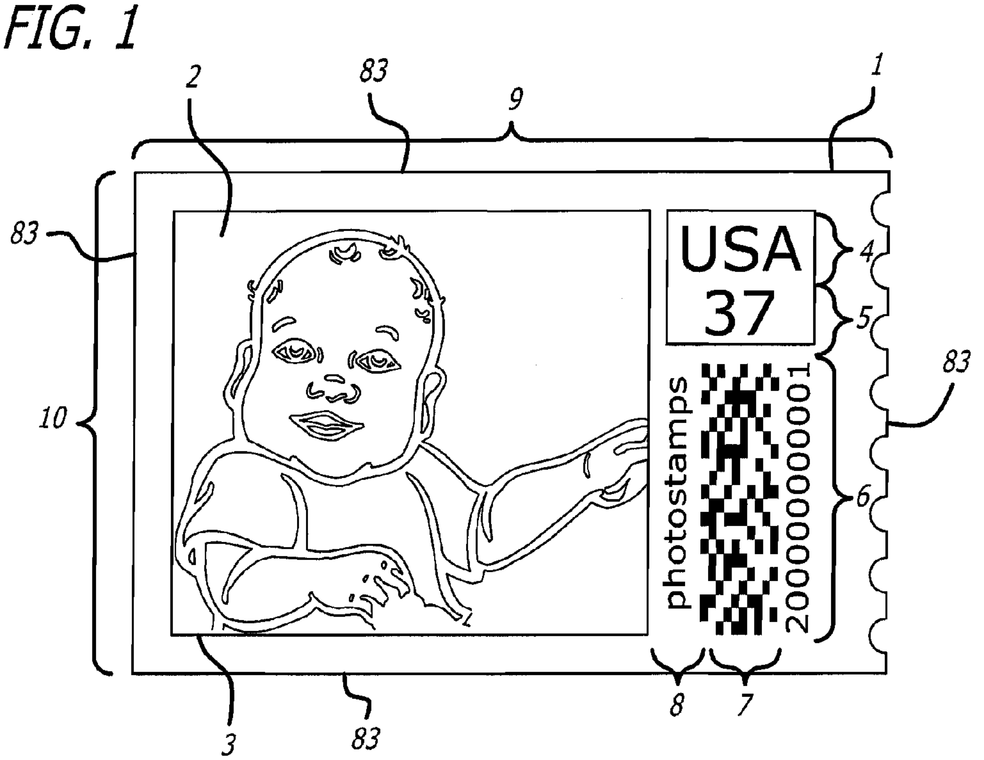
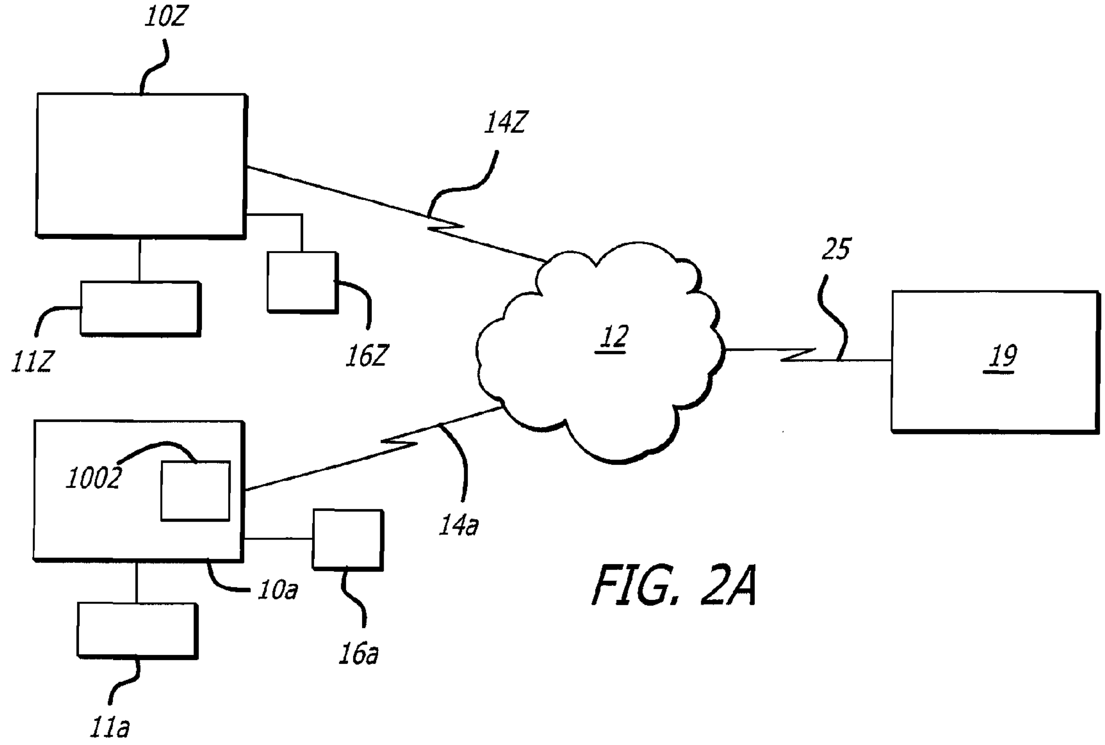
FIG. 2A

Indicia Content Description

Indicia Content

IBI Version 06062S
MATS Model ID N/A
PSD IBM 4758 Host

| Field Order in Indicia | Field Length Bytes | Fixed Value | Format | Description | |
|---|---|---|---|---|---|
| 1 | 1 | 06 | Binary | Indicia Version | 441 |
| 2 | 2 | | Binary | Software ID | 442 |
| 3 | 3 | | Binary | Postage Value | 443 |
| 4 | 2 | 06 | Text | IBI Vendor | 444 |
| 5 | 2 | 2S | Binary | Model ID | 445 |
| 6 | 8 | | Binary | Indicia ID Number | 446 |
| 7 | 2 | | Binary | Encoder values | 447 |

Total Bytes=20

| | 3300 | 3302 | |
|---|---|---|---|
| | **Count** | **Description** | |
| 3304 | 16 | Pending image QA (QA1) | 3306 |
| 3308 | 5988 | Failed image QA (QA1) | 3310 |
| 3312 | 0 | IMAGES-Pending normal QA1 | 3314 |
| 3316 | 22 | IMAGES-Pending manager QA1 | 3318 |
| 3320 | 75488 | IMAGES-Passed QA1 | 3322 |
| 3324 | 7819 | IMAGES-Failed QA1 | 3326 |
| 3328 | 216 | Pending PDF Generation | 3330 |
| 3332 | 7 | Pending download/printing | 3334 |
| 3336 | 1425 | Pending post-print QA (QA2) | 3338 |
| 3340 | 49756 | Passed post-print QA (QA2) | 3342 |
| 3344 | 70 | Failed post-print QA (QA2) | 3346 |

FIG. 27

FIG. 29

Date: Thu, 7 Oct 2004 01:12:58 UT
From: photo@stamps.com
To: JohnDoe@xxxxx.com 3401
Subject: Important information about your PhotoStamps Order
X-Mailer: MIME: :Lite 3.01 (F2.72; B2.21; Q2.21)

This is a multi-part message in MIME format.

--_----------_1097111578246971
Content-Disposition: inline
Content:-Length: 1036
Content-Transfer-Encoding: binary
Content-Type: text/plain Dear John, 3402

Thank you for your order.

Unfortunately, we are currently unable to accept the following image(s) you have submitted. Thumbnails of the rejected image(s) are attached to this e-mail.

As such we have canceled your entire order (number 99999) and will not charge your credit card for any portion of it.

PhotoStamps will NEVER accept anything that is objectionable (e.g.- sexually explicit, obscene, violent, etc.) or controversial (e.g.- political, etc.) in any way.

For more information, please refer to the Terms and Conditions found on our web site (http://photo.stamps.com/conditions/).

Remember, you must own the rights to the photograph, image, graphic, or logo that you submit and if it is unclear to us that this is the case, we cannot accept your image. Also, if we think your submission will result in a low quality PhotoStamps product (e.g. the image is too dark), we may choose not process the order.

We apologize for any inconvenience we may have caused you.

Regards,

The PhotoStamps Team

COMPUTER-BASED VALUE-BEARING ITEM CUSTOMIZATION SECURITY

CROSS REFERENCE TO RELATED APPLICATIONS

This is a divisional application of, and this application claims priority to, U.S. application Ser. No. 10/994,768, which was filed on Nov. 22, 2004 now U.S. Pat. No. 7,243,842, and which claims priority to U.S. Provisional Patent Application Ser. No. 60/591,433, titled "COMPUTER-BASED VALUE-BEARING ITEM CUSTOMIZATION SECURITY", filed on Jul. 27, 2004, the entire disclosure of which is incorporated herein in full by reference as if stated in full herein.

FIELD OF THE INVENTION

The field of the present invention is computer-based value-bearing items, and particularly, image-customized computer-based value-bearing items such as, for example, image-customized, computer-based postage-indicia-bearing items.

SUMMARY OF THE INVENTION

The exemplary embodiment of the present invention will provide computer systems and methods for protecting the security of processing for customization of computer-based value-bearing items, such as, for example, securing processing of exemplary image-customized computer-based postage label 1 in an exemplary embodiment of the present invention, as depicted in FIG. 1. The exemplary embodiment of the present invention will further provide computer systems and methods for securing computer-based value-bearing items, such as, for example, securing image-customized computer-based postage label 1 as depicted in FIG. 1.

An exemplary computer system that would be provided by the exemplary embodiment of the present invention for securing computer-based value-bearing items, would be programmed to: encrypt each computer-based value-bearing item, wherein each computer-based value-bearing item comprises at least one image uploaded to the computer system according to a respective user-provided instruction; save each encrypted computer-based value-bearing item to a computer-readable medium; generate a symmetric key and a private key; encrypt the symmetric key; and save the encrypted symmetric key to the computer-readable medium.

The exemplary computer system for securing computer-based value-bearing items, would be further programmed to generate the symmetric key using a random generator, wherein the computer-based value-bearing item comprises a computer-based postage-indicia-bearing item.

Another aspect of the exemplary computer system for securing computer-based value-bearing items, would be that the exemplary computer system would be programmed to: encrypt an image file, wherein the image file comprises at least one image of a computer-based value-bearing item; save the encrypted image file on a computer-readable medium; generate a public key and a private key; using the public key, encrypt a file decryption key for decrypting the encrypted image file; save the encrypted file decryption key on the computer-readable medium; using the private key, decrypt the encrypted file decryption key; and decrypt the encrypted image file using the decrypted file decryption key.

Yet another aspect of the exemplary computer system for securing computer-based value-bearing items, would be that the exemplary computer system would be programmed to:

encrypt an image file corresponding to a user order; save the encrypted image file to a computer-readable storage medium; encrypt a key, wherein said key is a decryption key for decrypting the encrypted image file; save the encrypted decryption key to the computer-readable storage medium; decrypt the encrypted decryption key; and decrypt the encrypted image file using the decrypted decryption key.

The exemplary embodiment of the present invention would further provide an exemplary computer system for generating a representation of a customized computer-based value-bearing item that would comprise: a first server computer that is programmed to generate client requests to a value-bearing item indicia server computer, wherein the value-bearing item indicia server computer is programmed to generate a first set of computer-based value-bearing item indicia data for each client request generated by the first server computer.

In the exemplary computer system for generating a representation of a customized computer-based value-bearing item, the value-bearing item indicia server computer would be further programmed to: generate a second set of computer-based value-bearing item indicia data for each client request; and save a record of a relationship between the first set of computer-based value-bearing item indicia data and the second set of computer-based value-bearing item indicia data. In the exemplary computer system for generating a representation of a customized computer-based value-bearing item, the value-bearing item is a postage-indicia-bearing item.

In an alternative embodiment of the computer system for generating a representation of a customized computer-based value-bearing item, the first server computer, as compared to the value-bearing item indicia server computer, would be further programmed to: generate a second set of computer-based value-bearing item indicia data for each client request; and save a record of a relationship between the first set of computer-based value-bearing item indicia data and the second set of computer-based value-bearing item indicia data.

A first exemplary method that would be provided by the exemplary embodiment of the present invention would be for producing computer-based value-bearing items, and would comprise: applying a fluorescent ink in a pre-determined pattern on a label, wherein said label is adapted for bearing a computer-based value-bearing item and wherein the fluorescent ink has a fluorescence frequency ranging from 600 nm to 620 nm. In the first exemplary method for producing computer-based value-bearing items, the label could comprise an item of label stock or a sheet of paper. In the first exemplary method for producing computer-based value-bearing items, the fluorescent ink can be applied on a label: 1.) that already bears a computer-based value-bearing item; or 2.) before a computer-based value-bearing item is applied to the label; or 3.) during a printing of a computer-based value-bearing item on the label.

A second exemplary method that would be provided by the exemplary embodiment of the present invention would be for producing computer-based value-bearing items, and would comprise: applying a fluorescent ink in a pre-determined pattern on a computer-based value-bearing item, wherein the computer-based value-bearing item comprises a perimeter, and wherein the application of the fluorescent ink in the pre-determined pattern is characterized by a pre-determined position relative to a particular location on the perimeter of the computer-based value-bearing item, wherein the pre-determined pattern is characterized by a pre-determined application density of the fluorescent ink, wherein the fluorescent ink is red fluorescent, wherein the fluorescent ink has a fluorescence frequency ranging from 600 nm to 620 nm, wherein the value-bearing item comprises a postage-indicia-bearing item, wherein the pre-determined pattern comprises a representation of an identifier, and wherein the pre-determined pattern comprises a representation of a unique serial number.

In the second exemplary method for producing computer-based value-bearing items, the computer-based value-bearing item would be located on a sheet of a plurality of computer-based value-bearing items, and the fluorescent ink would be applied in a pre-determined pattern on each computer-based value-bearing item on the sheet of computer-based value-bearing items.

A third exemplary method that would be provided by the exemplary embodiment of the present invention would use a programmable ink applicator for producing computer-based postage-indicia-bearing items, and would comprise programming the programmable ink applicator to apply a fluorescent ink in a pre-determined pattern on each computer-based postage-indicia-bearing item on a sheet of a plurality of computer-based postage-indicia-bearing item. In the third exemplary method, each computer-based postage-indicia-bearing item comprises a perimeter and wherein the applying of the fluorescent ink in the pre-determined pattern is characterized by a pre-determined position relative to a particular location on the perimeter of each computer-based postage-indicia-bearing item. In the third exemplary method, the pre-determined pattern is characterized by a pre-determined application density of fluorescent ink.

The exemplary embodiment of the present invention would further provide an exemplary computer system for generating a representation of an image-customized computer-based value-bearing item; that system would comprise: a first set of computer program instructions, that when executed by a first computer, cause the first computer to generate a client request for generic value-bearing item indicia data; a second set of computer program instructions, that when executed by a second computer, cause the computer to receive the client request for generic value-bearing item indicia data, and generate a set of generic computer-based value-bearing item indicia data, wherein said set of generic computer-based value-bearing item indicia data comprises a digital signature; a third set of computer program instructions, that when executed by the first computer, cause the first computer to receive the set of generic computer-based value-bearing item indicia data; a fourth set of computer program instructions, that when executed by the first computer, cause the first computer to generate a set of image-customized computer-based value-bearing item indicia data for an image-customized value-bearing item, wherein said set of image-customized computer-based value-bearing item indicia data is generated using a subset of the set of generic computer-based value-bearing item indicia data; and a fifth set of computer program instructions, that when executed by the first computer, cause the first computer to record a mapping of the set of image-customized computer-based value-bearing item indicia data for the customized value-bearing item, to the generic computer-based value-bearing item indicia.

In the exemplary computer system for generating a representation of an image-customized computer-based value-bearing item, the first computer and the second computer would comprise the same computer. However, in an alternative embodiment, the first computer and the second computer would be different computers.

In the exemplary computer system for generating a representation of an image-customized computer-based value-bearing item, the image-customized value-bearing item comprises an image-customized postage-indicia-bearing item.

A fourth exemplary method that would be provided by the exemplary embodiment of the present invention would be for customizing value-bearing items, and would comprise: generating a customized value-bearing item comprising a set of customized value-bearing item indicia, wherein said set of customized value-bearing item indicia corresponds to a set of set of customized value-bearing item indicia data, and wherein said set of customized value-bearing item indicia data is derived from a corresponding set of digitally-signed value-bearing indicia data.

In the fourth exemplary method, the set of customized value-bearing item indicia data does not include a digital signature.

In the fourth exemplary method, the method would further comprise: recording a relationship between the set of customized value-bearing item indicia data and the corresponding set of digitally-signed value-bearing indicia data.

A fifth exemplary method that would be provided by the exemplary embodiment of the present invention would be for authenticating computer-based value-bearing items, and would comprise: comparing information about fluorescent ink detectable on a test value-bearing item identified by an identifier, to information about fluorescent ink applied to an authentic value-bearing item corresponding to the identifier, wherein the fluorescent ink on the test value-bearing item is detected using a machine for detecting fluorescent ink; wherein the information about fluorescent ink applied to the authentic value-bearing item is retrieved from a computer-readable device according to the identifier on the test value-bearing item.

The fifth exemplary method would further comprise: reporting as a counterfeit, the test value-bearing item for which the information about fluorescent ink applied to the authentic value-bearing item corresponding to the identifier does not match the information about fluorescent ink detectable on the test value-bearing item; and/or reporting as authentic, the test value-bearing item for which the information about fluorescent ink applied to the authentic value-bearing item corresponding to the identifier matches the information about fluorescent ink detectable on the test value-bearing item.

BRIEF DESCRIPTION OF THE DRAWINGS

These and other features, aspects, and advantages of the present invention will become better understood with regard to the following description, appended claims, and accompanying drawings in which:

FIG. 1 is a plan view of an exemplary customized computer-based postage label in an exemplary embodiment of the present invention;

FIG. 2A is a block diagram depicting an exemplary client/Internet environment in an exemplary Internet postage system embodiment of the present invention;

FIG. 27 is a graphic representation depicting a screen shot of a pre-print image quality assurance manager queue summary screen in an alternative exemplary quality assurance processing embodiment of the present invention;

FIG. 29 is a graphic representation depicting an electronic mail ("email") message, in an alternative exemplary quality assurance processing embodiment of the present invention, to a user, notifying the user that one or more images in the user's order were rejected due to quality assurance reasons.

DETAILED DESCRIPTION

Figure 2B:
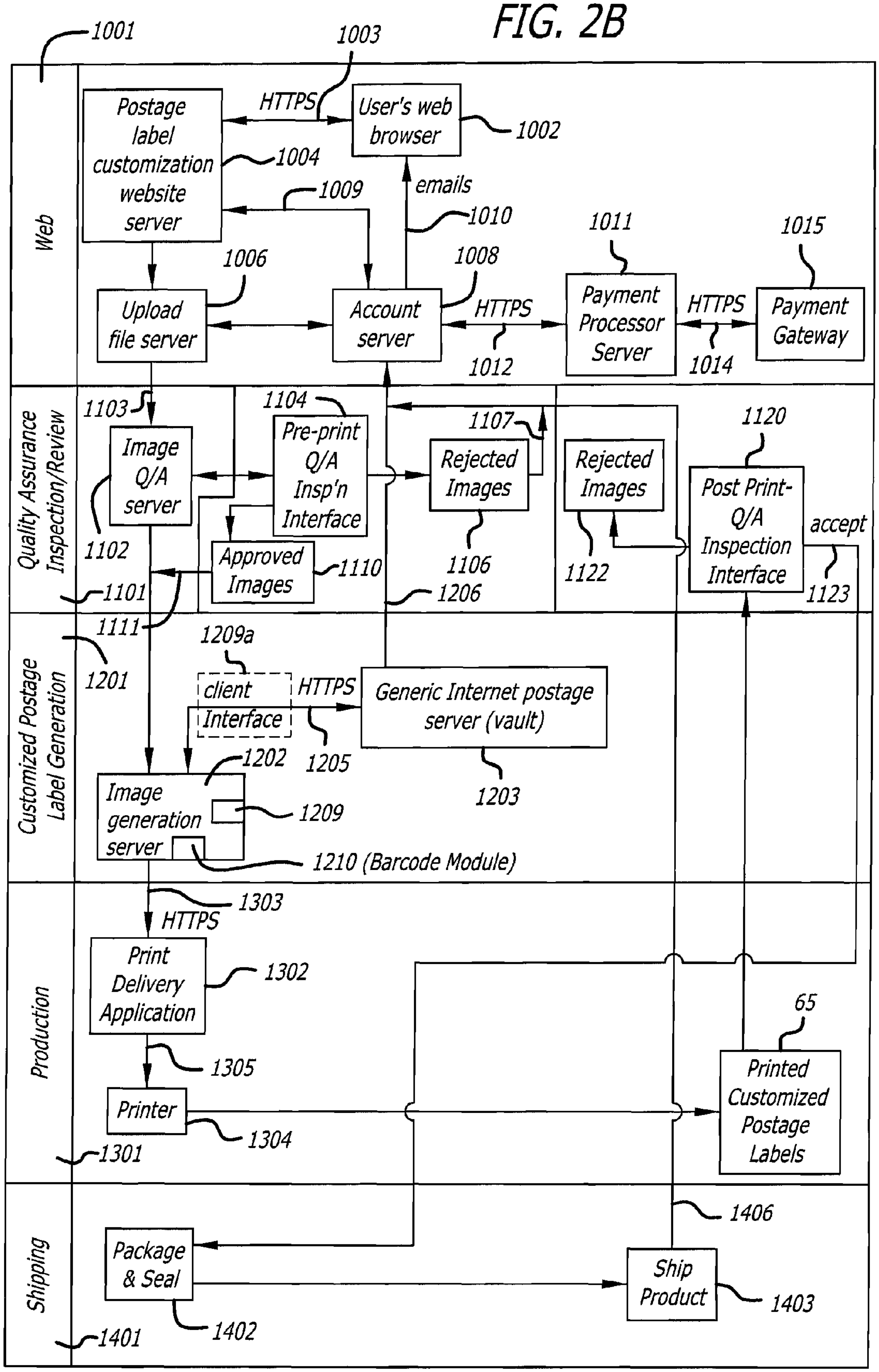
FIG. 2B is a block diagram depicting overview communication interactions in an exemplary embodiment of the present invention.

The exemplary embodiment of the present invention is described herein with respect to an exemplary Internet application of the present invention. It will be understood by someone with ordinary skill in the art that the exemplary Internet embodiment of the present invention is illustrative and non-limiting, and that the present invention will be equivalently applicable to non-Internet embodiments, including but not limited to, PC-based systems.

The exemplary embodiment of the present invention will be implemented, in part, in an online Internet-based (also sometimes referred to herein as computer-based or PC-based) postage system. The United States Postal Service (USPS) provides the Information Based Indicia Program (IBIP.) The IBIP facilitates computer-based Postage, also sometimes referred to as PC-based (Personal Computer, based; also sometimes referred to herein as PC Postage), or Internet-based, Postage. In a typical Internet-based postage system, a user can purchase postage credit, and print the postage in the form of PC Postage onto a label or directly onto a mail piece at a printer connected to the user's own computer.

An example of a computer-based postage system is a software-based, online postage system described in U.S. patent application Ser. No. 09/585,025 filed on Jun. 1, 2000, by Piers C. Lingle et al., "Online Postage Value Bearing Item Printing"; U.S. patent application Ser. No. 09/690,066 filed on Oct. 16, 2000, by Craig L. Ogg et al., "Networked Cryptographic Module for Secure Printing of Value-Bearing. Items"; and U.S. patent application Ser. No. 09/690,243 filed on Oct. 17, 2000, by Ari Engelberg et al., "Method and Apparatus for On-Line Value Bearing Item System" the contents of all of which are hereby incorporated by reference as if set forth in full. Exemplary online postage system software comprises user code, also sometimes referred to as client software, that resides on a user's client system, and controller code, also sometimes referred to as server software, that resides on a server system. An exemplary on-line postage system may comprise a user system electronically connected to, or otherwise adapted for communication with, a server system, which in turn is connected to, or otherwise adapted for communication with, a USPS system. The server system is preferably capable of communicating with one or more client systems simultaneously.

It will be understood by someone with ordinary skill in the art that the present invention would be equivalently applicable in contexts other than an Internet-based postage provider, including, but not limited to, other PC- and computer-based systems.

There are different types of IBIP postage. One type of IBIP postage is recipient-address specific and is date sensitive/date specific. Another type of IBIP postage is "generic" in that it is neither recipient-address specific or date sensitive/date specific.

IBIP postage is one type of Value Bearing Item ("VBI"). Value Bearing Items ("VBI" or value-bearing items) include, among other things, postage, coupons, tickets, gift certificates, currency, money orders, vouchers and the like. U.S. patent application Ser. No. 09/975,532 entitled "SYSTEM AND METHOD FOR PROVIDING COMPUTER-BASED POSTAGE STAMPS" (hereinafter referred to as the "Generic VBI Invention"), the contents and disclosures of which are incorporated in full herein, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as generic postage, that may be used at any time for any recipient, much like pre-printed postage printed and sold by the United States Postal Service ("USPS"). The terms "generic postage," "generic Internet postage", "computer-based generic IBIP postage" and "computer-based postage" are used synonymously herein to refer to postage that is non-recipient specific and/or non-date specific.

The exemplary embodiment of the present invention will provide a user-interface via which a user would order USPS-approved, customized computer-based IBIP generic postage labels. It will be understood by someone with ordinary skill in the art that although the exemplary embodiment of the present invention is described with respect to customized computer-based IBIP generic postage labels, the invention would apply equally to other types of Value-Bearing Items. It will also be understood by someone with ordinary skill in the art that reference herein to customized computer-based postage labels is synonymous with customized computer-based postage-indicia-bearing items. It will be further understood that the term label applies equally to plain paper and to self-adhesive label stock—that is, the use of self-adhesive label stock as described herein regarding the exemplary embodiment is not a limitation of the invention; the invention would apply equally to customized computer-based postage-indicia-bearing items printed on other materials, including but not limited to paper, that may or may not have a self-adhesive substance on the reverse side for affixing to a parcel.

FIG. 1 is a plan view of an exemplary image-customized computer-based postage label 1 in an exemplary embodiment of the present invention.

With reference to FIG. 1, the exemplary image-customized computer-based postage label 1 (sometimes interchangeably referred to herein as a customized computer-based postage label, or as a customized computer-based postage-indicia-bearing item, or as an image-customized computer-based postage-indicia-bearing item) will bear an image 2 that would be provided by a corresponding user, namely by the user that orders the customized computer-based postage label. The user may provide image 2 in an electronic form, such as by uploading a digital representation of image 2. In a variation of the exemplary embodiment, a user could alternatively provide a hardcopy image.

The exemplary image-customized computer-based postage label 1 will bear an exemplary border 3 that will be selected by the user. In the exemplary embodiment, exemplary image-customized computer-based postage label 1 will comprise a particular postage label footprint characterized by a set of particular dimensions, e.g., width 9 and height 10. In the exemplary embodiment, width 9 will measure approximately 1.75 inches; height 10 will measure approximately 1.25 inches. On a sheet of 20 postage labels, a space measuring 1.3 inches in height and 1.8 inches wide will be dedicated to each image-customized computer-based postage label. In a variation of the exemplary embodiment, the user will be able to select one of a plurality of postage label footprints; each selectable footprint will be characterized by a corresponding height and width.

In the exemplary embodiment, image 2 will measure approximately 1.1 inches wide by 1.1 inches in height; image 2 will cover approximately two-thirds of the face of the exemplary image-customized computer-based postage label 1.

In the exemplary embodiment, exemplary image-customized computer-based postage label 1 will be characterized by a perimeter 83.

The exemplary image-customized computer-based postage label 1 will bear a human-readable indication of the country 4 for which the postage is approved. The exemplary image-customized computer-based postage label 1 will also bear a human-readable indication of an amount of postage 5. The exemplary image-customized computer-based postage label 1 will also bear a human-readable identifier (such as a serial number) 6 that will uniquely identify the particular image-customized computer-based postage label. The exemplary image-customized computer-based postage label 1 will also bear a machine-readable set of information 7. In the exemplary embodiment, the exemplary machine-readable set of information (also referred to as machine-readable postage indicia) 7 will comprise a machine-readable representation of the serial number that uniquely identifies the particular image-customized computer-based postage label, a machine-readable representation of the amount of postage, and machine-readable representations of other information.

A single machine-readable barcode may represent a plurality of items of information, such as, e.g., a serial number, and a postage value. Even though a barcode may graphically appear to be a singular item, it therefore may represent a plurality of items of information. Therefore, unless otherwise expressly indicated, the terms indicia and indicium may be used interchangeably herein to refer to the singular and the plural.

More specifically, in the exemplary embodiment, the machine-readable postage indicia 7 will comprise 18 bytes of data and 2 bytes of encoder filler, structured according to the USPS Information Based Indicia Program IBI data dictionary format. IBI Data Dictionary and Indicia Types, Document version 5.2, USPS Information Based Indicia Program (IBIP), Sep. 29, 2003. In the exemplary embodiment, the machine-readable postage indicia 7 will be generated by a secure vault (the term "vault" is used herein to refer to a postage server located in a secure data center); the secure vault will maintain a one-to-one association of each serial number 6 uniquely identifying a particular image-customized computer-based postage label 1 with a corresponding, and similarly unique, machine-readable postage indicia 7; the secure vault will maintain a record of each serial number 6 uniquely identifying a particular image-customized computer-based postage label 1 and the corresponding, and similarly unique, machine-readable postage indicia 7.

Figures 4, 5:
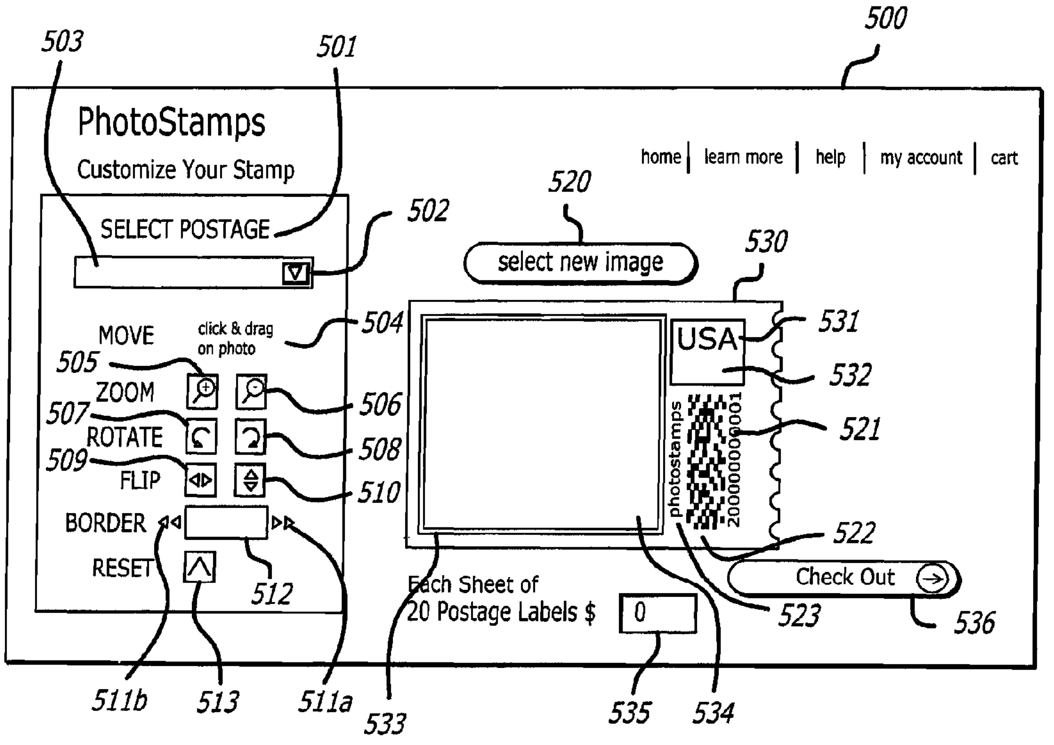
FIG. 4 is a chart depicting content format for machine-readable postage indicia in the exemplary embodiment of the present invention.
FIG. 5 is a graphic representation depicting a screen shot of an exemplary user interface blank postage label template screen that depicts a representation of an exemplary blank customizable postage label template in the exemplary embodiment of the present invention.

FIG. 4 is a chart depicting content format for the machine-readable postage indicia 7 in the exemplary embodiment. As depicted in FIG. 4, in the exemplary embodiment, the machine-readable postage indicia 7 will be a 20-byte field that will include a 1-byte IBI standard Indicia Version number 441, a 2-byte Software ID 442, a 3-byte Postage Value 443, a 2-byte IBI Vendor number 444, a 2-byte Model ID 445, an 8-byte (12-digit) Indicia ID (serial) number 446 (see also, element 6, FIG. 1) that references the unique indicia generated by the secure vault, and a 2-byte field containing Encoder values 447. In the exemplary embodiment, the content of the machine-readable postage indicia 7 will be encoded using a Data Matrix 2D barcode generator from IDAutomation, Inc.; the format will be 20 byte rectangular, with 20 mil element size. ANSI/AIM BC11 International Symbology Specification, "Data Matrix." Use in the exemplary embodiment of a Data Matrix 2D barcode is exemplary and non-limiting; machine-readable postage indicia 7 may comprise any other type of machine-readable representation, whether now known or in the future discovered.

Returning with reference to FIG. 1, the exemplary image-customized computer-based postage label 1 will also bear a brand name 8.

FIG. 2A is a block diagram depicting an exemplary Internet user client/server environment in an exemplary Internet postage system embodiment of the present invention. It will be understood by someone with ordinary skill in the art that although the exemplary embodiment of the present invention is described in the context of an Internet-based embodiment, that the present invention is not limited to Internet-based applications.

With reference to FIG. 2A, user client devices 10*a*-10*z* (sometimes referred to herein simply as "client" or "clients") and a postage label customization website 19 will engage in two-way communication via a communication network 12.

In the exemplary embodiment, communication network 12 will comprise the Internet. However, it will be understood by those skilled in the art that the communication network may take many different forms, such as a local area network (LAN), wide area network (WAN), wired telephone network, wireless network, or any other network that supports data communication between respective entities.

Clients 10*a*-10*z* may embody one of a variety of different forms. In one illustrative embodiment, one or more of Clients 10*a*-10*z* may comprise personal computers; other of Clients 10*a*-10*z* may comprise computers or any other device, whether now known or in the future discovered, that has processing capabilities and that may engage in communication over a communications network such as communication network 12.

Each respective client device 10*a*-10*z* will be in communication with a respective display device 11*a*-11*z*. Each respective display device, e.g., in the example using client 10*a*, display device 11*a*, will be integral to, or connected to, or otherwise in communications with, the respective client device, e.g., 10*a*.

Clients 10*a*-10*z* will be in communications with the communication network 12 through communication links 14*a*-14*z*. A communication link e.g., 14*a*, could comprise a wireless communication, a dedicated line connection, cable communication, satellite communication, telephone communication, or any other type of communication now known or in the future discovered. In addition, each client, e.g., client 10*a*, may have access to a printer, such as printer 16*a*. Optionally, a local network may serve as the connection between some of the clients and the Internet 12.

The postage label customization website 19 will also be in communication with the Internet via one or more communication links, e.g., 25. As with communication links 14*a*-14*z* between the client devices 10*a*-10*z* respectively, communication links, e.g., 25, between the postage label customization website 19 and the Internet could comprise a wireless communication, a dedicated line connection, cable communication, satellite communication, telephone communication, or any other type of communication now known or in the future discovered.

A web browser 1002, such as, for example, NETSCAPE NAVIGATOR®, or MICROSOFT INTERNET EXPLORER®, or some other web browser software, will be installed on each client device, e.g. 10*a*. Reference herein to web browser 1002 should not be read as referring to any particular web browser brand. Further, reference to a web browser 1002 should not be read as implying that every client computer, e.g., 10*a* through 10*z*, all use the same web browser. Rather, each client 10*a* will have one web browser, that could be selected from various web browsers, whether now known or in the future discovered, with which to control communications between the respective client device, e.g., 10*a*, and the Internet. Further, it will be understood by someone with ordinary skill in the art that the invention will apply to any computer program or set of computer instructions, whether a web browser or some other software now known or in the future discovered, that is adapted to allow a user to retrieve and render hyper-content from one or more server computers available for communication via a communications network, such as the Internet.

It should be noted that the use of suffixes such as "a" through "z" in connection with numbered elements of the FIGURES herein are exemplary and are not a limitation of the invention to any particular number. Rather, the suffixes "a" through "z", and similar notations, are used herein to an unknown number of similar elements; although the number is unknown, the "a" through "z" suffix notation is used to express a representation of 1 to many.

Communications between a client, e.g., 10*a*, and the postage label customization website 19 will be provided via secured eCommerce communications, such as through SSL; HTTPS, which stands for "Hypertext Transfer Protocol over Secure Socket Layer", is an acronym that is often used to describe such a secured eCommerce communications. However, it will be understood by someone with ordinary skill in the art that reference to SSL or HTTPS herein is not a limitation of the invention. Rather, other communication protocols, whether now known or in the future discovered, could be used.

SSL stands for "Secure Sockets Layer," a protocol developed by NETSCAPE® for transmitting private documents via the Internet. SSL works by using a private key to encrypt data that is then transferred over the SSL connection. Both NETSCAPE NAVIGATOR® and MICROSOFT INTERNET EXPLORER® web browsers, support SSL; many websites use SSL protocol to protect the exchange of confidential user information, such as credit card numbers.

With reference to FIG. 2B, the exemplary embodiment of the present invention will be characterized by a web environment 1001 in which a user's web browser 1002 (executing from the user's client computer, e.g., element 10*a* in FIG. 2A) will communicate with a website server 1004 operating in the postage label customization website (see element 19 in FIG. 2A). Through the user's web browser 1002, each respective user will be able to place an order for one or more image-customized computer-based postage labels. It will be understood by someone with ordinary skill in the art that reference herein to any particular server computer in the singular is not a limitation of the invention. It is understood by those with ordinary skill in the art that one or multiple server computers can be deployed to execute particular functionality, depending on the architecture of a particular system. A more detailed description regarding exemplary elements operating in the exemplary web environment 1001 will be described further below.

Continuing with reference to FIG. 2B, the exemplary embodiment of the present invention will be further characterized by a Quality Assurance Inspection/Review environment 1101 in which images for image-customized computer-based postage labels ordered by users will be reviewed to identify and reject images of unacceptable image quality and images with content that violate pre-established quality assurance standards.

The exemplary embodiment of the present invention will be further characterized by a customized postage label generation environment 1201 in which a customized postage label image generation server 1202 will generate a representation of a sheet of customized computer-based postage labels. The representation of a sheet of customized computer-based postage labels would comprise, in the case of the exemplary embodiment, 20 individual customized postage label representations, all of which would be characterized by the same image and the same set of customization features (e.g., size, position, vertical orientation, horizontal orientation). The customized postage label image generation server 1202 will order generation of unique postage indicia for each customized postage label and will inject the generated postage indicia into each respective customized postage label representation.

The exemplary embodiment of the present invention will be further characterized by a production environment 1301 in which sheets of customized computer-based postage labels will be printed. The sheets of customized computer-based postage labels will each be visually inspected for quality assurance according to a post-print quality assurance procedure.

The exemplary embodiment of the present invention will be further characterized by a shipping environment 1401 in which sheets of customized computer-based postage labels approved by the post-print quality assurance procedure will be assembled to fulfill an order, and will be shipped to the respective recipient as indicated by the ordering user.

Figure 3A:
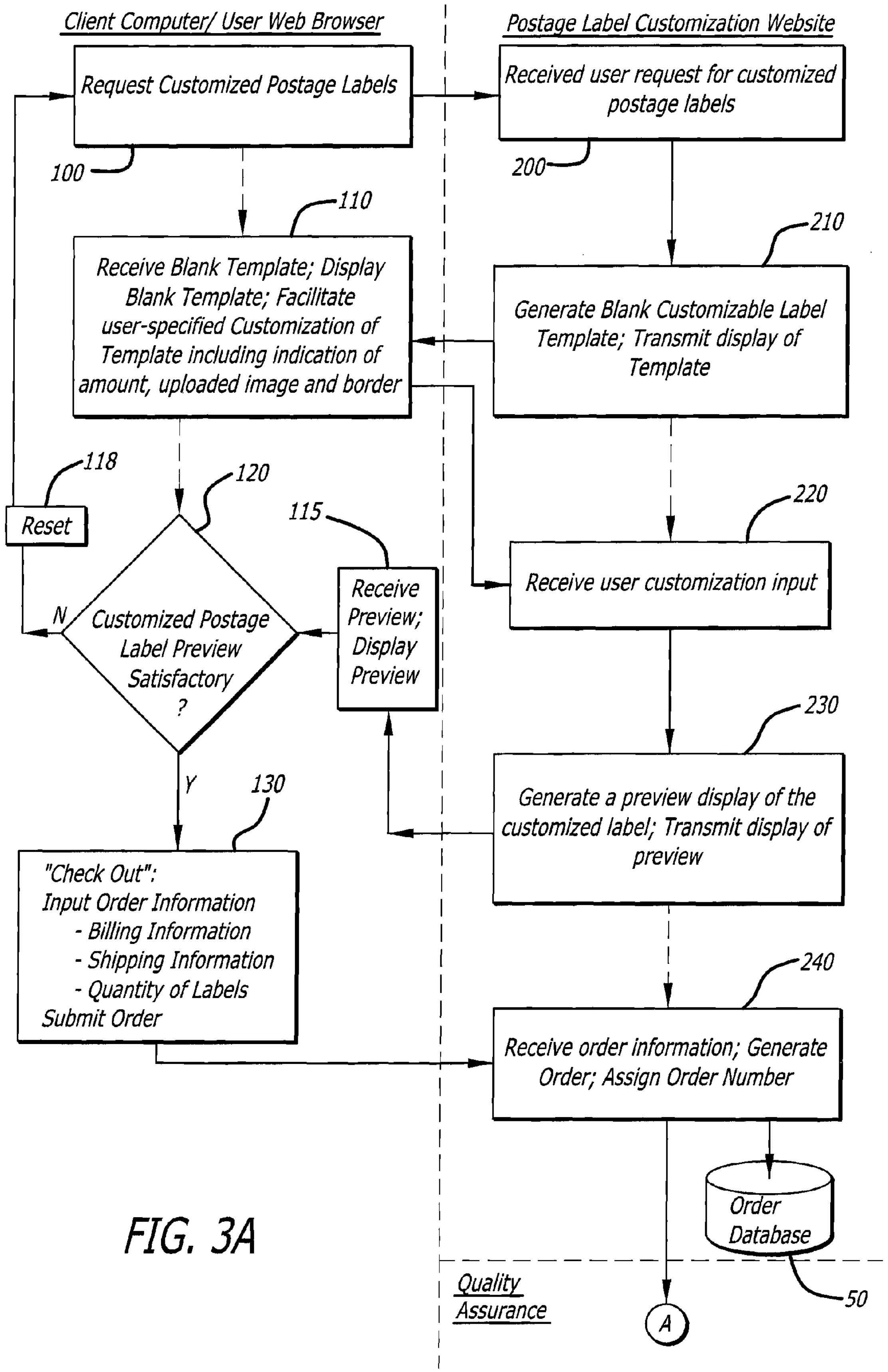
FIGS. 3A through 3C comprise a high-level flow diagram depicting exemplary high-level logic functions for creating exemplary customized computer-based postage labels in an exemplary embodiment of the present invention.
Figure 3B:
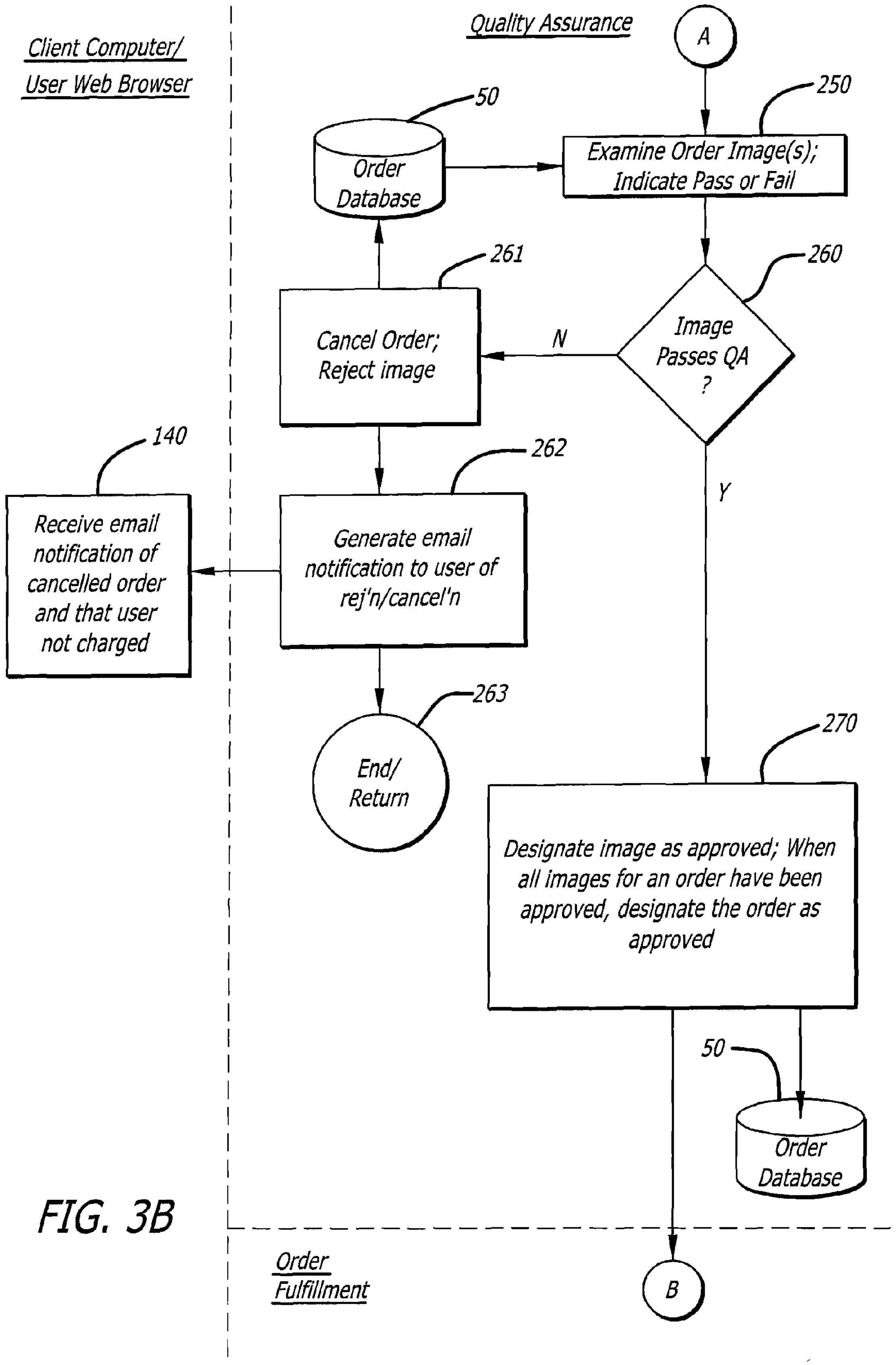
Figure 3C:
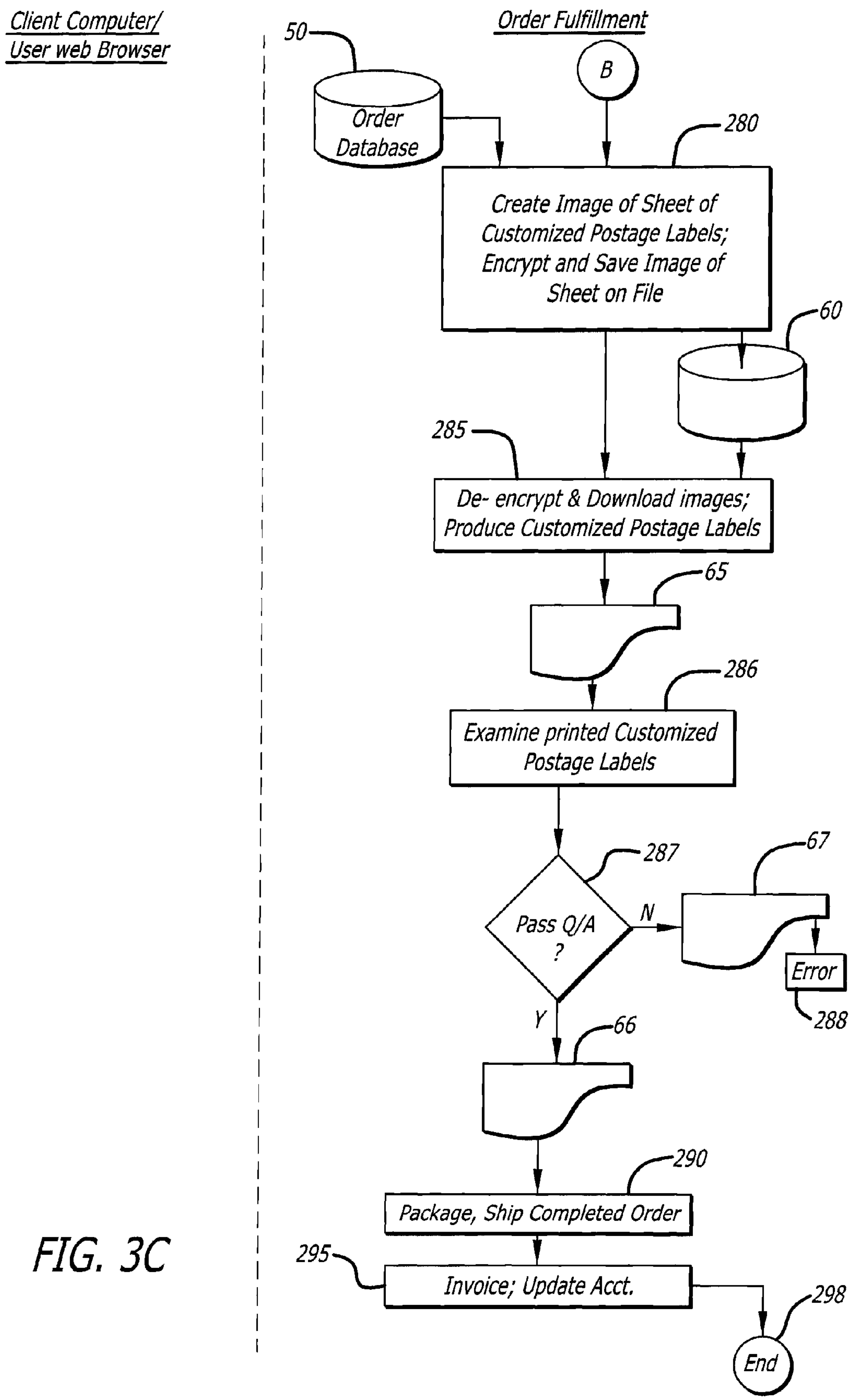

With reference to FIGS. 3A through 3C, an overview is described below of high-level logic functions for creating customized computer-based postage labels in an exemplary embodiment of the present invention. Interactions between exemplary elements of the exemplary embodiment of the present invention are described below with reference to FIG. 2B. A more detailed description of elements of the respective logic functions depicted in FIGS. 3A through 3C and FIG. 2B are provided with reference to other figures.

In FIGS. 3A through 3C, logic functions for a web browser (element 1002 in FIG. 2B) and/or a client computer (e.g., one of elements 10*a* through 10*z* depicted in FIG. 2A) are depicted on the left side of the drawing.

In the exemplary embodiment, software named MACROMEDIA FLASH® would be installed on each client computer to facilitate viewing of the exemplary user interface of the exemplary embodiment of the present invention. As will be understood by someone with ordinary skill in the art, MACROMEDIA FLASH® is a software program that integrates video, text, audio, and graphics.

Figure 7:
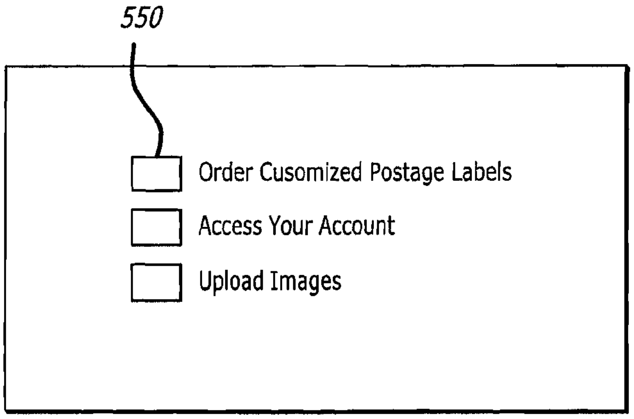
FIG. 7 is a graphic representation depicting a screen shot of an exemplary user interface home page screen in an exemplary embodiment of the present invention.

As depicted in FIGS. 3A through 3C, a user, using a client device (e.g., element 10*a* depicted in FIG. 2A) with a web browser (element 1002 in FIG. 2B), will request, in function 100, postage label customization. A user will request postage label customization such as, for example, by clicking on a user interface postage label customization "button" on a home page (see element 550, "Order Customized Postage labels", FIG. 7) at the postage label customization website 19. Alternatively, accessing the home page of the postage label customization website 19 could, in some embodiments, constitute a request for postage label customization.

Continuing with reference to FIGS. 3A through 3C, the postage label customization website 19 (via, a postage label customization website server computer 1004 depicted in FIG. 2B), will receive, in function 200, the user's request for postage label customization. In response to receiving, in function 200, the user's request for postage label customization, the postage label customization website 19 will, in function 210, generate a blank customizable postage label template and will cause a display of the template to be presented on a display device that is integral to, connected to, or otherwise in communications with the respective client device. For example, if the request for postage label customization was received in function 200 from client 10*a*, then the postage label customization website 19 will, in function 210, transmit, render or otherwise prepare the blank customizable postage label template for display on the respective display device 11*a*.

In the exemplary embodiment, a single customizable postage label template type is provided; the blank template will be characterized by a single set of parameters and by a single set of customizable elements; the display of the blank template will be formatted in a single way. However, it will be understood by someone with ordinary skill in the art that in alternative embodiments of the present invention, a plurality of template types could be provided to the user for selection without varying from the spirit of the present invention. In such an alternative embodiment, the user's selection of a particular template type would be communicated to the postage label customization website 19. Each template type would be characterized by a respective set of parameters and by a respective set of customizable elements; a display of a blank template corresponding to each template type would be formatted according to the respective template type and would be adapted to facilitate customization of the respective set of customizable elements. In such an alternative embodiment, the postage label customization website 19 would detect the user's indication of a selection of a particular template type, and would generate and cause the display of a blank template corresponding to the user-selected template type.

Returning to the exemplary embodiment, with reference to FIGS. 3A through 3C, the respective client, e.g., client 10*a*, would, in function 110, receive the blank template, would display a representation of the blank template on the respective display device, e.g., 11*a*, would instruct the user to input information corresponding to customizable elements of the blank template, and would facilitate the user's input of information corresponding to the customizable elements. In the exemplary embodiment, customizable elements will comprise the image (see element 2, FIG. 1), the border (see element 3, FIG. 1), and the amount of postage (see element 5, FIG. 1). In the exemplary embodiment, the user will be instructed to upload an image, select a border option from a plurality of border options, and select a postage amount from a plurality of discrete postage amounts. In the exemplary embodiment, a postage amount may be selected from: $0.23, $0.37, $0.49, $0.60, $0.83, $1.16, and $3.85. The postage amounts supported in the exemplary embodiment are exemplary and non-limiting; other postage amounts could be supported without departing from the spirit of the invention.

FIG. 5 is a graphic representation depicting a screen shot of an exemplary user interface blank postage label template screen 500 that depicts a representation of an exemplary blank customizable postage label template 530 in the exemplary embodiment of the present invention. As depicted in FIG. 5, the representation of the exemplary blank customizable postage label template 530 will comprise a display of a country identifier 531, a blank customizable postage amount field 532, a blank customizable image field 534, a customizable border field 533, a brand name 523, a mock postage indicia field 522, and a mock serial number 521. The exemplary blank customizable postage label template 530 will provide only a mock postage indicia field 522 because actual machine-readable postage indicia will be generated in a later function (see, e.g., function 280, described below with reference to FIGS. 3A through 3C). The exemplary blank customizable postage label template 530 will provide only a mock serial number 521 because an actual serial number will be generated in a later function.

Figure 12:
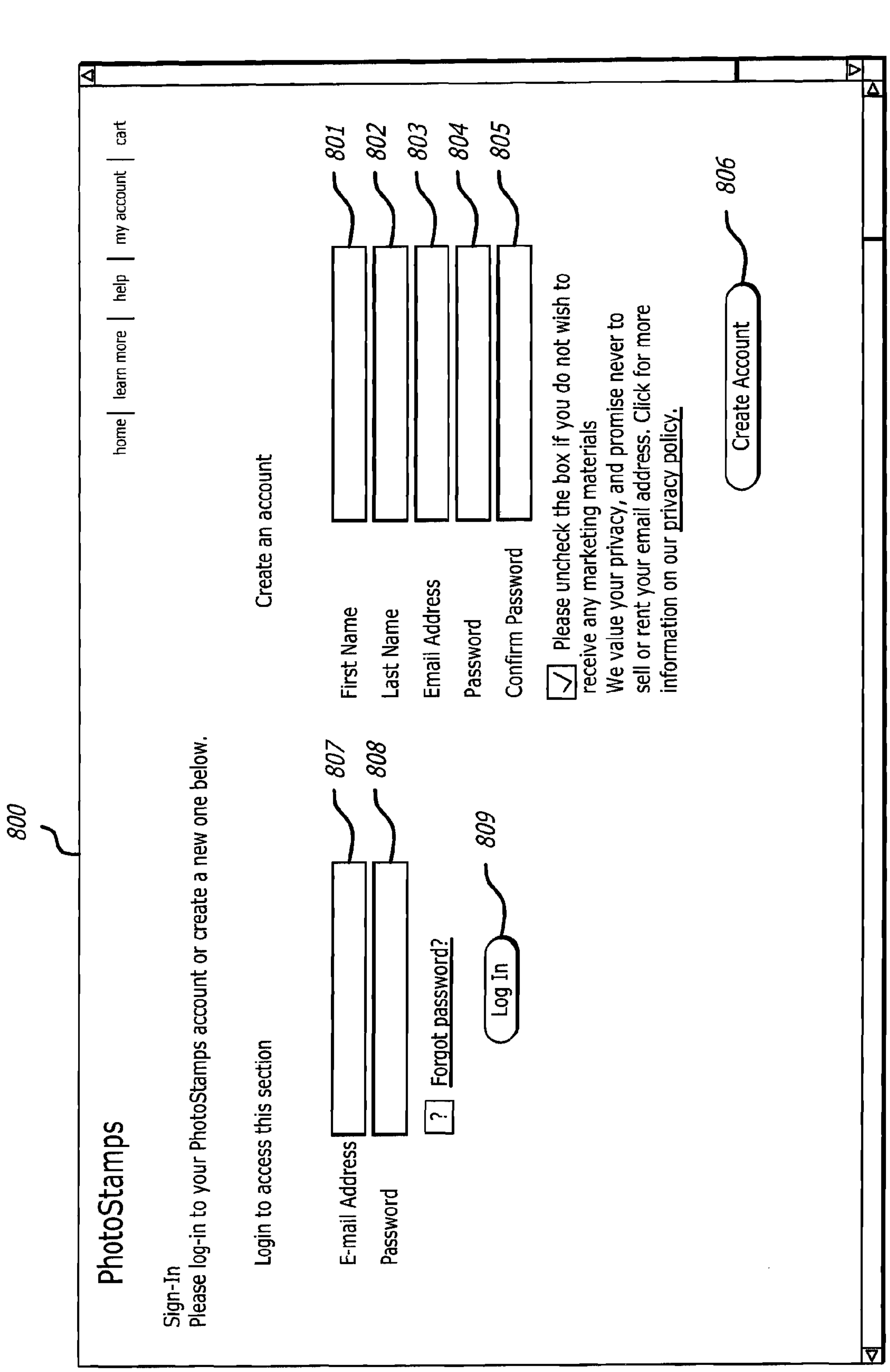
FIG. 12 is a graphic representation depicting a screen shot of an exemplary Sign-In/Create an Account screen in an exemplary embodiment of the present invention.

The exemplary user interface blank label template screen 500 will provide an onscreen button 520 that, when clicked by the user, will facilitate the user selecting a new image with which to customize the blank customizable image field 534. In the exemplary embodiment, before a user would be able to use the postage label customization service, the user would need to first establish a password-protected account. An exemplary Sign-In/Create an Account screen 800 is depicted in FIG. 12. With reference to FIG. 2B, communication 1003 in the exemplary embodiment between a user's web browser 1002 and the postage label customization website server 1004 will be according to HTTPS once a returning user logs in, or a new user enters information into the Create an Account screen (element 800 in FIG. 12).

Returning with reference to FIG. 12, in establishing an account, the user will provide, among other things, the user's name 801 (first name) and 802 (last name), an email address 803, and a password 804 (with confirmation 805). Once the information (e.g., elements 801-805) for establishing an account has been entered, the user could click the Create Account button 806 to cause the account information to be reviewed and, if approved by the system, to be used to create an account for the user/customer.

If the user has previously established an account, the user would be able to login by entering the user's email address in the email address login field 807, by entering the correct password in the login password field 808, and by clicking the Log In button 809. Because the establishment of an account with an eCommerce website is well understood by someone with ordinary skill in the art, details about the establishment of an account are not further elaborated herein.

In an alternative embodiment, a user would be able to upload images, customize computer-based postage labels and request to proceed to checkout before being asked to login. If the user had not previously established an account, the user would at that time "Create an account" before proceeding with checking out.

With reference to FIG. 2B, the postage label customization website server 1004 will communicate via a communication means 1009 with an account server 1008. Communications means 1009 may comprise any type of communication means whether now known or in the future discovered, including, for example, wireless communications. The account server 1008 will be responsible for secure protection and storage of user credit card and other account information.

With reference to the exemplary embodiment, once a user of the exemplary embodiment has established an account, the user will be able to access a personal image gallery. The exemplary user interface to the user's personal image gallery will facilitate the user uploading one or more images to the user's personal image gallery for use in customizing postage labels. In the exemplary embodiment, users will each be able to store up to ten (10) images in their personal image gallery. It will be understood by someone with ordinary skill in the art that the description of a 10-image storage limit in the exemplary embodiment is illustrative, and is not a limitation of the present invention.

Figure 18:
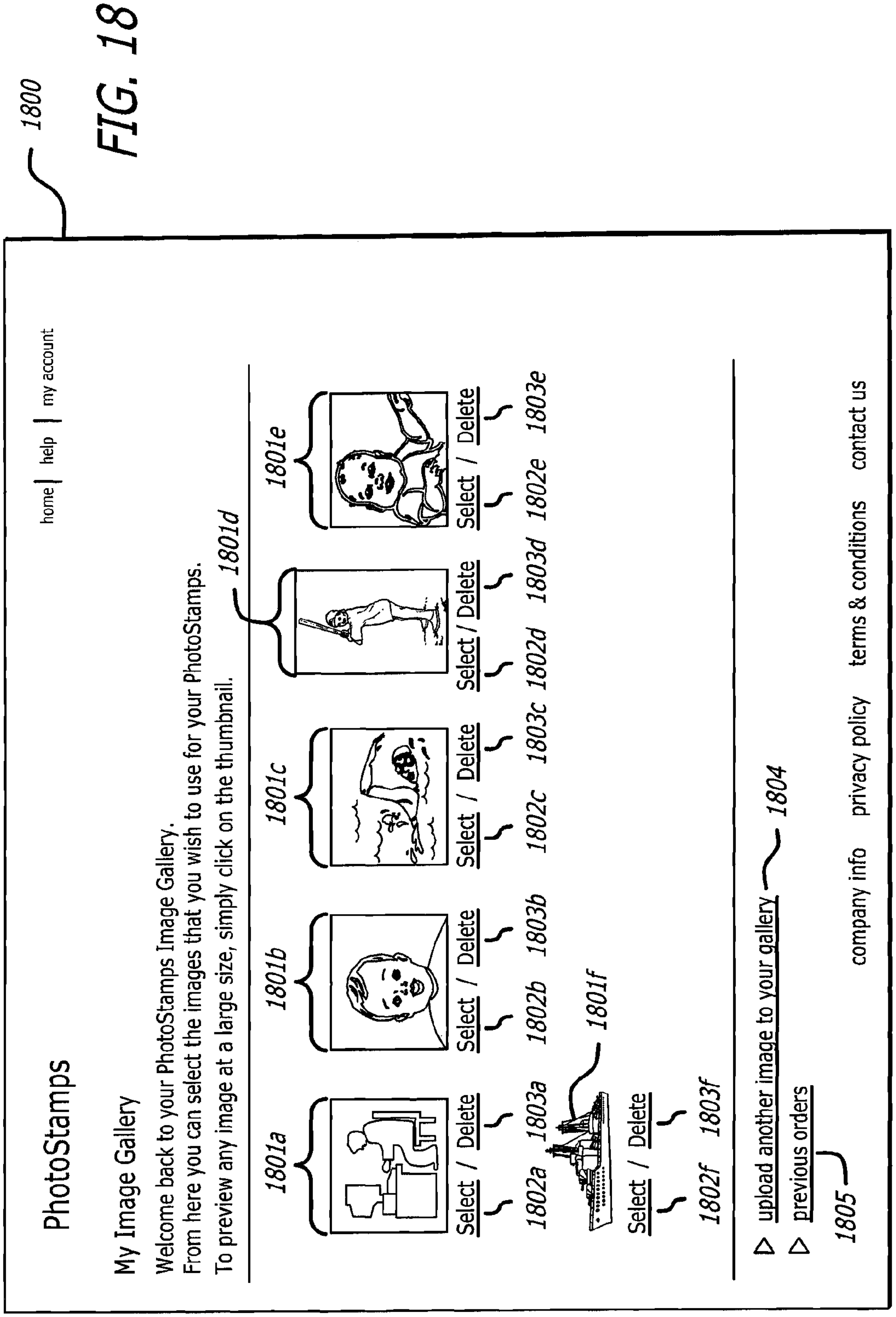
FIG. 18 is a graphic representation depicting a screen shot of an exemplary user's image gallery summary screen in the exemplary embodiment of the present invention.

FIG. 18 is a graphic representation depicting a screen shot of an exemplary user's image gallery summary screen 1800 in the exemplary embodiment of the present invention. In the exemplary image gallery summary screen 1800 depicted in FIG. 18, six exemplary images, 1801*a*, 1801*b*, 1801*c*, 1801*d*, 1801*e* and 1801*f* are depicted. For each image, e.g., 1801*a* through 1801*f*, a corresponding Select action button, e.g., 1802*a* through 1802*f*, and a corresponding Delete action button, e.g., 1803*a* through 1803*f* (corresponding to the particular image, which in the present example is image 1801*a*) will be provided. So for example, for image 1801*a*, a corresponding Select action button 1802*a*, and a corresponding Delete action button 1803*a* will be provided. If the user clicked on a Select action button, e.g., 1802*a*, corresponding to a particular image, e.g., 1801*a*, the particular image, e.g., 1801*a*, would be selected for use in filling the image window (element 534, FIG. 5) in the blank postage label template (element 530, FIG. 5). If, on the other hand, the user clicked on a Delete action button, e.g., 1803*a*, corresponding to a particular image, e.g., 1801*a*, the particular image, e.g., 1801*a*, would be deleted from the user's image gallery and would not appear in the user's image gallery summary screen 1800.

Figure 19:
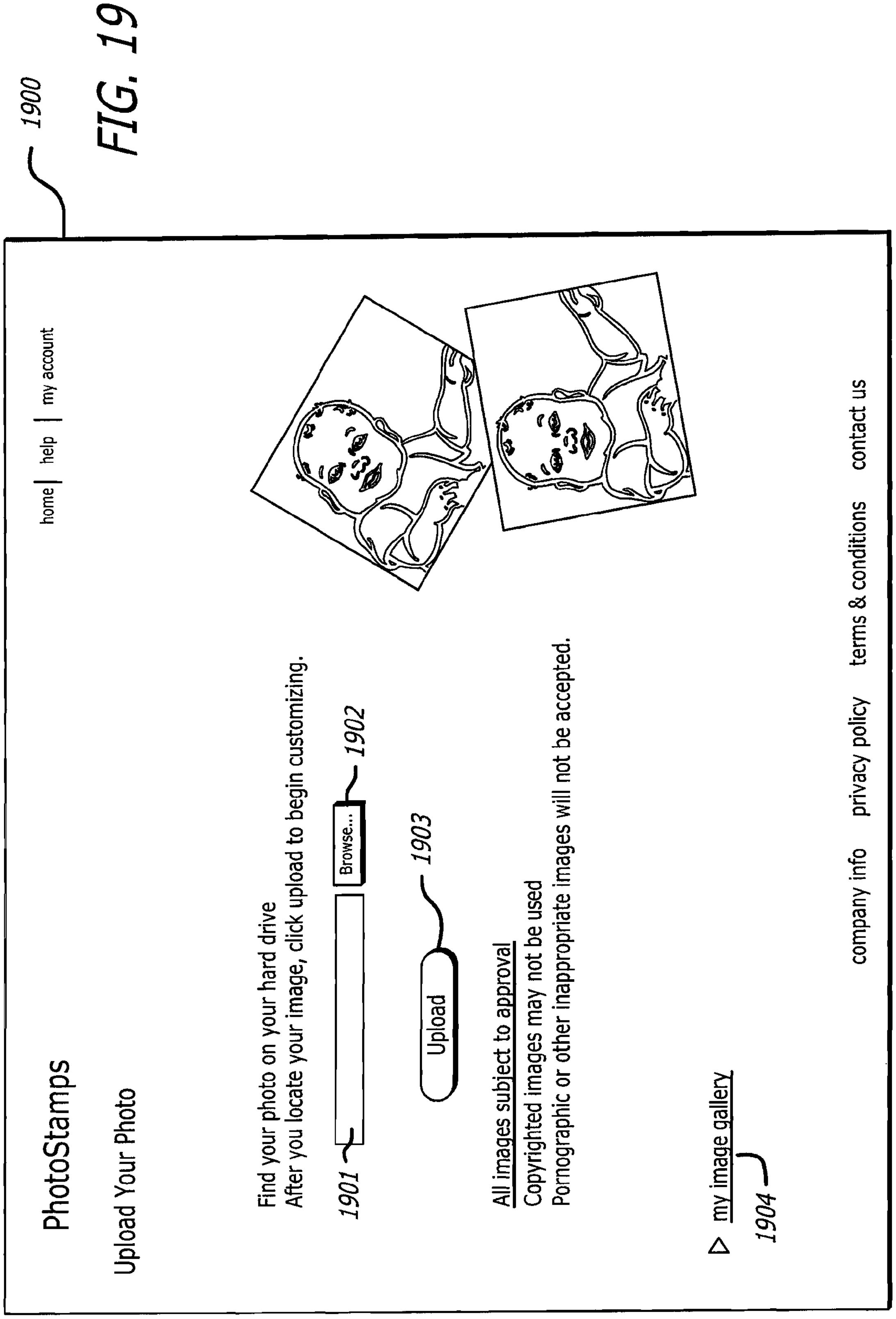
FIG. 19 is a graphic representation depicting a screen shot of an exemplary upload image screen in the exemplary embodiment of the present invention.

As depicted in FIG. 18, the exemplary embodiment would also provide an upload option 1804. Clicking on the upload option 1804 would cause a display of an exemplary upload image screen 1900 such as is depicted in FIG. 19. FIG. 19 is a graphic representation depicting a screen shot of an exemplary upload image screen 1900 in the exemplary embodiment of the present invention. In exemplary upload image screen 1900, an image source identification window 1901 would be provided. A user would have the option to key in to the image source identification window 1901*a* location, such as a file on a hard drive on the user's computer, or a file on a disk, CD ROM or the like to which the user's computer has access, or some other addressable source; alternatively, the user could click a Browse button 1902 that would be provided in the exemplary embodiment. Clicking the Browse button 1902 would cause a list of addressable sources, directories and/or files to be displayed, from which the user would be able to highlight/select a particular file name and addressable location.

Once a user had identified a particular file in the image source identification window 1901, an Upload button 1903 would be provided that, when clicked, would upload the file from the file designated in the image source identification window 1901. After the file is uploaded, the user could then click on a "my image gallery" display button 1904. Clicking on the "my image gallery" display button 1904 would cause the exemplary embodiment to display the exemplary image gallery summary screen 1800 such as is depicted in FIG. 18.

As depicted in FIG. 18, the exemplary embodiment would also provide a previous order inquiry option 1805. Clicking on the previous order inquiry option 1805 would cause a display of a previous order summary screen, as depicted in FIG. 20.

Figure 20:
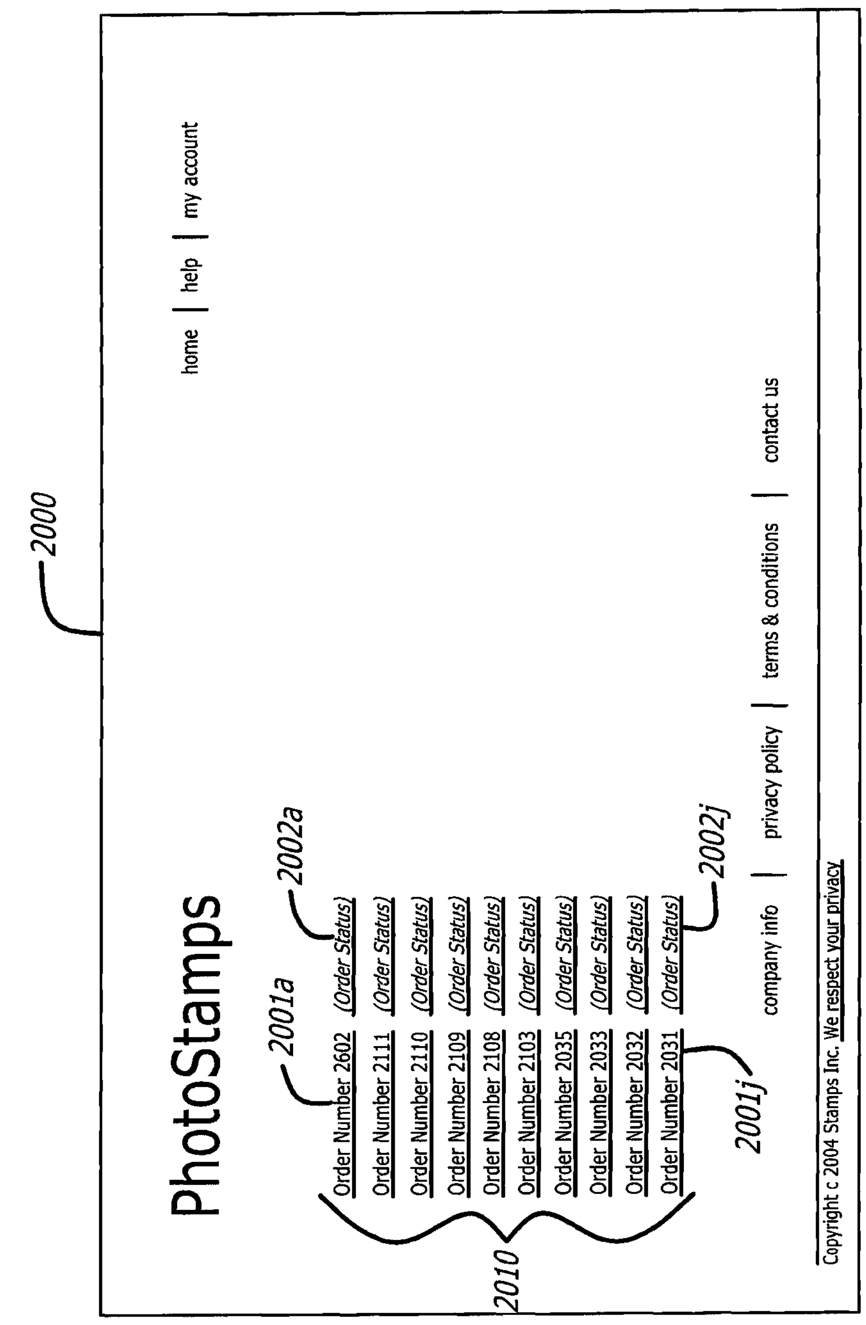
FIG. 20 is a graphic representation depicting a screen shot of an exemplary order status summary screen in the exemplary embodiment of the present invention.

FIG. 20 is a graphic representation depicting a screen shot of an exemplary order status summary screen 2000 in the exemplary embodiment of the present invention. As depicted in FIG. 20, in the exemplary order status summary screen 2000, a list 2010 of orders (e.g., 2001*a* through 2001*j*) for the requesting user would be displayed. For each order displayed in the list, e.g., order 2001*a* or 2001*j*, a corresponding order status request option, e.g., 2002*a*, or 2001*j*, respectively, would be displayed. If a user clicked on a particular order status request option, e.g., 2002*a*, an order status report screen 2100, such as is depicted in FIG. 21, would be displayed.

Figure 21:
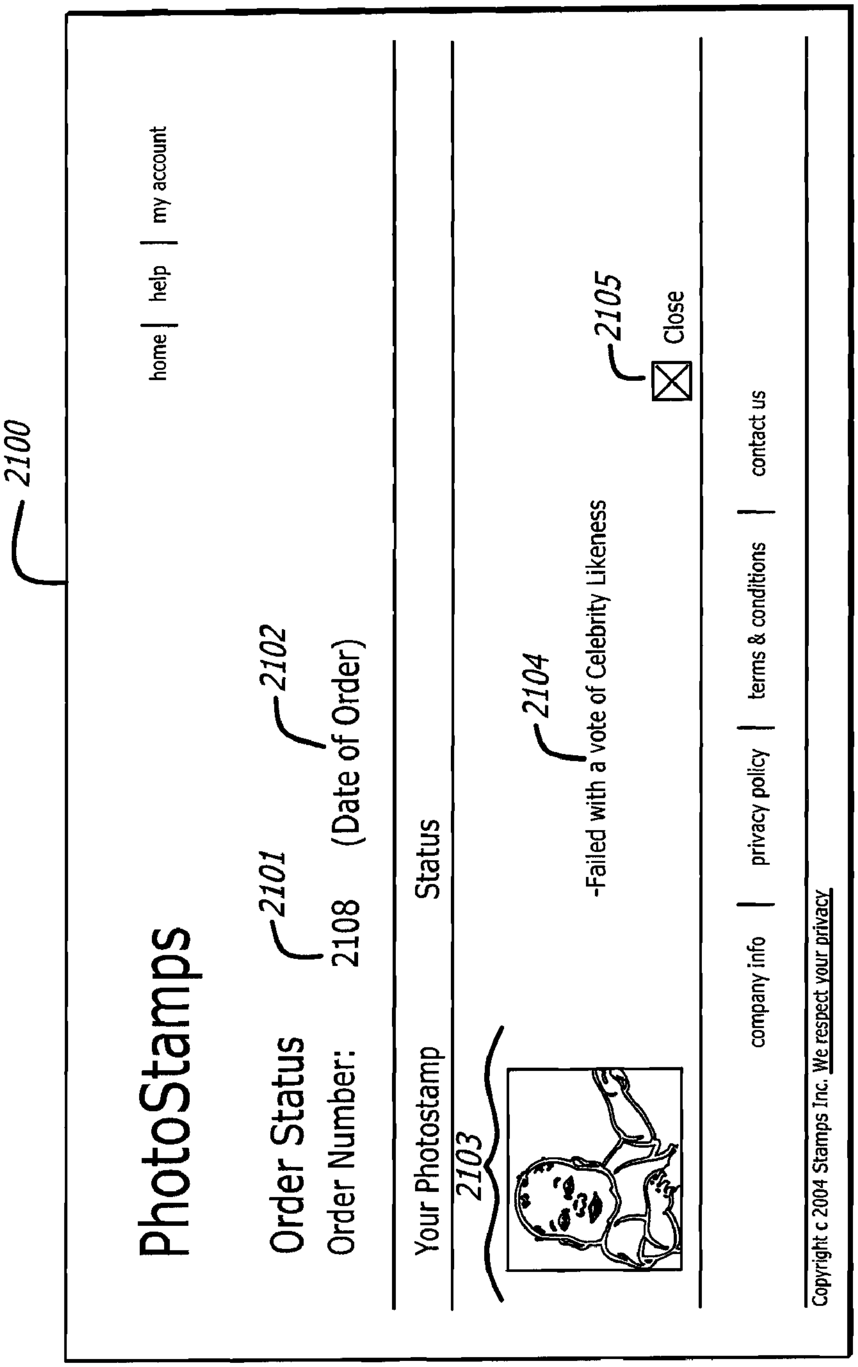
FIG. 21 is a graphic representation depicting a screen shot of an exemplary order status report screen in the exemplary embodiment of the present invention.

FIG. 21 is a graphic representation depicting a screen shot of an exemplary order status report screen 2100 in the exemplary embodiment of the present invention. As depicted in FIG. 21, the exemplary order status report screen 2100 would display an order number 2101 corresponding to the order number, e.g., order number 2001*a* (FIG. 20), for which the user had clicked the order status request option, e.g., 2002*a* (FIG. 20). As depicted in FIG. 21, the exemplary order status report screen 2100 would also display a Date of Order 2102, such as in MM/DD/YYYY format) for the corresponding order number 2101, an image 2103 corresponding to an image that was used in the corresponding order number 2101, and an order status description 2104 that would describe the disposition of the corresponding order number 2101.

In the exemplary embodiment, the user could exit the exemplary order status report screen 2100 and return to the previous screen by clicking on a close button 2105.

The exemplary embodiment will support various image formats, including GIF, BMP, JPG, and TIF. The image formats listed are illustrative and not a limitation of the invention; image formats now known and in the future discovered could be equally supported by an embodiment of the present invention. Users will be able, therefore, to upload and save images using any of the supported image formats. Size and resolution of each image will depend on the file format used.

Returning with reference to FIG. 5, once a user has established an account and uploads one or more images, if the user clicks the select-a-new-image button 520, a list will be displayed (not shown) of the images in the user's gallery. If a user has not previously established an account, clicking the select select-a-new-image button 520 would cause the display of user interface screens with which the user would need to establish an account.

If the user clicks the select-a-new-image button 520, and if a particular image that the user wants to use is not displayed in the user's gallery list, the user will need to upload the particular image and then select it from the user's gallery list.

If, on the other hand, the user clicks the select-a-new-image button 520, and the particular image that the user wants to use is listed in the user's gallery list, the user will be able to click on the "click & drag" field 504 on the exemplary user interface blank postage label template screen 500, click on the listing of the desired image, and drag the desired image to the blank customizable image field 534 (see element 534' described below with reference to FIG. 6). Once the blank customizable image field 534 has been filled with the particular image, the user would be able to click on the "click & drag" field 504 to reposition the image within the image field (see element 534' described below with reference to FIG. 6).

Continuing with reference to FIG. 5, the user will be able to select a postage amount (labeled Select Postage 501) by clicking on a pull-down postage amount menu button 502. Doing so will cause the display of the amounts of $0.23, $0.37, $0.49, $0.60, $0.83, $1.16, and $3.85. Moving the online cursor to the desire amount and highlighting the desired postage amount will cause the selected postage amount to appear in both the selected postage amount field 503, and will also customize the blank customizable postage amount field 532 (see element 532' described below with reference to FIG. 6).

In the exemplary embodiment, the exemplary user interface blank postage label template screen 500 will also provide a border customization field 512 with forward 511*a* and backward 511*b* buttons to scroll through a plurality of border color and/or pattern options. In the exemplary embodiment, the default border color/pattern will be a particular solid color, e.g., black. If a user selects a customized border, the customizable border field 533 will be customized according to the user's selection (see element 533' described below with reference to FIG. 6). In the exemplary embodiment, border color options will include: black (the default color), dark blue, red, light blue, orange, dark grey, yellow, green, violet, or white. Border color options in the exemplary embodiment are exemplary and non-limiting; other colors could be supported without departing from the spirit of the present invention. In the exemplary embodiment, when white is selected as the border color, postage value (see element 532' described below with reference to FIG. 6) will be dark blue.

In the exemplary embodiment, the exemplary user interface blank postage label template screen 500 will also provide a total price 535 per sheet of customized postage labels. Once a user has selected a postage amount 503, the total price field 535 will be updated (see element 535' described below with reference to FIG. 6).

The exemplary embodiment is described herein with reference to sheets of customized postage labels. In the exemplary embodiment, a user will be required to order a full sheet of customized postage labels; orders for partial sheets of customized postage labels will not be allowed. In the exemplary embodiment, each sheet of customized postage labels will contain 20 customized postage labels.

It will be understood by someone with ordinary skill in the art that in alternative embodiments, it would be possible in the spirit of the present invention to facilitate partial sheet orders, to facilitate shipping label orders, e.g., with one "postage label", postage label, and/or shipping label per page, and/or to facilitate other variations on order quantities and requirements.

In the exemplary embodiment, the exemplary user interface blank postage label template screen 500 depicted in FIG. 5 will also provide various image manipulation buttons (zoom in 505, zoom out 506; rotate counterclockwise 507, rotate clockwise 508; flip sideward 509, flip upward 510; a reset button 513). The image manipulation buttons will be useable by the user once the user has customized the blank customizable image field 534.

Returning with reference to FIGS. 3A through 3C, once the user has input information corresponding to the customizable elements, the postage label customization website 19 will, in function 220, receive the user's customization input, and then will, in function 230, generate a preview display of the customized postage label and transmit, render or otherwise prepare the preview display to the respective client, e.g., 10*a*, for display on the respective display device, e.g., 11*a*.

The respective client, e.g., 10*a*, will, in function 115, receive, render or otherwise obtain the preview display of the customized postage label, e.g., via the web browser resident on the respective client device, and will present the preview display (see FIG. 6 and the description provided below with reference to FIG. 6) on the respective display device, e.g., 11*a*, for user determination, in function 120 of whether the customized postage label preview is satisfactory.

It will be understood by someone with ordinary skill in the art that the user will be able to separately customize each customizable field (image 534, border 533, and amount 532) on the exemplary user interface blank postage label template screen 500 depicted in FIG. 5 and that the exemplary preview display of the customized postage label in the exemplary embodiment will reflect each interim customization. It will be understood by someone with ordinary skill in the art that, rather than provide a preview display of each feature as a user provides customization instructions, an alternative embodiment could provide an onscreen preview button; once the user had completed inputting customization instructions, the user would click the preview button to cause a display of the customized postage label preview.

Figure 6:
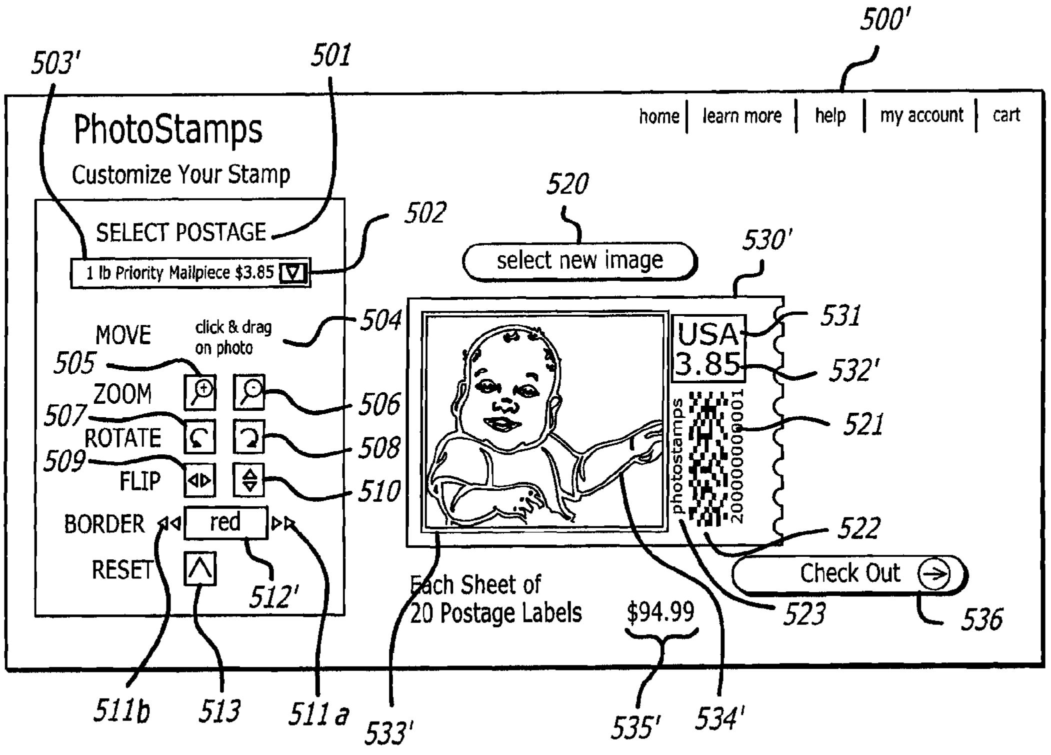
FIG. 6 is a graphic representation depicting a screen shot of an exemplary user interface customized postage label screen in the exemplary embodiment of the present invention.

FIG. 6 is a graphic representation depicting a screen shot of an exemplary user interface customized postage label preview screen 500' in the exemplary embodiment of the present invention. The exemplary user interface customized postage label screen 500' shown in FIG. 6 depicts a user's border selection 512' of a red border; a user's postage amount selection 503' of 11*b*. Priority Mail $3.85; a customized postage label 530' reflecting the user-customized postage amount 532', the user-customized border 533', the user-customized image 534', and a total price field 535' that has been updated to reflect the total amount ($94.99) of postage for 20 postage labels at the selected postage amount of $3.85.

Returning with reference to FIGS. 3A through 3C, if the user determines, in function 120, that the customized postage label is not satisfactory to the user, then the user could request that the template be reset (see element 513 in FIGS. 5 and 6) in function 118, returning control of the web browser (e.g., element 1002 in FIG. 2B) client (e.g., element 10*a* in FIG. 2A), to function 100.

If, on the other hand, the user determines, in function 120, that the customized postage label is satisfactory, then the user could proceed, in function 130, to submit the order (the user could indicate that, for example, the user is ready to "Check Out" by, e.g., clicking the "Check Out" button 536 depicted in FIGS. 5 and 6) and input order information, such as, for example, billing information (e.g., user name, credit card type, credit card number, credit card expiration date, billing address, and the like), shipping information (e.g., shipping address), and the quantity of the order.

Figure 8:
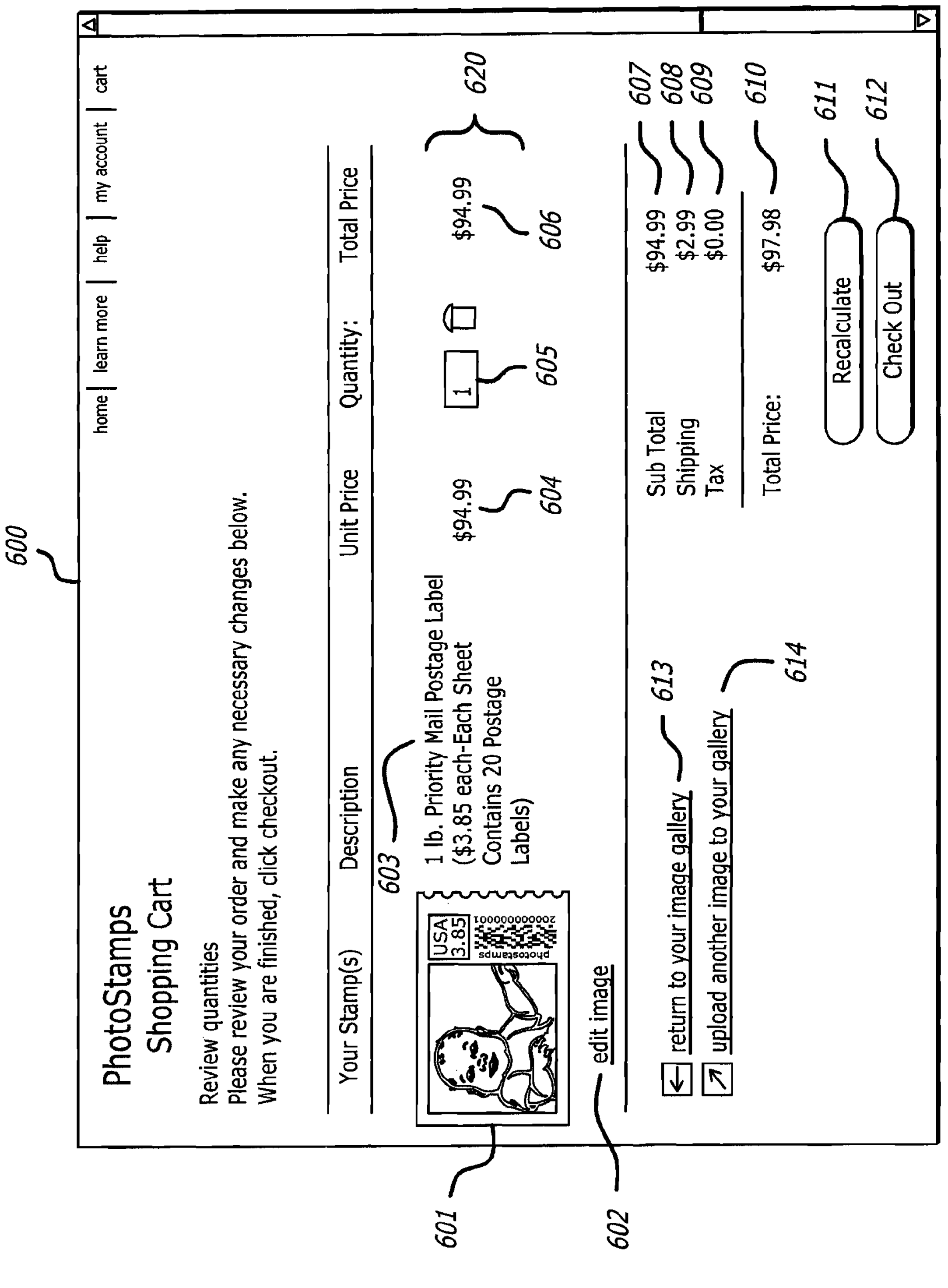
FIG. 8 is a graphic representation depicting a screen shot of an exemplary shopping cart summary screen in an exemplary embodiment of the present invention.

FIG. 8 is a graphic representation depicting a screen shot of an exemplary shopping cart summary screen 600 in an exemplary embodiment of the present invention. As depicted in FIG. 8, an exemplary shopping cart summary screen 600 would display a line, e.g., element 620, for each different customized postage label 601 in the particular user's current order. Each order line 620 will be characterized by a miniature preview display of the customized postage label 601 (which should match the preview display 530' that was shown in the corresponding exemplary user interface customized postage label preview screen 500' depicted in FIG. 6), a description of a sheet of such postage labels 603, a unit price 604 (that reflects the total price for a sheet of postage labels), a quantity 605 (that reflects the number of sheets ordered), and a total price 606 for the total quantity of the particular customized postage label.

For any particular customized postage label 601 in the order 600, the user could click on the edit image field 602 to refine the customization of that particular postage label. The exemplary shopping cart summary screen 600 would also provide a sub-total 607 that would reflect the total of all customized postage labels in the order, a shipping fee 608, an amount of tax 609 (however, there is presently no tax for U.S. postage), and a Total Price 610 for the entire order. The exemplary shopping cart summary screen 600 would also provide an option to return to the user's image gallery 613, and an option to upload another image to the user's image gallery 614. The user would be able to modify the quantity field for any customized postage label listed by placing the cursor on the quantity field 605 and entering a different number; the user would be able to request recalculation of the total order by then clicking the Recalculate button 611. When the user is satisfied with the summary of the order as presented on the exemplary shopping cart summary screen 600, the user would be able to click on the Checkout button 612 which would take the user to further order finalization screen, such as are depicted in FIGS. 9, 10, and 11.

Figure 9:
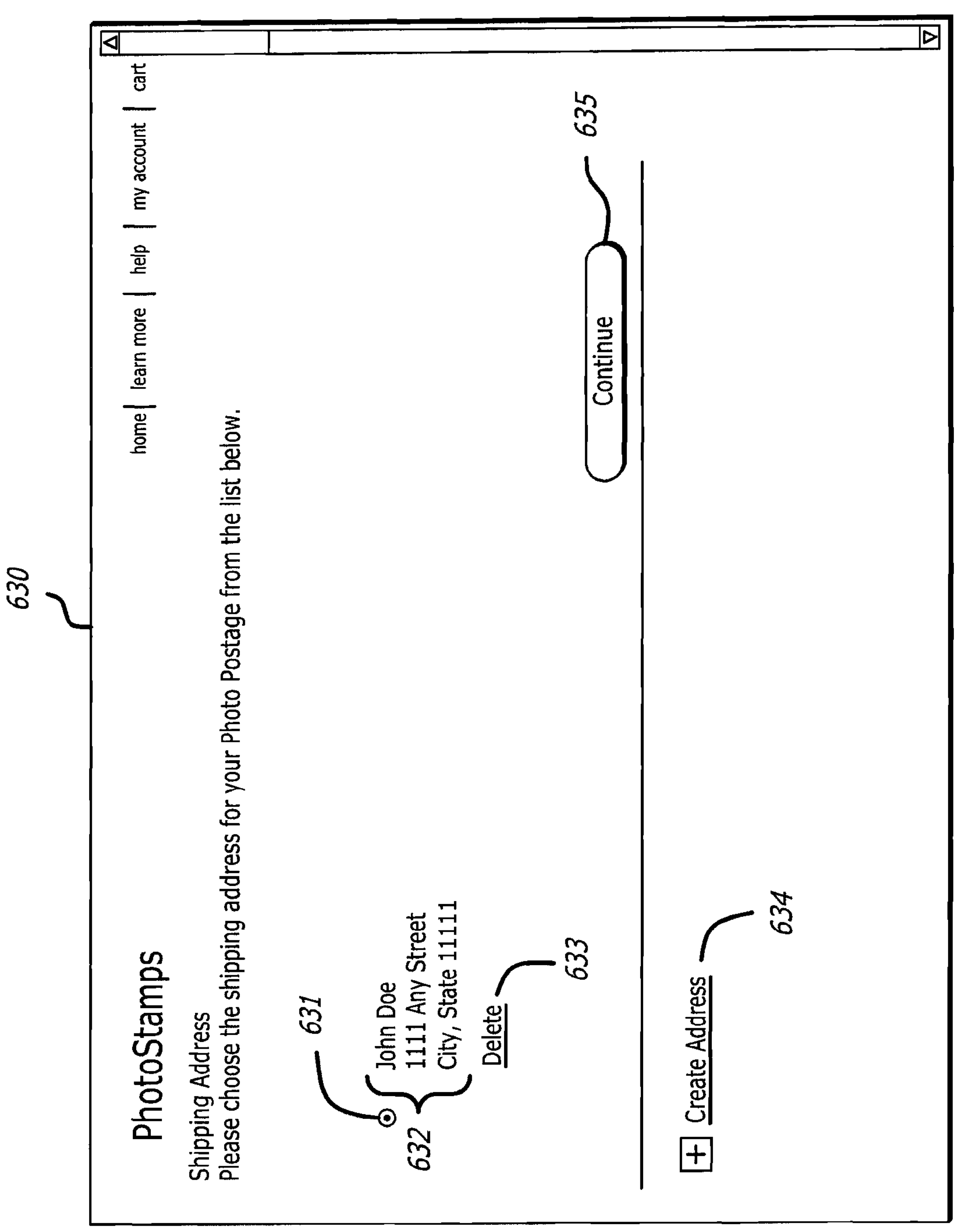
FIG. 9 is a graphic representation depicting a screen shot of an exemplary shipping address screen in an exemplary embodiment of the present invention.

FIG. 9 is a graphic representation depicting a screen shot of an exemplary shipping address screen 630 in an exemplary embodiment of the present invention. Using the exemplary shipping address screen 630, a user would be able to choose the default address 632 to which the customized postage should be set by clicking the default address button 631. Alternatively, the user would be able to click the Delete button 633 and cause the deletion of the default address as the shipping address. The user would be able to click the Create Address button 634 and enter a new shipping address. Once the shipping address information is correct, the user would be able to click on the Continue button 635 to proceed to the next order finalization screen.

Figure 10:
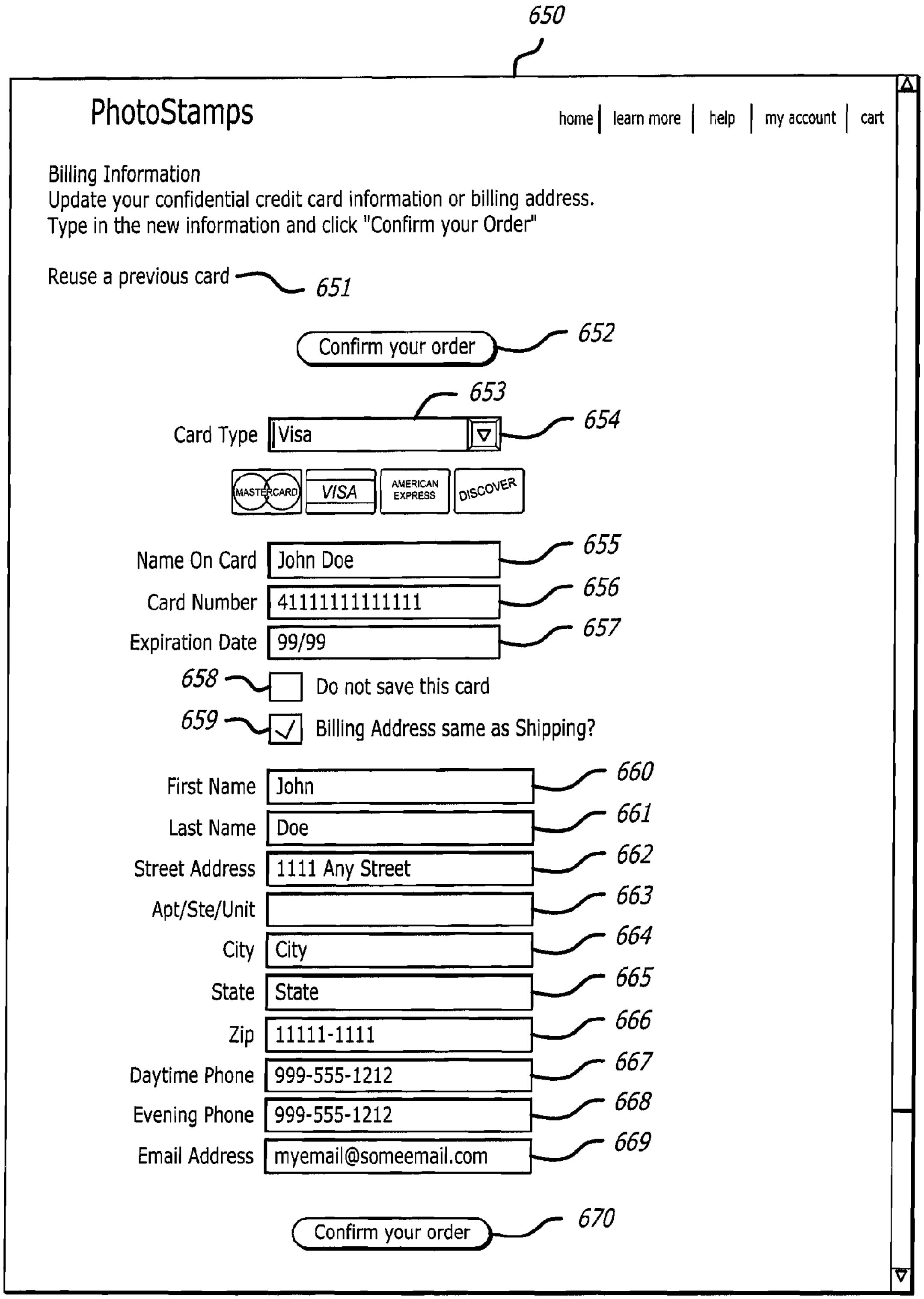
FIG. 10 is a graphic representation depicting a screen shot of an exemplary billing information screen in an exemplary embodiment of the present invention.
Figure 11:
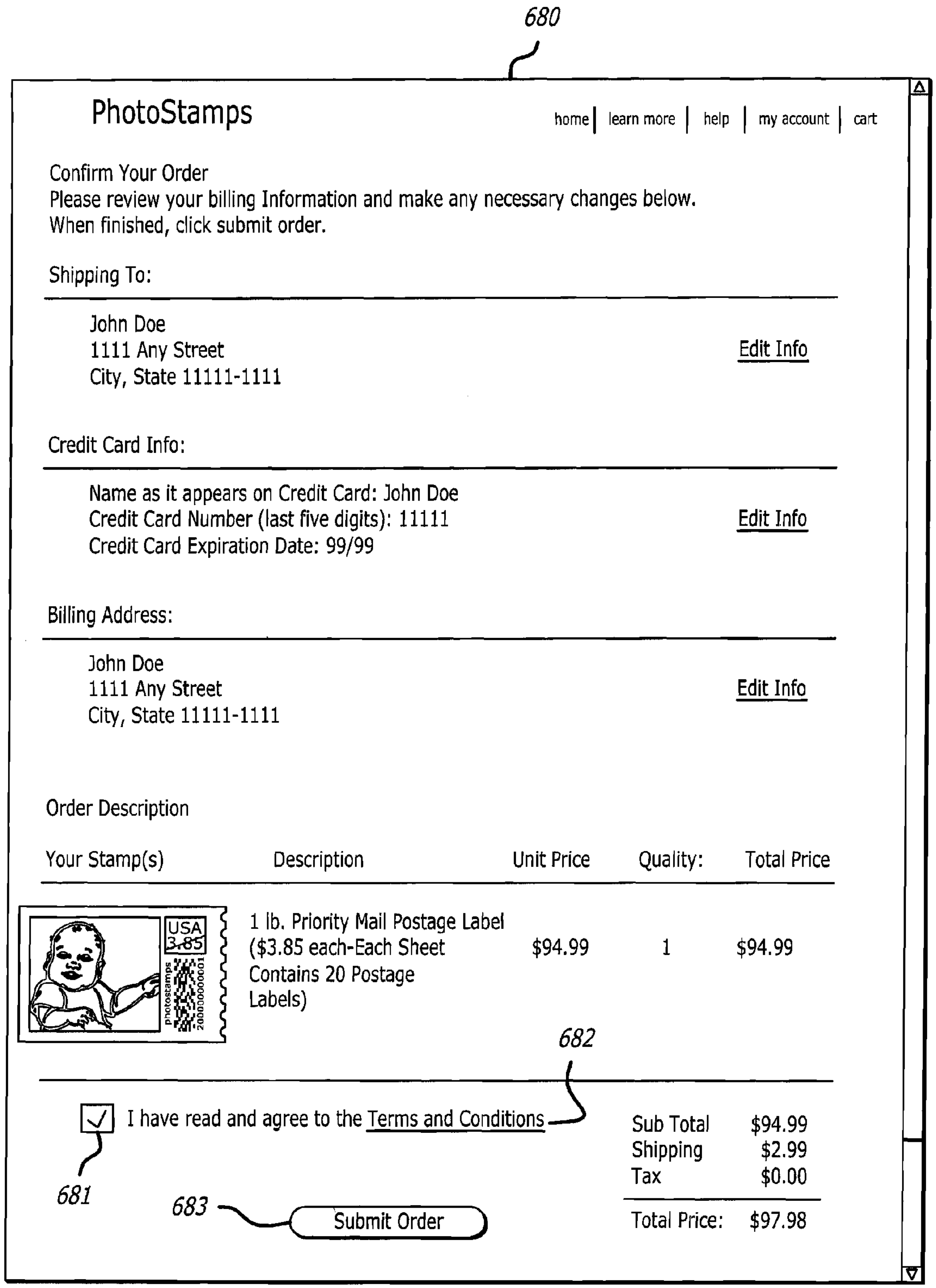
FIG. 11 is a graphic representation depicting a screen shot of an exemplary order confirmation screen in an exemplary embodiment of the present invention.

FIG. 10 is a graphic representation depicting a screen shot of an exemplary billing information screen 650 in an exemplary embodiment of the present invention. As depicted in FIG. 10, the user would be able to either choose to reuse previously provided credit card information 651 and click the Confirm your order button 652 to proceed to the next screen, or could supply billing information (elements 653 (credit card type) through 669 (email address)) and then click the Confirm your order button 670. As depicted in FIG. 10, if the user chooses to enter new billing information, the user would be provided with input fields for credit card type 653 (selected by, clicking on the credit card type pull down menu button 654 and highlighting the desired credit card type), name on card 655, card number 656, credit card expiration date 657, an option to save the credit card information 658, an option to indicate that the billing address is the same as the shipping address 659, the user's first name 660, the user's last name 661, a street address 662, an Apt./Ste./Unit field 663, city 664, state 665, zip code 666, daytime phone 667, evening phone 668, and email address 669.

Once the user has entered the appropriate billing information and confirmed the order by clicking on the appropriate confirmation button 652 or 670 as the case may be, the user would be presented with a final Confirm Your Order screen. FIG. 11 is a graphic representation depicting a screen shot of an exemplary order confirmation screen 680 in an exemplary embodiment of the present invention. The exemplary order confirmation screen 680 summarizes the order, reflecting information previously depicted and described with reference to FIGS. 8, 9 and 10. If the user wants to accept the order, the user would need to indicate in agreement field 681 that the user agrees to the terms and conditions 682 for the website, and then submit the order by clicking the Submit Order button 683.

With reference to FIG. 2B, in the exemplary embodiment, user credit card information and the ordered postage will be stored by the Account Server 1008, encrypted in a secure administrative "Commerce" database; all "backend" processes associated with the customized postage will follow Vault security measures.

In the exemplary embodiment, security measures for encrypting user credit card information will include the following. Card encryption will use Advanced Encryption Standard ("AES"—which would be implemented in the exemplary embodiment in the RijndaelManaged .NET Framework class). The key will be generated as follows: at server startup, a user from a Data Center Operation ("DCO") and a user from the security officers group must both input a password; each password will be input into the PasswordDeriveBytes class (which uses Windows' CryptoAPI's CryptDeriveKey) to generate 256 bits; once both passwords have been entered, the AES key is generated by applying an exclusive "OR" function to ("XOR'ing") the following three items:

1.) The DCO member's password-derived 256 bits.

2.) The Security Officer's password-derived 256 bits.

3.) 256 bits from a file stored on the server itself.

Including the 256 bits from the file stored on the web server in the exemplary embodiment process to generate the AES key will allow pass-phrase changes without having to re-encrypt the stored cards in the database. In an alternative embodiment, generating the key from just the two password-derived bit sequences would not permit password changes without re-encryption.

In the exemplary embodiment, the AES key will be verified by comparing a stored SHA1 ("SHA1" is an acronym for Secure Hash Algorithm-1—an algorithm that computes a 160-bit representation of a message that can be used in creating and verifying digital signatures) hash with the hashed value of the final XOR'ed AES key value.

In the exemplary embodiment, user credit card information will be stored in the database encrypted using AES in Cypher Block Chaining ("CBC") mode. The padding method will be PKCS #7. A random Initialization Vector ("IV") will be created by the RijndaelManaged class upon instantiation. The IV will be generated using the RNGCryptoServiceProvider class which will use CryptoAPI's CryptGenRandom.

In the exemplary embodiment, in addition to storing the encrypted card number on the database, the IV, a Message-Digest algorithm 5 ("MD5") hash of the card number, and the first six plain-text digits (the BIN number) will be stored in the database. (MD5 is a message-digest algorithm developed by Ron Rivest. It is useful for digital signature applications where a large message has to be "compressed" in a secure manner before being signed with a private key.) The card will be given an ID number, which will be the way to identify a card for use in a later, subsequent transaction.

In the exemplary embodiment, security measures for encrypting the postage ordered will include the following. In the exemplary embodiment, postage orders will be saved in the form of Portable Data Format ("PDF") files. The PDF files containing the postage to be printed will be encrypted prior to being saved on disk. The encryption will be done with an AES in CBC mode. The AES key will be 256 bits and will be randomly generated for each PDF file. A random IV will also be generated. The AES key will be encrypted with a 1024-bit RSA public key (RSA is an acronym for the last names of the inventors (Ron Rivest, Adi Shamir, and Leonard Adleman) of an encryption algorithm that they invented in. Optimal Asymmetric Encryption Padding ("OAEP") padding will be used. The PDF file will be saved to disk as ordernumber.PDF.aes. The content of the file will be as follows:

1.) The length in bytes of the encrypted AES key (will occupy 8 bytes in the file).

2.) The RSA encrypted AES key.

3.) The length in bytes of the AES IV (will occupy 8 bytes in the file).

4.) The AES IV.

5.) The AES encrypted PDF data.

The RSA private key will be kept on a Universal Serial Bus ("USB") flash drive for use by the administrative person downloading the encrypted PDF files.

Returning with reference to FIGS. 3A through 3C, the postage label customization website 19 will, in function 240, receive the order information and will generate an entry for the order in an order database 50.

With reference to FIG. 2B, once a user submits an order, a unique Order Number will be assigned to the order by the postage label customization website server 1004. An entry for the order will be stored by the postage label customization website server 1004 in the order database (element 50, FIGS. 3A through 3C). Subsequently, the order will be submitted, as described further below, for quality assurance inspection and review.

In the exemplary embodiment, an entry for an order on the order database (element 50, FIGS. 3A through 3C) would comprise customer and billing information, a pre-print quality assurance disposition, a post-print quality assurance disposition (initialized to a value that indicates that all of the images in the order have not yet been approved), and an entry for each image. An entry for an image would comprise: a URL (Universal Resource Locator) for the corresponding uploaded image, scale information that describes the scaling of the uploaded image with respect to the customized postage label image (see element 534', FIG. 6), offset information that describes the offset of the uploaded image with respect to the customized postage label image (see element 534', FIG. 6), flip information that describes the flip orientation of the uploaded image with respect to the customized postage label image (see element 534', FIG. 6), horizontal information that describes the horizontal orientation of the uploaded image with respect to the customized postage label image (see element 534', FIG. 6), and a pre-print quality assurance disposition (initialized to a value that indicates that the image has not yet been reviewed).

In the exemplary embodiment, with reference to FIGS. 3A through 3C, the image(s) for each order will be examined at a "pre-print" stage in a quality assurance procedure depicted in function 250. Pre-print stage image quality assurance will be performed in order to identify and reject illegal or obscene subject matter, and/or poor quality images. In the exemplary embodiment, pre-print image quality assurance will be implemented using a computer-managed human review process that is described in more detail below. Quality assurance users will indicate whether each respective image in an order passes or fails quality assurance standards.

With reference to FIG. 2B, an Internet postage provider system upload file server 1006 will upload images in each submitted order (from the order database, depicted as element 50 in FIGS. 3A through 3C) to a pre-print quality assurance queue 1103, which will in turn, be processed by an image quality assurance server 1102.

The exemplary embodiment will provide a Quality Assurance inspection interface, sometimes referred to herein as the Inspector Admin (administrative) Tool. The exemplary Inspector Admin Tool will allow for the processing of image review, and image approval or rejection. In order to use the Inspector Admin Tool, a Quality Assurance inspector/reviewer (also sometimes referred to as an Inspector, or alternatively, a QA User) 1 would log in to the Inspector Admin Tool.

Figure 13:
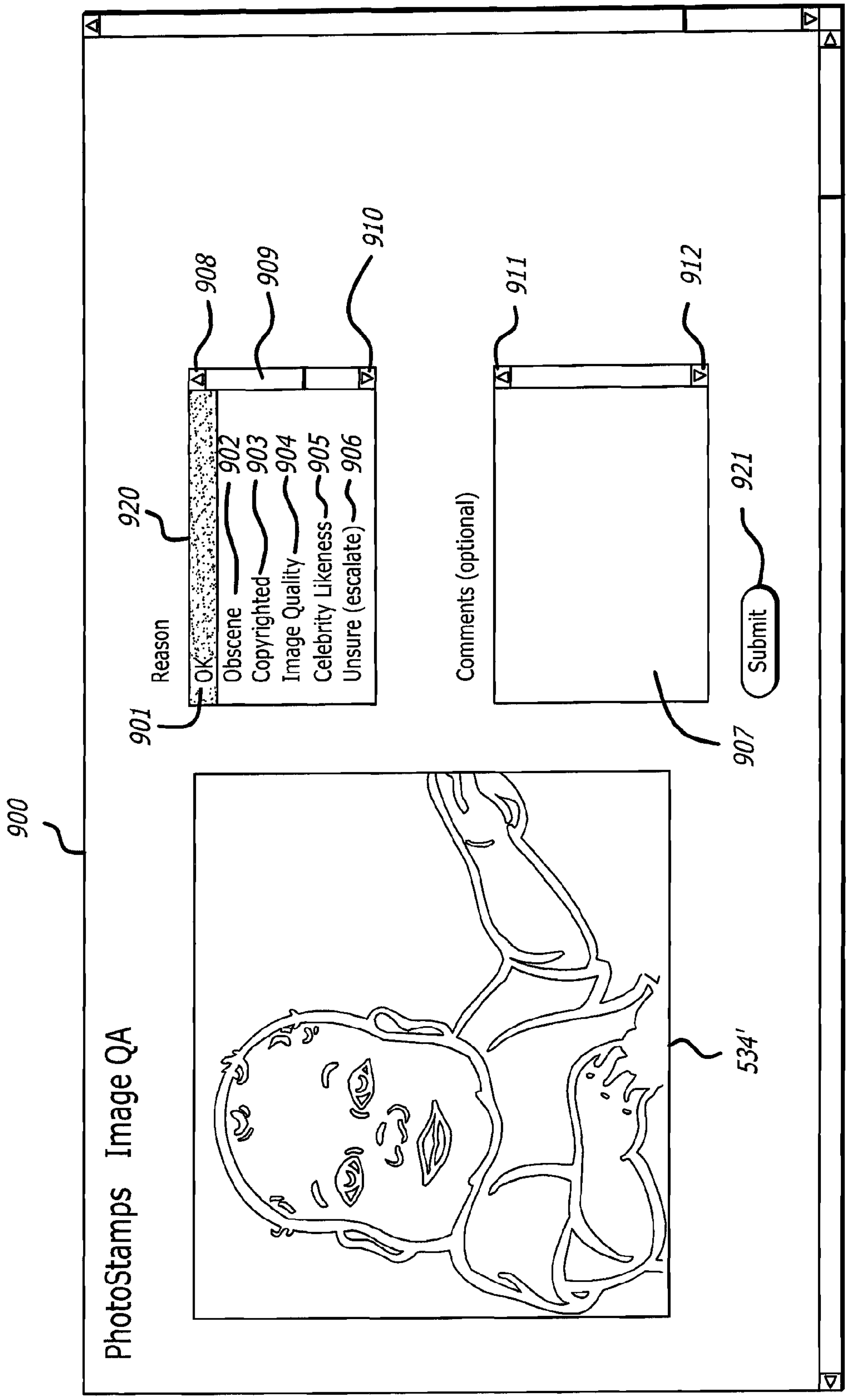
FIG. 13 is a graphic representation depicting a screen shot of an exemplary pre-print image quality assurance review screen in the exemplary embodiment of the present invention.

FIG. 13 is a graphic representation depicting a screen shot of an exemplary pre-print image quality assurance review screen 900 of the exemplary Inspector Admin Tool in the exemplary embodiment of the present invention. Once a user has submitted an order, the images will be submitted for pre-print quality assurance inspection/review by a pre-print quality assurance inspector/reviewer (who may also sometimes be referred to herein as a QA User). In the exemplary pre-print image quality assurance review screen 900, each ordered image, e.g., 534', will be presented to a pre-print quality assurance inspector/reviewer.

With reference to FIG. 2B, in the exemplary embodiment, ordered images will be queued sequentially by the image quality assurance server 1102 through a pre-print quality assurance interface 1104, referred to herein as the Inspector Admin Tool, for Quality Assurance inspector/reviewer action. A pre-print quality assurance inspector/reviewer will review user-ordered images, such as depicted in FIG. 13, and will assess the aesthetic and legal acceptance of an image. Each user's images will appear through the pre-print quality assurance interface 1104 in the exemplary pre-print image quality assurance review screen 900 depicted in FIG. 13, chronologically according to Order Number.

The first pre-print quality assurance inspector/reviewer to log in will receive the first image, in chronological Order Number order, available at that time, in the pre-print quality assurance queue (element 1103, FIG. 2B). As an image rises to the head of the pre-print quality assurance queue (element 1103, FIG. 2B), when a pre-print quality assurance inspector reviewer next logs in, or next disposes of a previous image, the next image will automatically be uploaded as the ordered image, e.g., 534', in the exemplary pre-print image quality assurance review screen 900 depicted in FIG. 13.

In the exemplary embodiment, non-supervisory inspectors/reviewers will not be able to choose from the pre-print quality assurance queue (element 1103, FIG. 2B), but will always receive the earliest order images for review. If an inspector/review does not complete an image review, the image will be released back into the pre-print quality assurance queue (element 1103, FIG. 2B). That is, each image must receive disposition before it will advance in the pre-print quality assurance queue (element 1103, FIG. 2B), making the next image in the queue available. It is possible for a pre-print quality assurance inspector/reviewer to escalate an image for supervisory review.

With reference to FIG. 13, a plurality of quality assurance reasons e.g., "OK" 901, Obscene 902, Copyrighted 903, Image Quality 904, or Celebrity Likeness 905, will be presented in a quality assurance reason selection window 920. A pre-print quality assurance inspector/reviewer will be able to highlight one of the quality assurance reasons in the quality assurance reason selection window 920 for the review either passing or failing the image. If the pre-print quality assurance inspector/reviewer selected "OK" 901 as the reason, the image would pass pre-print quality assurance review. If the pre-print quality assurance inspector/reviewer selected one of the other reasons (other than "OK"), e.g., Obscene 902, Copyrighted 903, Image Quality 904, or Celebrity Likeness 905, the image would fail pre-print quality assurance review.

The pre-print quality assurance reasons, e.g., 901 through 906, are illustrative and non-limiting; additional quality assurance reasons could be listed; a pre-print quality assurance inspector/reviewer would scroll through additional reasons using a window up key 908, down key 910, or tab 909.

The pre-print quality assurance inspector/reviewer would be able to input comments in the comment field 907, and would be able to scroll through the comments using a comment window up key 911 or down key 912. Once the pre-print quality assurance inspector/reviewer was satisfied with their assessment of the image 534', the pre-print quality assurance inspector/reviewer would click on the Submit button 921.

Clicking on the Submit button 921 would cause the next image in the pre-print quality assurance queue (element 1103, FIG. 2B) to be displayed to the pre-print quality assurance inspector/reviewer and would cause the quality assurance reason for the reviewed image to be submitted to the test function 260 (depicted in FIGS. 3A through 3C). In the exemplary embodiment, images could be escalated for supervisory action when a non-supervisory pre-print quality assurance inspector/reviewer is unsure as to its disposition; escalation for supervisor action would be accomplished by the pre-print quality assurance inspector/reviewer highlighting, the "unsure" reason 906 (FIG. 13). Escalation would not release the image back in to the pre-print quality assurance queue (element 1103, FIG. 2B). Subsequent image quality assurance disposition changes made by supervisory action would be recorded in the order database (element 50, FIGS. 3A through 3C).

In the exemplary embodiment, a QA Supervisor will, through a computer interface, assess the aesthetic and legal acceptance of an image escalated for supervisory review. A QA Supervisor may also review images previously reviewed but not escalated by non-supervisory QA users on a random or other basis. Access to the QA Supervisor interface will be determined by Windows user group roles. In the exemplary embodiment, the QA Supervisor interface will be identical to the QA User interface with differing underlying functionality. Images will be made available to the QA Supervisor interface through an escalation process. Images can be escalated due to a QA User being unsure as to its disposition or for other reasons including but not limited to review of rejected images. A QA Supervisor, through the supervisory role, will also be able to override the decision of a non-supervisor QA User. A QA Supervisor will be able to select an image for review and the QA Supervisor's selection will not being limited by an image queue. Accordingly, a decision on the disposition of a particular image can be deferred, if deferral is determined to be appropriate by a QA Supervisor.

In one alternative embodiment, each image will be separately and independently reviewed by two different non-supervisory pre-print quality assurance inspectors/reviewers (QA Users). Each independent non-supervisory pre-print quality assurance inspector/reviewer will indicate their assessment of an image. An image will not be considered to have passed quality assurance unless both non-supervisory pre-print quality assurance inspectors/reviewers approve the image, or unless a Supervisory QA User (also sometimes referred to herein as a QA supervisor, or as a QA supervisory user) approves the image.

In the exemplary embodiment, material considered to fall in a Critical category will be rejected from use with USPS postage; critical category material will include content that is considered harmful, illegal, or controversial. Exemplary critical category material quality assurance standards in the exemplary embodiment will include content with:

Any nudity;

Any woman wearing a low-cut top or very short skirt;

Any man wearing Speedos or other skin tight shorts;

Any child that appears to be two years old or older who is not wearing a shirt;

Any foreign language that the inspector cannot translate;

- Any profanity;
- Any rude, obscene or unrecognizable gestures;
- Anything sexually suggestive;
- Anything violent or that implies violence or accidental injury (fire, explosions, threats, weapons of any kind, etc.);
- Any postage stamp, meter mark, or indicia;
- Anything racist, sexist, or otherwise discriminatory;
- Anything supportive of illegal activities;
- Any religious or spiritual iconography that is the subject of the image;
- Anything slanderous or libelous; insulting text, or doctored to be insulting or compromising.

Material containing content that may be copyrighted material, that is not owned by the person who submits the image for print, will be considered to be in an "Intermediate" Material category. It can be very difficult to assess whether a person submitting an image owns the copyright. Therefore, in the exemplary embodiment, QA reviewers will only exclude images at the behest of a particular copyright owner.

With reference to FIGS. 3A through 3C, if, in test function 260, the image(s) of an order does not pass quality assurance review, then in function 261, the entire order will be designated in the order database 50 as rejected and cancelled (see also, element 1106, Rejected Images, FIG. 2B); in function 262, an email message (see elements 1107, and 1010, in FIG. 2B) will be generated (an email to a user will be generated by the Account Server 1008, FIG. 2B) to the email address of the respective user that submitted the order. The email, to be received 140 by the user, will contain notification of the rejection of the image and of cancellation of the order. Once email notification has been sent, the rejection procedure will end 263.

If, on the other hand, in test function 260, the image(s) pass quality assurance review, then, with reference to FIG. 2B, the approved image will be passed to the approved image processor 1110. With reference to FIG. 2B, the approved image processor 1110 will track all images for a particular order, and will detect when all images for a particular order have been inspected and approved by pre-print quality assurance. When all images for a particular order have been inspected and approved, the approved image processor 1110 will designate, e.g., via communications means 1111, on, e.g., the order database (element 50, FIGS. 3A through 3B), that the entire order has been inspected and approved by pre-print quality assurance.

With reference to FIGS. 3A through 3C, in function 270 (performed by the approved image processor 1110 depicted in FIG. 2B), when all images for an order have been approved, the order will be designated as approved on the order database 50 that will be used for order fulfillment.

It will be understood by someone with ordinary skill in the art that file and database architecture can be subject to many variations without departing from the spirit of the present invention. Accordingly, it will be understood by someone with ordinary skill in the art that description herein of information being saved to a particular file or database is exemplary, illustrative and non-limiting. Reference herein to any particular file or database will be understood to apply equally to any and all computer-readable media, whether now known or in the future discovered, including but not limited to: computer-readable storage media such as disk, CD, RAM and/or ROM memory of the particular computer that is performing the save or retrieve/read operation, or; RAM and/or ROM memory of any computer; or to a communication medium, whether now known or in the future discovered, such as, for example, a communication via an Internet communication, whether wireless, or otherwise. Further, the description herein of the exemplary embodiment "saving" information will be understood to apply equally to committing the information to storage or communication, including, for example, saving information to a file, a database, or any other type of representation of information, and/or communicating the information via, e.g., an Internet communication, whether wireless or otherwise.

It will be understood by someone with ordinary skill in the art that saving orders in the exemplary embodiment for fulfillment to an order database (element 50, FIGS. 3A through 3C) could facilitate batch processing. Batch processing, however, is not a limitation of the present invention. Rather, in the exemplary embodiment, orders on the order database 50 will be updated to reflect pre-print quality assurance approval or rejection of each order; fulfillment processing will constantly poll the order database 50 to detect approved orders not yet processed for fulfillment; in the exemplary embodiment, when an order is pulled for fulfillment processing, a status for the respective order will be updated to reflect that fulfillment processing is in-progress; once an order has been successfully printed and finally approved, packaged and shipped, the order status for the respective order in the order database 50 would be updated as complete.

Before describing processing of pre-print quality-assurance-passed orders, it is noted that, as will be understood by someone with ordinary skill in the art, alternative embodiments could provide alternative quality assurance processing. For example, in one alternative quality assurance processing embodiment, a database will be provided that contains images, or links to images, that are considered to fail quality assurance standards. Herein, this particular database will be referred to as the Bad Image Database.

As each user-ordered image is examined during pre-print quality assurance review, the Bad Image Database would be checked for the particular user-ordered image being reviewed. To determine whether or not a match exists between a particular user-ordered image and the images on the Bad Image Database, image search technology will be used. If a match is found between the user-ordered image being reviewed and an image on the Bad Image Database, the Quality Assurance user/reviewer would be alerted.

As will be understood by someone with ordinary skill in the art, any of various ways could be used to alert a Quality Assurance user/reviewer that a match has been identified between a user-ordered image being reviewed and an image on the Bad Image Database. For example, each user-ordered image (e.g., element 3100*a*, FIG. 24) being reviewed could be graphically presented, such as depicted (and described further below) with respect to FIGS. 24-26, in a graphic frame (e.g., element 3102*a*, FIG. 24). When no match has been identified between a user-ordered image being reviewed and an image on the Bad Image Database, the graphic frame could be white; when a match has been identified between a user-ordered image being reviewed and an image on the Bad Image Database, the graphic frame could be a bright color, such as, for example, red, and/or the graphic frame could, for example, be presented as flashing (e.g., on and off).

Figure 23:
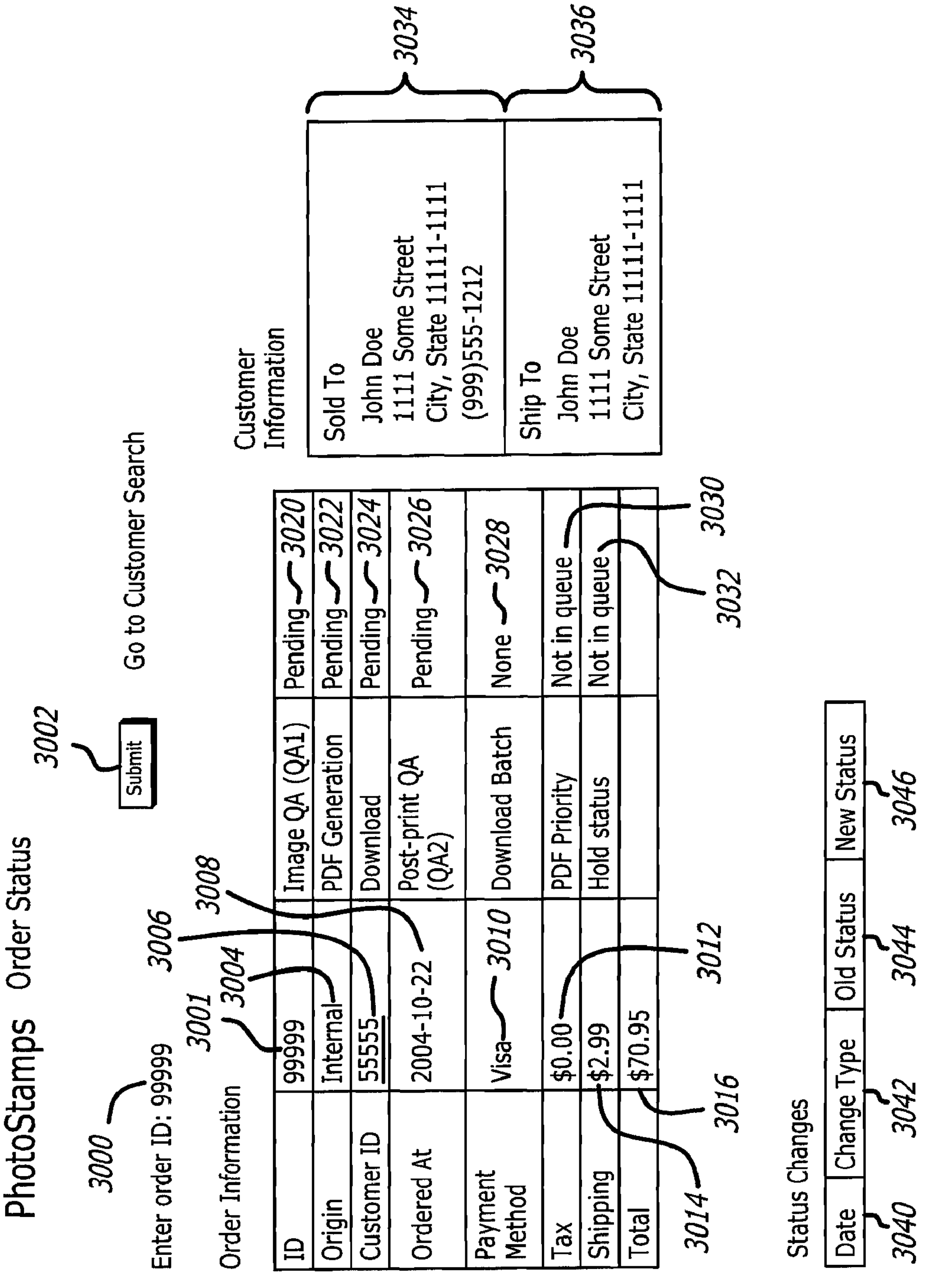
FIG. 23 is a graphic representation depicting a screen shot of a portion of an alternative exemplary pre-print image quality assurance order status screen in an alternative exemplary quality assurance processing embodiment of the present invention.

FIG. 23 is a graphic representation depicting a screen shot of a portion of an alternative exemplary pre-print image quality assurance ("QA") order status screen in an alternative exemplary quality assurance processing embodiment of the present invention. As depicted in FIG. 23, entry (by pressing a Submit button 3002) of an Order ID (element 3000, FIG. 23) would cause display of a set of information about that particular Order. The information displayed would include, for example: an Order ID (an identifier that uniquely (at least for some period of time) corresponds to the particular order) 3001; an Origin identifier (i.e., an identifier that categorizes the relationship of the user that placed the order with respect to the customized stamp provider organization, e.g., "Internal" would identify that the user placing the Order worked for the customized stamp provider) 3004; a Customer ID (an identifier that uniquely corresponds to the particular user/customer that placed the order) 3006; an Ordered At date 3008; a Payment Method (an indicator of a payment method used by the user to pay for the order, e.g., a credit or debit card identifier such as "Visa", etc.) 3010; a tax amount 3012; an amount for shipping the order 3014; a Total amount 3016; an Image QA status (that would, e.g., describe or denote the status of the order with respect to quality assurance processing, such as, for example, "Pending", "Complete", etc.) 3020; a PDF generation status (that would, e.g., describe or denote the status of the order with respect to generation of an image file) 3022; a download status (that would, e.g., describe or denote the order with respect to being downloaded for printing/fulfillment) 3024; a post-print QA status (that would, e.g., describe or denote the status of the order with respect to quality assurance inspection of the printed order) 3026; a download batch status (that would, e.g., describe or denote the status of the order with respect to a batch download for printing, if batch processing were used) 3028; a PDF priority (that would, e.g., describe or denote priority of the order for PDF generation) 3030; a Hold status (that would, e.g., describe or denote whether or not the order was on Hold) 3032; Sold To information (including, e.g., the name, address and telephone number of the user that paid for the order) 3034; and Ship To information (including, e.g., the name and address of the person or entity to whom/to which the order would be shipped) 3036. The Order Status screen display in this alternative exemplary embodiment would display on-screen status change buttons to allow the QA user to select order status information by date 3040, by change type 3042, for an old status 3044, or for a new status 3046.

The Customer ID 3006 displayed on the alternative exemplary pre-print image quality order status screen (FIG. 23) would be a link field—that is, the QA user could click on the Customer ID 3006 to navigate to a pre-print image quality assurance customer detail screen (see, e.g., FIG. 28) that will be described in more detail below.

Figure 24:
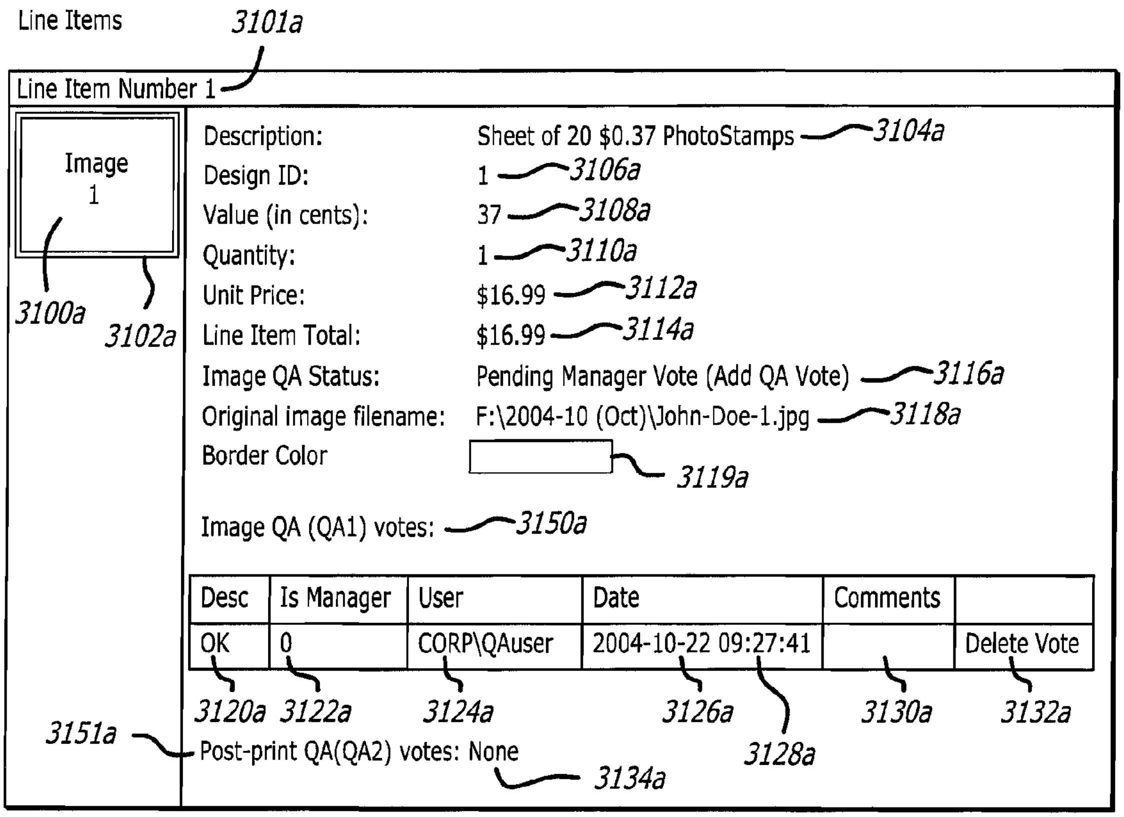
FIG. 24 is a graphic representation depicting a screen shot of a pre-print image quality assurance order line item portion for a first line item of a multi-line item order on an alternative exemplary pre-print image quality assurance order status screen in an alternative exemplary embodiment of the present invention.
Figure 25:
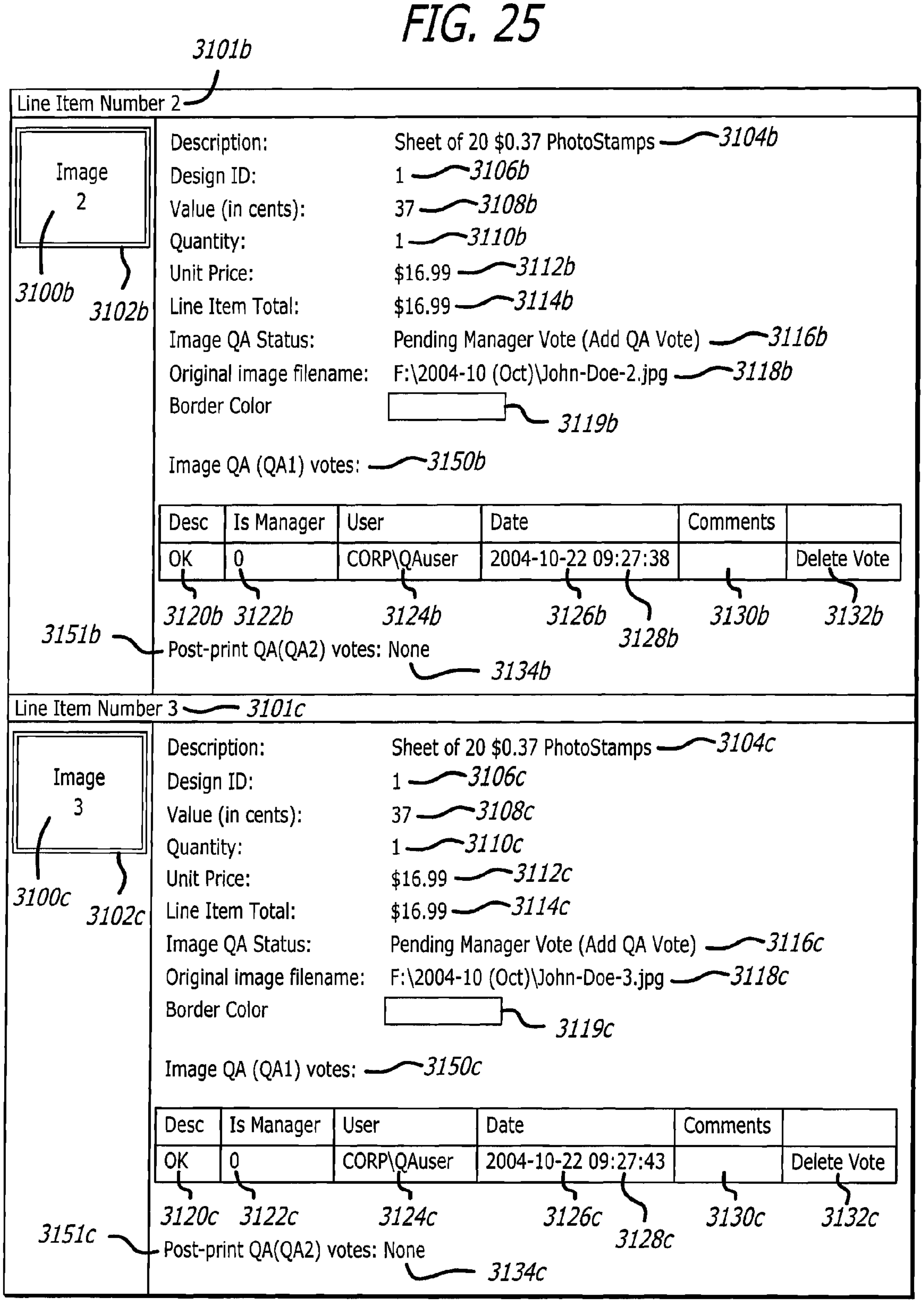
FIG. 25 is a graphic representation depicting a screen shot of a pre-print image quality assurance order line item portion for a second and third line item of a multi-line item order on an alternative exemplary pre-print image quality assurance order status screen in an alternative exemplary embodiment of the present invention.

Following the information described above with respect to FIG. 23, information about each line item in the respective order would be displayed. For example, FIG. 24 is a graphic representation depicting a screen shot of a pre-print image quality assurance order line item portion for a first line item of a multi-line item order on an alternative exemplary pre-print image quality assurance order status screen in an alternative exemplary embodiment of the present invention; FIG. 25 is a graphic representation depicting a screen shot of a pre-print image quality assurance order line item portion for a second and third line item of a multi-line item order on an alternative exemplary pre-print image quality assurance order status screen in an alternative exemplary embodiment of the present invention.

For each line item in an order, a line item number, e.g., 3101*a* (FIG. 24), 3101*b* and 3101*c* (FIG. 25), identifying the particular line item with respect to the particular order, would be displayed. For each line item in an order, an image, e.g., 3100*a* (FIG. 24), 3100*b* and 3100*c* (FIG. 25), corresponding to an image provided by the user that submitted the order, would be displayed. For each line item in an order, the image, e.g., 3100*a* (FIG. 24), 3100*b* and 3100*c* (FIG. 25), corresponding to the line item, would be presented with a respective graphical frame, e.g., 3102*a* (FIG. 24), 3102*b* and 3102*c* (FIG. 25).

For each line item in an order, a description, e.g., 3104*a* (FIG. 24), 3104*b* and 3104*c* (FIG. 25) describing the postage ordered in the respective line item, would be displayed. For each line item in an order, a Design ID, e.g., 3106*a* (FIG. 24), 3106*b* and 3106*c* (FIG. 25), identifying a particular design, e.g., of a template of blank customized postage labels, would be displayed. For example, a first particular Design ID could be assigned to a first sheet template of customized postage labels, wherein each label on such a first sheet template would have a first set of dimensions and each sheet of labels with the first particular Design ID would have a first number of labels, in a first arrangement of those labels, on the sheet; a second particular Design ID could be assigned to a second sheet template of customized postage labels, wherein each label on such a second sheet template would have a second set of dimensions and each sheet of labels with the second particular Design ID would have a second number of labels, in a second arrangement of those labels, on the sheet.

For each line item in an order, a value (e.g., in cents), e.g., 3108*a* (FIG. 24), 3108*b* and 3108*c* (FIG. 25), for each postage-indicia-bearing customized postage item to be printed on a sheet, would be displayed. For each line item in an order, a quantity (e.g., of the number of sheets), e.g., 3110*a* (FIG. 24), 3110*b* and 3110*c* (FIG. 25), describing the quantity ordered for the particular line item, would be displayed. For each line item in an order, a Unit Price, e.g., 3112*a* (FIG. 24), 3112*b* and 3112*c* (FIG. 25), corresponding to the total price for, e.g., each sheet ordered in the particular line item, would be displayed. For each line item in an order, a Line Item Total price, e.g., 3114*a* (FIG. 24), 3114*b* and 3114*c* (FIG. 25), describing the total price for all units ordered for the particular line item, would be displayed. For each line item in an order, an Image QA Status, e.g., 3116*a* (FIG. 24), 3116*b* and 3116*c* (FIG. 25) describing the status of QA review for the particular image (3100*a* (FIG. 24), 3100*b* and 3100*c* (FIG. 25)) corresponding to the particular line item, would be displayed.

For each line item in an order, an Original image filename, e.g., 3118*a* (FIG. 24), 3118*b* and 3118*c* (FIG. 25), identifying a name of a file in which the particular image (e.g., 3100*a* (FIG. 24), 3100*b* and 3100*c* (FIG. 25)) corresponding to the particular line item, would be displayed. For each line item in an order, a Border Color, e.g., 3119*a* (FIG. 24), 3119*b* and 3119*c* (FIG. 25), as selected by the ordering user, would be displayed.

For each line item in an order, any Image QA (QA1) votes 3150*a* (FIG. 24; elements 3150*b* and 3150*c* in FIG. 25) (e.g., 3120*a*-3132*a* (FIG. 24), 3120*b*-3132*b* and 3120*c*-3132*c* (FIG. 25)), that had been provided by any pre-print QA user (or supervisor) regarding the particular image (e.g., 3100*a* (FIG. 24), 3100*b* and 3100*c* (FIG. 25)) corresponding to the particular line item, would be displayed.

QA1 is sometimes used herein to refer to pre-print quality assurance/review. QA2 is sometimes used herein to refer to post-print quality assurance review.

The description below of the content (e.g., 3120*a*-3132*a* (FIG. 24), 3120*b*-3132*b* and 3120*c*-3132*c* (FIG. 25)), of pre-print Image QA (QA1) votes 3150*a* (FIG. 24; elements 3150*b* and 3150*c* in FIG. 25) would apply similarly to content of post-print QA (QA2) votes 3151*a* (FIG. 24; elements 3151*b* and 3151*c* in FIG. 25), in the event that any post-print votes had been entered. In FIG. 24, None 3134*a*, (and in FIG. 25, None 3134*b* and None 3134*c*) indicates that no post-print quality assurance/review votes have yet been entered for the order.

Each exemplary display of an Image QA (QA1) vote would comprise, e.g., a vote reason description (e.g., 3120*a* (FIG. 24), 3120*b* and 3120*c* (FIG. 25)), corresponding to a result of a particular QA user's review of the particular image (e.g., 3100*a* (FIG. 24), 3100*b* and 3100*c* (FIG. 25)). Each exemplary display of an Image QA vote would further comprise, e.g., an indicator (e.g., 3122*a* (FIG. 24), 3122*b* and 3122*c* (FIG. 25)) as to whether or not the QA user that submitted the particular vote is a manager or not (e.g., 1—Yes; 0—No). Each exemplary display of an Image QA vote would further comprise, e.g., a QA User identifier (e.g., 3124*a* (FIG. 24), 3124*b* and 3124*c* (FIG. 25)) identifying the QA user that submitted the particular vote. Each exemplary display of an Image QA vote would further comprise, e.g., a Date and Time (e.g., 3126*a*-3128*a* (FIG. 24), 3126*b*-3128*b* and 3126*c*-3128*c* (FIG. 25)) identifying the date and time that the QA user submitted the particular vote. Each exemplary display of an Image QA vote would further comprise, e.g., a Comment section (e.g., 3130*a* (FIG. 24), 3130*b* and 3130*c* (FIG. 25)) displaying any comments input by the QA user that submitted the particular vote. Each exemplary display of an Image QA vote would further comprise, e.g., a Delete Vote option (e.g., 3132*a* (FIG. 24), 3132*b* and 3132*c* (FIG. 25)) that, if clicked by an authorized QA user, (such as a supervisory QA user), would cause the particular vote to be deleted.

For an order to pass QA review, each image in the order must pass QA review. For an image to pass QA review, it must be reviewed by a QA user, or as mentioned above, depending on the embodiment, possibly by multiple QA users, and receive a passing vote from each QA user. If an image received a failing vote from one or more QA users, the failing vote could be overridden by a QA supervisory user. For example, a QA supervisory user could choose the Delete Vote option (e.g., element 3132*b*, FIG. 25) to delete a particular vote. In order to review a particular image, a QA user accessing an Order Status screen, as depicted e.g., in FIGS. 23-25, would click on the particular image, e.g., Image 2 (element 3100*b*, FIG. 25). Clicking on, e.g., Image 2 (element 3100*b*) in FIG. 25, would cause display of a pre-print image quality assurance manager queue image reason screen as depicted in FIG. 26.

Figure 26:
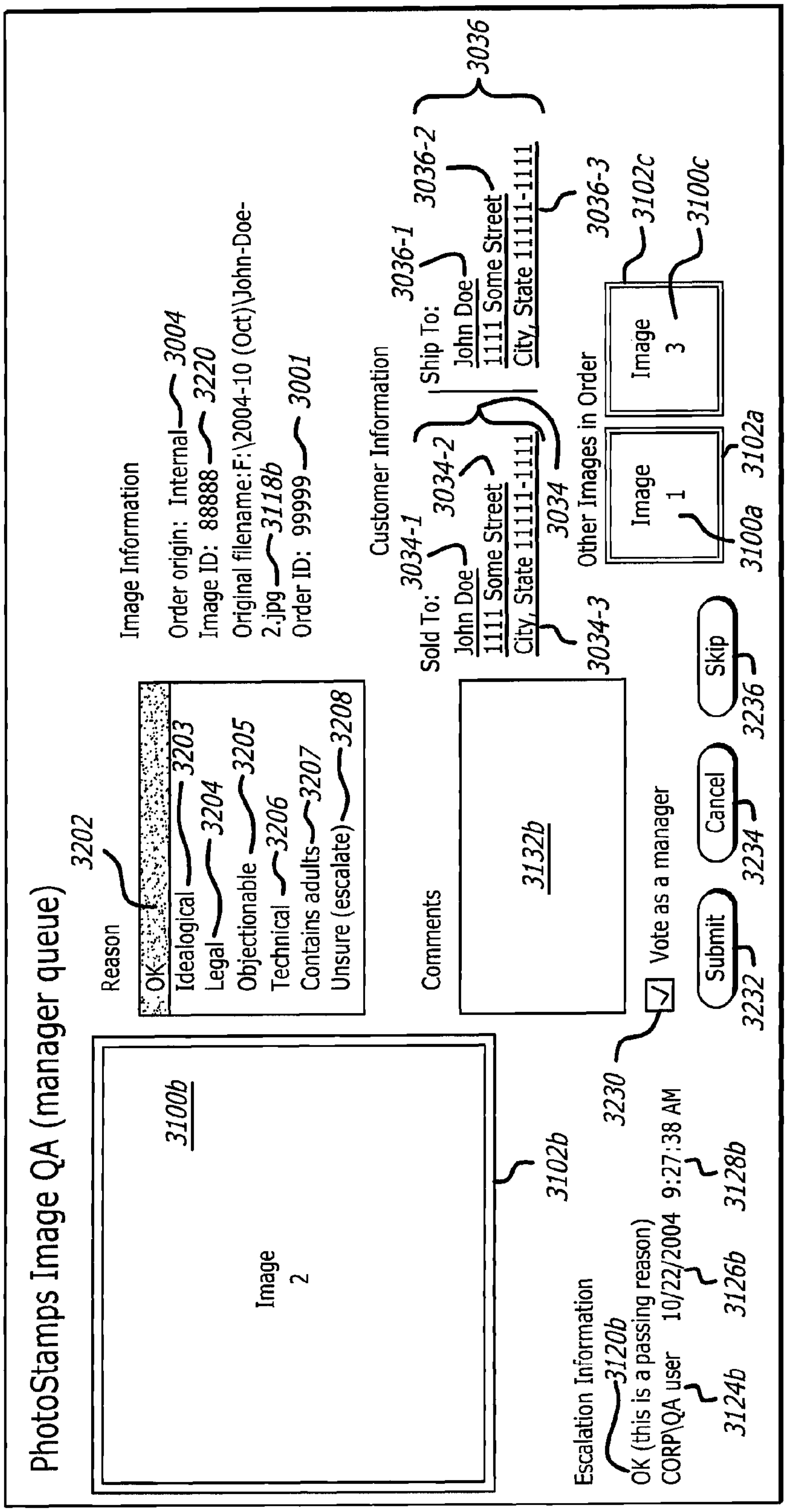
FIG. 26 is a graphic representation depicting a screen shot of a pre-print image quality assurance manager queue image reason screen in an alternative exemplary quality assurance processing embodiment of the present invention.

As depicted in FIG. 26, the particular image being reviewed, in the case depicted, Image 2, element 3100*b*, is displayed in a graphic frame 3102*b*. At least one QA review Reason, e.g., OK 3202, Ideological 3203, Legal 3204, Objectionable 3205, Technical 3206, Contains adult [material] 3207, Unsure (escalate) 3208 would be displayed. A QA user would highlight one of the Reasons to submit a vote. Highlighting the OK reason 3202 would pass the image 3100*b*. Highlighting any of reasons 3203-3207, would cause the image, e.g., image 3100*b*, to fail QA review. Highlighting reason 3208 would cause the image being reviewed, e.g., image 3100*b*, to be queued for management review. Highlighting any of reasons 3202-3208, and then clicking on the Submit button 3232, would cause the particular QA reason highlighted to be displayed as a vote reason description, e.g., 3120*b*; would cause the particular QA user's identifier, e.g., 3124*b*, to be displayed in a field associated with the particular QA reason selected (e.g., 3120*b*); and would cause a date (e.g., 3126*b*) and time (e.g., 3128*b*) that the vote was submitted, to be displayed. Before clicking the Submit button 3232, the QA user could enter comments, e.g., 3132*b*. Before clicking the Submit button 3232, the QA user could check the "Vote as a manager" field 3230. During the QA user's review of the image being reviewed, e.g., Image 2 (element 3100*b*), any other images (e.g., Image 1 (element 3100*a*), and Image 3 (element 3100*c*)) and the respective graphical frames (e.g., 3102*a* and 3102*c*) in the particular Order (3001) would be displayed. A QA user would be able to cancel the vote by clicking on the Cancel button 3234 or could skip voting on the particular image being reviewed by clicking the Skip button 3236.

As depicted in FIG. 26, the exemplary pre-print image quality assurance manager queue image reason screen would display the Order origin identifier 3004, an Image ID 3220, the original filename, e.g., 3118*b*, and an Order ID 3001, corresponding to the order, corresponding to the particular image, e.g., 3100*b*, being reviewed.

The exemplary pre-print image quality assurance manager queue image reason screen depicted in FIG. 26 would provide Sold to information 3034 and Ship to information 3036. The exemplary pre-print image quality assurance manager queue image reason screen depicted in FIG. 26 would provide a linked field displaying the name 3034-1 of the purchasing user. Clicking on the purchasing user name 3034-1 would cause the system to navigate to a search engine, such as, for example, GOOGLE™, and search for information regarding the particular name. A search for information regarding the purchasing user name 3034-1 would be provided to allow a QA user to investigate any news regarding that particular user that might be relevant to QA review.

The exemplary pre-print image quality assurance manager queue image reason screen depicted in FIG. 26 would similarly provide a linked field displaying the purchaser's address 3034-2 and city/state/zip code 3034-3 of the purchasing user. Clicking on the purchaser's address 3034-2 or city/state/zip code 3034-3 would cause the system to navigate to a search engine, such as, for example, GOOGLE™, and search for information regarding the purchaser's address 3034-2 or city/state/zip code 3034-3. A search for information regarding the purchaser's address 3034-2 and/or city/state/zip code 3034-3 would be provided to allow a QA user to investigate any news regarding that particular address 3034-2 and/or city/state/zip code 3034-3 that might be relevant to QA review.

The exemplary pre-print image quality assurance manager queue image reason screen depicted in FIG. 26 would provide a linked field displaying the name 3036-1 of the party to whom the order would be shipped. Clicking on the Ship To name 3036-1 would cause the system to navigate to a search engine, such as, for example, GOOGLE™, and to search for information related to the particular name. A search for information related to the Ship To name 3036-1 would be provided to allow a QA user to investigate any news regarding that particular Ship To name that might be relevant to QA review.

The exemplary pre-print image quality assurance manager queue image reason screen depicted in FIG. 26 would similarly provide a linked field displaying the ship to address 3036-2 and city/state/zip code 3036-3. Clicking on the ship to address 3036-2 or city/state/zip code 3036-3 would cause the system to navigate to a search engine, such as, for example, GOOGLE™, and to search for information related to the Ship to address 3036-2 or city/state/zip code 3036-3. A search for information related to the Ship to address 3036-2 and/or city/state/zip code 3036-3 would be provided to allow a QA user to investigate any news regarding that particular address 3036-2 and/or city/state/zip code 3036-3 that might be relevant to QA review.

FIG. 27 is a graphic representation depicting a screen shot of a pre-print image quality assurance manager queue summary screen in an alternative exemplary quality assurance processing embodiment of the present invention. As depicted in FIG. 27, a report is provided giving a count 3300 for each status description 3302. Exemplary status descriptions would include, e.g., orders Pending image review (QA1 indicates the first (pre-print) QA process) 3306 (with a corresponding count 3304); orders that failed (QA1) image review 3310 (with a corresponding count 3308; images pending normal (QA1) review 3314 (with a corresponding count 3312); images pending (QA1) manager review 3318 (with a corresponding count 3316); images that have passed QA1 review 3322 (with a corresponding count 3322); images that have failed QA1 review 3326 (with a corresponding count 3320); orders pending PDF generation 3330 (with a corresponding count 3328); orders pending downloading/printing 3334 (with a corresponding count 3332); orders [that have been printed] pending post-print QA (referred to as QA2) review 3338 (with a corresponding count 3336); orders that have passed post-print QA review 3342 (with a corresponding count 3340); and orders that have failed post-print QA review 3346 (with a corresponding count 3344).

It will be understood by someone with ordinary skill in the art that the above-identified statuses are exemplary and non-limiting. Further, it will be understood by someone with ordinary skill in the art that the alternative exemplary QA embodiment of the present invention described above with respect to, e.g., FIG. 27, would be programmed to identify each status for each order and accumulate and report each such status 3302 and the corresponding count 3300.

Figure 28:
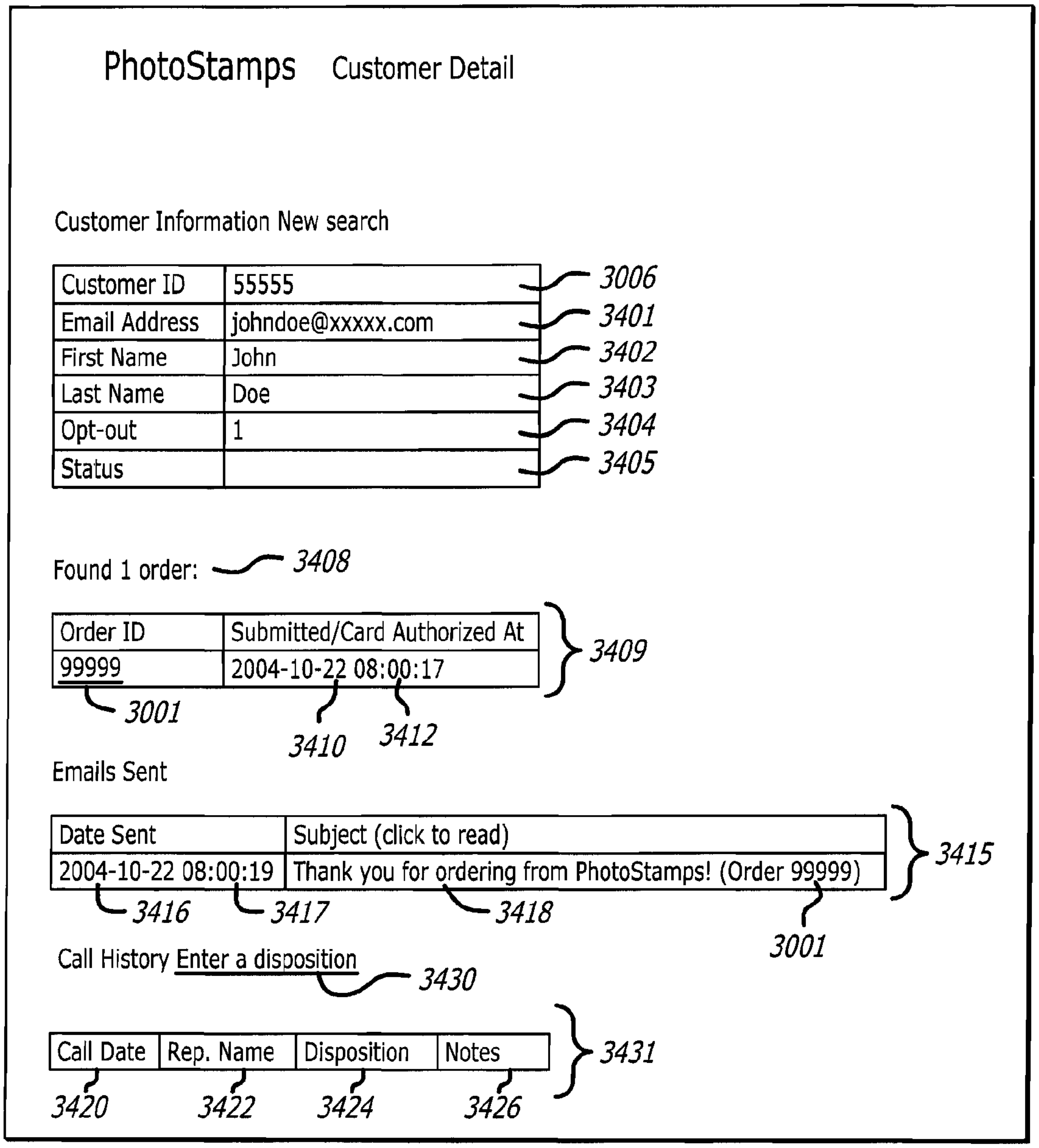
FIG. 28 is a graphic representation depicting a screen shot of a pre-print image quality assurance customer detail screen in an alternative exemplary quality assurance processing embodiment of the present invention.

As previously mentioned above, a QA user could obtain detailed customer information about a particular customer, e.g., customer 3006, by clicking on the Customer ID 3006 field depicted in FIG. 23 to navigate to a pre-print image quality assurance customer detail screen (such as is depicted, e.g., in FIG. 28).

With reference to FIG. 28, a pre-print image quality assurance customer detail screen would display a Customer ID 3006 corresponding to the particular customer user. In addition, an email address 3401, a first name 3402, a last name 3403, an "opt-out" field 3404, and a status field 3405 would be displayed. A number of orders found 3408 would be displayed. Each order, e.g., 3001, submitted by the particular customer ID (3006) would be reported. For each order, e.g., 3001, reported, a date 3410 and time 3412 corresponding to the date and time that the order was submitted would be displayed. Emails sent to the particular user corresponding to the Customer ID 3006 would be displayed; each email would be reported with a date 3416 and time 3417 that the email was sent, and would report a brief subject description 3418 that would include an identifier of the corresponding order 3001.

Continuing with reference to FIG. 28, the QA user reviewing the pre-print image quality assurance customer detail screen would be able to click on an email listed, e.g., by clicking on the subject description 3418, in order to navigate to a display of text that was contained in the relevant email.

Continuing with reference to FIG. 28, information including, e.g., a Call Date 3420, a Representative's Name 3422, a Disposition 3424, and Notes 3426 would be presented for each call, in the event that any calls had been, by a representative of provider of the customized postage to the respective customer. A provider representative would also be able to input a Call History line item, e.g., 3431, via the Customer Detail screen depicted in FIG. 28, e.g., by clicking on the Enter a disposition link 3430.

FIG. 29 is a graphic representation depicting an electronic mail ("email") message, in an alternative exemplary quality assurance processing embodiment of the present invention, to a user (email address 3401, corresponding to a particular user with a particular customer ID 3006, as was displayed in FIG. 28), notifying the user that one or more images in the user's order were rejected due to quality assurance reasons. As depicted in FIG. 29, a QA fail email would be addressed to a particular user's corresponding email address 3401, and would address the user by the user's first name 3402.

Returning with reference to FIG. 28, a QA user viewing a pre-print image quality assurance customer detail screen would be able to click on an order ID 3001, in either the Found Order list 3409, or in the emails sent list 3415; doing so would allow the QA user to navigate to the pre-print image quality assurance order status screen such as depicted in FIGS. 23-25 corresponding to the order ID 3001.

Returning with reference to the exemplary embodiment, and with reference to FIGS. 3A through 3C, the order database 50 will be processed periodically, for example, at a certain time, or certain times, each day. In alternative embodiments, other types of order fulfillment approaches could be used.

With reference to FIGS. 3A through 3C, processing pre-print quality-assurance-passed orders on the order database 50 will begin as depicted in function 280 by creating an image of a sheet, of each customized postage label ordered by the respective user. Creating an image of a sheet of a particular customized postage label as depicted in function 280 will be described in detail below with reference to FIG. 14A, and will involve generating machine-readable postage indicia for each postage label on a sheet and then injecting the respective machine-readable postage indicia into each individual customized postage label image on the sheet. In the exemplary embodiment, images of sheets of postage labels are created in PDF format.

Figure 14A:
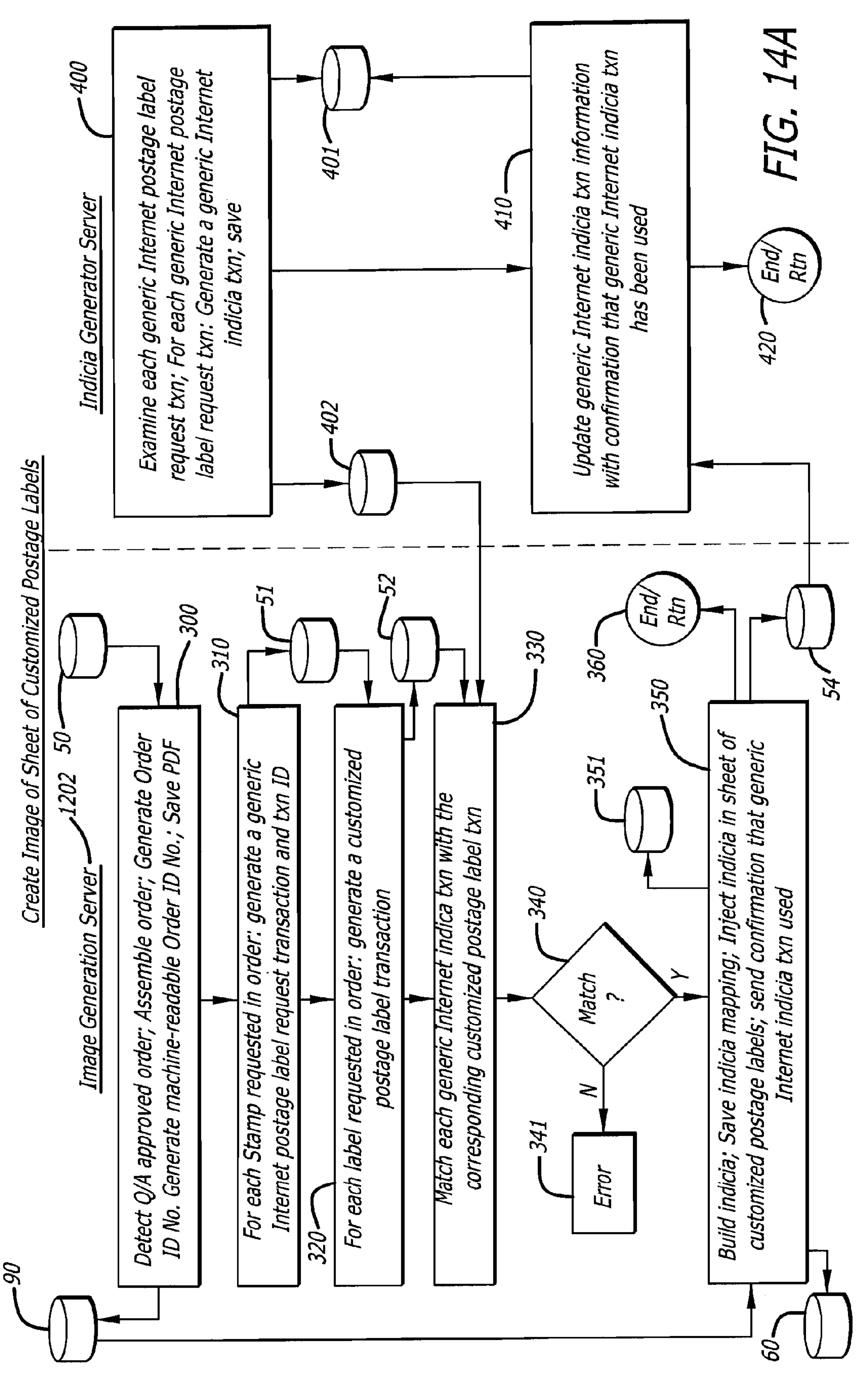
FIG. 14A is a high-level flow diagram depicting exemplary high-level logic functions for creating an image of customized postage labels in an exemplary embodiment of the present invention.

FIG. 14A is a high-level flow diagram depicting exemplary high-level logic functions for creating an image of a sheet of customized postage labels in an exemplary embodiment of the present invention. The exemplary high-level logic functions depicted in FIG. 14A are a more detailed exemplary view of function 280 depicted in FIGS. 3A through 3C. Functions depicted on the left side of FIG. 14A (functions 300, 310, 320, 330, 340, 341, 350 and 360) would be performed in the exemplary embodiment by software executing on an image generation server (element 1202, image generation server, depicted in FIG. 2B). Functions depicted on the right side of FIG. 14A (functions 400, 410 and 420) would be performed in the exemplary embodiment by software executing on a generic Internet postage server (element 1203, generic Internet postage server, FIG. 2B).

With reference to FIG. 2B, although image generation server 1202 is described herein in the singular, in the exemplary embodiment, multiple image generation servers will be employed, some or all of which could operate virtually simultaneously.

In the exemplary embodiment, each image generation server 1202 will execute a "modified client" generic Internet postage software application. That is, each image generation server 1202 will act as a modified generic Internet postage client device.

U.S. patent application Ser. No. 09/975,532 entitled "SYSTEM AND METHOD FOR PROVIDING COMPUTER-BASED POSTAGE STAMPS" (sometimes referred to herein as the "Generic VBI Invention"), the contents and disclosures of which have been previously incorporated in full herein, describes client interaction with a generic Internet postage server, and describes in detail, the generation of generic Internet postage indicia. As described in Generic VBI Invention specification, each user client computer device would have client software installed to facilitate generic Internet postage; each user client would typically have associated with it an Ascending Register and a Descending Register to track the amount of funding provided and available for use in purchasing postage.

In the exemplary embodiment of the present invention, and as compared to client software installed on and being operable on each respective user client computer device, a "modified" version of the generic Internet postage client software application would be operable on each image generation server 1202—this "modified" version of the generic Internet postage client software is referred to herein as a "modified client". As opposed to being operable on each user client device to facilitate requests via each respective user client device for generic Internet postage, in the exemplary embodiment of the present invention, the respective "modified client" is operable on each respective image generation server 1202; each respective "modified client" would issue requests for generic Internet postage.

Accordingly, it will be understood by someone with ordinary skill in the art that reference herein to a "modified client" generic Internet postage software application is distinguished from client software as previously described above that is operable on each respective user client device.

In the exemplary embodiment of the present invention, a respective "modified client" (element 1209, FIG. 2B) is operable on each respective image generation server 1202. With reference to FIG. 14A, in the exemplary embodiment of the present invention, software operable on each respective image generation server 1202 would provide image generation server functions 300, 320, 330, 340 and 350, each of which is described in some detail below.

In the exemplary embodiment, software executing on the exemplary image generation server would log in to a generic Internet Postage account once per session.

As depicted in FIG. 14A, quality-assurance-passed orders on the order database 50 will be detected by software executing on the image generation server as depicted in image generation server (or simply, the image server) function 300; as such orders are detected, as previously mentioned above, a status in the entry for the order will be marked to indicate that fulfillment processing is in-progress.

In the exemplary embodiment, in exemplary image server function 300, the software executing on the exemplary image generation server would assemble an image of a sheet of customized postage labels for each image (element 601, FIG. 8) ordered by the customer. In the exemplary embodiment, the exemplary image server function 300 would assemble a number of sheets of customized postage labels that correspond to the user's specification of quantity (see element 605, FIG. 8) for the corresponding image (element 601, FIG. 8).

In the exemplary embodiment, customized postage label features associated with an order are represented in PDF format. Therefore, in the exemplary embodiment, the assembly in exemplary image server function 300 by the image generation server (element 1202, depicted in FIG. 2B) involves assembling multiple PDF-represented features for a particular postage label. For example, each customized postage label would be represented by a PDF-representation of the customized border image; a PDF-representation of the customized image uploaded by the user; a customized image of a postage amount; and the like. In the exemplary embodiment, software executing on the image generation server (element 1202, depicted in FIG. 2B) assembles a PDF-formatted representation of each image for which a customized postage label has been ordered, and assembles an image of a sheet of postage labels for each sheet indicated in the order (according to the user's specification of quantity (see element 605, FIG. 8) for the corresponding image (element 601, FIG. 8)).

It will be understood by someone with ordinary skill in the art that reference herein to a server, such as a reference to the image generation server, or to a function [of a server], performing a particular action will be understood to mean that software executing on that server, such as software executing on the image generation server, performs the particular action.

Continuing with reference to function 280 in FIGS. 3A through 3B, as the image generation server (element 1202, depicted in FIG. 2B) assembles an image of a sheet of a particular customized postage label, the image generation server (element 1202, depicted in FIG. 2B) would generate an Order ID (identification) number that uniquely identifies each sheet of postage labels and correlates to the Order number.

The image generation server (element 1202, depicted in FIG. 2B) would generate an Order ID number by using the Order number associated with the order, an actual image number within an order (1 for the first image in an order; 2 for the second image in an order; etc.), a relative sheet number (0 for the first sheet; 1 for the second sheet, 2 for the third sheet, etc.) within a quantity of shoots ordered for a particular image, an actual sheet number within a total number of sheets for the particular order, and the total number of sheets for the particular order. For example, in an order assigned order number "XXX" in which the user ordered a quantity of two (2) for image A and a quantity of three (3) for image B, the order ID number for the first sheet of customized Image A postage labels would be assigned as XXX-1-0; 1 of 5 (order number XXX; 1 for the first image; 0 for the first relative sheet of 2 sheets of image A; sheet 1 of 5 total sheets of customized postage labels). The second sheet of customized Image A postage labels would be assigned as XXX-1-1; 2 of 5 (order number XXX; 1 for the first image; 1 for the second relative sheet of 2 sheets of image A; sheet 2 of 5 total sheets of customized postage labels). The first sheet of customized Image B postage labels would be assigned as XXX-2-0; 3 of 5 (order number) XXX; 2 for the second image; 0 for the first relative sheet of 3 sheets of image B; sheet 3 of 5 total sheets of customized postage labels. Similarly, the second and third sheets of customized Image B postage labels would be assigned as XXX-2-1; 4 of 5, and XXX-2-2; 5 of 5, respectively.

As will be described further below, this Order ID number will be printed, both in human readable text and as a scannable barcode (a machine readable representation of the Order ID number), on the corresponding sheet of printed customized postage labels. The printing of the Order ID number on each sheet of printed customized postage labels will facilitate bundling of all printed sheets for an order for final shipment to the recipient designated by the user.

With reference to FIG. 2B, residing on the image server is a barcode module 1210. With reference to image generation server function 300 in FIG. 14A, once an Order ID number has been generated by the customized postage label image generation server 1202 (also sometimes referred to herein as simply, the "image generation server 1202" or as "image server 1202"), the barcode module would be called to generate a machine-readable representation, such as a barcode, to represent the respective Order ID number. Both the Order ID number and the corresponding machine-readable representation of the Order ID number, such as a barcode, would be injected into the PDF-formatted representation of the corresponding sheet of customized postage labels. When all of the sheets for an order have been assembled, each PDF-formatted sheet representation would then be saved as a PDF-formatted representation of a sheet of customized postage labels on a computer-readable storage medium, such as e.g., order image database 90 (FIG. 14A).

It will be understood by someone with ordinary skill in the art that reference herein to a file or a database is non-limiting and is an exemplary description of a computer-readable storage medium.

With reference to FIG. 14A, in image generation server function 310, for each individual postage label in an order (in the exemplary embodiment, there will be twenty (20) individual postage labels on each sheet), a generic Internet postage label request transaction 51 will be generated by the modified client; each generic Internet postage label request transaction 51 will be uniquely identified by a unique generic Internet postage label request transaction ID.

In the exemplary embodiment, each generic Internet postage label request transaction generated in image generation server function (element 310 in FIG. 14A) will appear to the generic Internet postage server 1203 (FIG. 2B) as a request by a client for generic Internet postage. Communications 1205 (FIG. 2B) between the image generation server 1202 (FIG. 2B) and the generic Internet postage server 1203 (FIG. 2B) will be according to HTTPS protocol.

Further, in contrast to the typical association as described in the Generic VBI Invention of an individual Ascending Register (AR) and a Descending Register (DR) with each user client, in the exemplary embodiment of the present invention, a respective general AR and a respective general DR will be associated with, and available to, each of the respective "modified clients" resident and executing on the respective image generation server(s) 1202.

With reference to FIG. 14A, generic Internet postage server 1203 (also shown as element 1203, FIG. 2B) would provide functionality described below regarding generic Internet postage server functions 400 and 410.

In generic Internet postage server function 400, each generic Internet postage label request transaction 51 will be examined, and for each generic Internet postage label request transaction 51, a generic Internet indicia transaction 402 will be generated. Each generic Internet indicia transaction 402 will comprise a representation of full, digitally-signed, generic Internet postage indicia. In one embodiment, the representation of the full, digitally-signed, generic Internet postage indicia generated could comprise a representation of machine-readable information, such as a representation of a 2D barcode; in the exemplary embodiment, however, the representation of the generated full, digitally-signed, generic Internet postage indicia will comprise data fields that will later be used to generate a machine-readable 2-D barcode.

It will be understood by someone with ordinary skill in the art that full, digitally signed, generic Internet postage indicia may comprise a number of elements, including, for example: an Indicia Version Number (a version number assigned by the USPS to the indicia data set), an Algorithm identifier (that identifies the digital signature algorithm used to create the digital signature in the indicium), a Certificate Serial Number (that represents the unique serial number of the PSD ("Postal Security Device") certificate issued by the IBIP Certificate Authority), a Device identifier PSD Manufacturer identifier (a USPS-assigned identifier for each provider), a Device identifier Model identifier (a provider's model number for the PSD), Device Identifier PSD Serial Number (a provider-assigned serial number for the PSD), Ascending Register (total monetary value of all indicia ever produced during the life cycle of the PSD), Postage (amount of postage for the particular mail piece or postage label), Date of Creation, Registration Post Office City State and Zip code, unique postage label identifier (such as a serial number), Software identifier (host system software identification number), Descending register (the postage value remaining on the PSD after the amount of the postage for the particular postage label has been deducted), rate category (a postage class and rate), a digital signature, and other fields.

For each generated generic Internet indicia transaction, function 400 will save on database 401 information about the generated generic Internet indicia transaction 402, including the unique generic Internet postage label request transaction ID that was associated with the generic Internet postage label request transaction that triggered function 400 to generate the generic Internet indicia transaction 402. In the exemplary embodiment, generic Internet indicia transaction 402 will comprise a unique serial number comprising a master serial number corresponding to a sheet of postage labels, a minor serial number extension that will uniquely identify each postage label on the sheet, a meter number, and Ascending Register information, and other data fields mentioned above regarding full, digitally-signed generic Internet postage indicia; in the exemplary embodiment, the unique serial number will be saved as, and will serve as, a key in database 401 to the generated full, digitally-signed, generic Internet postage indicia.

It will be understood by someone with ordinary skill in the art that in an alternative embodiment, that rather than transaction 402 comprising full, digitally-signed, generic Internet postage indicia, a transaction 402 could be created that would comprise a derivative of the full, digitally-signed, generic postage indicia.

Returning with reference to the exemplary embodiment, in image generation server function 320, for each postage label requested in an order, a customized postage label transaction 52 will be generated. In the exemplary embodiment, the number of postage labels in an order would be equal to the total of twenty postage labels (because there are twenty postage labels per sheet in the exemplary embodiment) times the quantity (element 605, FIG. 6) designated by the user. Each customized postage label transaction 52 will comprise the Order ID number for the particular PDF-formatted representation of the sheet with which the particular customized postage label is associated, a respective unique generic Internet postage label request transaction ID, and a mapping to a respective position in the respective PDF-formatted representation of the sheet of customized postage labels.

In image generation server function 330, each generic Internet indicia transaction 402 will be matched with the corresponding customized postage label transaction 52.

It will be understood by someone with ordinary skill in the art that generic Internet indicia transactions 402 and customized postage label transactions 52 may be saved on separate files, or on the same file, or be otherwise communicated, for access by subsequent functions.

If a match is detected in image generation server test function 340 between a generic Internet indicia transaction 402 and a corresponding customized postage label transaction 52, then image server function 350 will then build a derivative of the full, digitally-signed generic Internet postage indicia contained in generic Internet indicia transaction 402. Exemplary derivative postage indicia for the corresponding customized postage label in the exemplary embodiment of the present invention will comprise the data fields depicted in FIG. 4, and previously described above (a 20-byte field that will include a 1-byte IBI standard Indicia Version number 441, a 2-byte Software ID 442, a 3-byte Postage Value 443, a 2-byte IBI Vendor number 444, a 2-byte Model ID 445, an 8-byte (12-digit) Indicia ID (serial) number 446 (see also, element 6, FIG. 1) that references the unique indicia generated by the secure vault, and a 2-byte field containing Encoder values 447).

It will be understood by someone with ordinary skill in the art that one reason for deriving a set of postage indicia for use on a customized postage label, from full, digitally-signed, generic Internet postage indicia, would be to provide customized postage label indicia that does not require as much visual space on the face of a customized postage label as does full, digitally-signed, generic Internet postage indicia.

As compared to the large number of fields described above for full, digitally-signed generic Internet postage indicia, the exemplary indicia for a customized postage label would contain, as described above with respect to FIG. 4, only 20 bytes of data. Further, in the exemplary alternative embodiment, the serial number, element 446 depicted in FIG. 4 (see also, element 6; FIG. 1) will be used as a key to the corresponding full, digitally-signed generic Internet postage indicia saved in database 401 (depicted in FIG. 14A). That is, there will be a mapping between the customized postage label indicia and the corresponding full, digitally-signed generic Internet postage indicia. In the exemplary embodiment a record of the mapping between the customized postage label indicia and the corresponding full, digitally-signed generic Internet postage indicia will be saved in a mapping database 351. In alternative embodiments, data fields other than, or in combination with, the serial number, could be used as a key. For example, in one alternative embodiment, the entire customized postage label postage indicia (encoded in machine readable form, depicted as element 7, FIG. 1) could be used as a key to the corresponding full, digitally-signed generic Internet postage indicia saved in database 401 (depicted in FIG. 14A).

Returning with reference to FIG. 14A, image generation server function 350 will then use the barcode module (element 1210, FIG. 2B) to prepare a machine-readable representation, e.g., a 2-D matrix barcode, of the derived postage indicia for the customized postage label; the image generation server function 350 will inject the derived postage indicia for the customized postage label (that corresponds to full, digitally-signed generic Internet postage indicia) in both human-readable form and in machine-readable form into the PDF-formatted representation of a sheet of customized postage labels, e.g., on order image database 90, that corresponds to the Order ID number common to both the customized postage label transaction and the PDF-formatted representation of a sheet of customized postage labels, e.g., on order image database 90; the derived postage indicia for the customized postage label (that corresponds to full, digitally-signed generic Internet postage indicia) will be injected into the corresponding PDF-formatted representation of a sheet of customized postage labels, e.g., on order image database 90, according to the mapping in corresponding customized postage label transaction 52 to the respective position in the corresponding PDF-formatted representation of a sheet of customized postage labels, e.g., on order image database 90.

In the exemplary embodiment, barcode module (element 1210, FIG. 2B) would be called to prepare a machine-readable representation, in a two-dimensional ("2-D") Data Matrix barcode format, of the postage indicia. Matrix codes are 2-D codes that code data based on the position of black spots within a matrix. Each black dot element is the same dimension; the position of each black dot element codes the data. A Data Matrix 2-D matrix code can store from 1 to 500 characters. The symbol is also scalable between a 1-mil square to a 14-inch square. The information in a Data Matrix code is represented by an absolute dot position rather than a relative dot position. The Data Matrix coding scheme has a high level of redundancy with the data "scattered" throughout the symbol. This scattering and redundancy allows the Data Matrix symbol to be read correctly even if part of it is missing. It will be understood by someone with ordinary skill in the art that the use in the exemplary embodiment of a Data Matrix code is illustrative and is not a limitation of the invention.

Continuing with image generation server function 350 depicted in FIG. 14A, once indicia for all twenty postage labels on a sheet have been injected, the completed representation of a sheet of customized postage labels 60 will be encrypted as further described below and saved for subsequent download and printing; as each generic Internet indicia transaction 402 is used, a generic Internet indicia use-confirmation 54 will be provided to the generic Internet postage server to confirm that the corresponding generic Internet indicia transaction 402 was used. In order to build each generic Internet indicia use-confirmation 54, image generation server function 350 will parse the indicia contained in the respective generic Internet indicia transaction 402 and will use the meter number and the Ascending Register information to construct the respective generic Internet indicia use-confirmation 54. Once all indicia have been injected in all postage labels for all sheets for an order, then with respect to the particular order, control of the image generation server will end/return 360.

It will be understood by someone with ordinary skill in the art that, in contrast to the above-described derivation from full, digitally-signed generic Internet postage indicia of postage indicia for use on a corresponding customized postage label, it would be possible to use the full, digitally-signed generic Internet postage indicia on the corresponding customized postage label. However, doing so would occupy, even with the employment of a 2-D barcode representation of the full, digitally-signed generic Internet postage indicia, more space on the face of the corresponding customized postage label.

With reference to FIG. 14A, in generic Internet postage server function 410, each generic Internet indicia use-confirmation 54 will be received; the unique serial number will be used to locate the record containing the full, digitally-signed generic Internet postage indicia that was provided on generic Internet indicia transaction 402 and saved on database 401.

It will be understood by someone with ordinary skill in the art that one or more than one record on a database, or on multiple databases, could be used to store information about a particular transaction. Description herein regarding a singular database or record will be understood by someone with ordinary skill in the art to be illustrative and non-limiting and to apply equally to multiple databases or records; description herein regarding multiple databases and/or records will be understood by someone with ordinary skill in the art to be illustrative and non-limiting and to apply equally to singular databases and/or records.

Once the record(s) for the corresponding full, digitally-signed generic Internet postage indicia that was provided on generic Internet indicia transaction 402 and saved on database 401 is found, it would be updated to reflect use of the indicia before proceeding to the end/return function 420.

It will be understood by someone with ordinary skill in the art that the above-described approach for generating full, digitally signed, generic Internet postage indicia and then printing on a customized postage label another, derivative, set of indicia, is an exemplary configuration of elements, functions and logic. Other alternative approaches are possible without departing from the spirit of the present invention. For example, in FIG. 2B, client interface 1209*a* is depicted as optionally separate from the image generation server 1202.

In one alternative exemplary embodiment, client interface 1209*a* would be installed on a server separate from the image generation server 1202 and would be used to execute many of the functions described above with respect to generic Internet postage server function 400 in the exemplary embodiment in producing generic Internet postage indicia. For example, optionally separate client interface 1209*a* would, for example, receive, or otherwise recognize, each respective request for a respective particular amount of postage; log into an account; deduct an amount for the requested amount of postage from the account; generate full, digitally signed, generic Internet postage indicia; and then pass the full, digitally signed, generic Internet postage indicia to the server that called it, e.g., the image generation server 1202.

In the exemplary alternative embodiment, the image generation server 1202 would then be responsible for protecting use of the full, digitally signed, generic Internet postage indicia to ensure that the money deducted for the requested postage amount is appropriately used. That is, the image generation server 1202 in the exemplary alternative embodiment could be used to save the full, digitally signed, generic Internet postage indicia to a database (e.g., element 401, FIG. 14A), and track its usage in customized postage labels, such as, e.g., by generating from the full, digitally signed, generic Internet postage indicia a set of customized postage label postage indicia and maintaining on the database (e.g., element 401, FIG. 14A) a mapping of the relationship between the customized postage label postage indicia and the corresponding full, digitally signed, generic Internet postage indicia; the unique serial number for each corresponding customized postage label could be used as a key to the corresponding full, digitally signed, generic Internet postage indicia.

In an exemplary batch embodiment of the present invention, customized postage could be printed using a batch processing system. The batch processing system would be implemented by using a "further modified client" running in batch mode. The further modified client would assemble each order as described above and would make a request to generate a list of postage indicia data by sending serial numbers, starting label number, total number of labels, and postage amount information to the generic Internet postage server. After receiving such a request, the generic Internet postage server would create a block of data (total number of labels times the current size of the generic postage indicia data) with generic postage indicia data for each label; the generic Internet postage server would send the block of generic postage indicia data back to the batch processing system.

Upon receiving the block of generic postage indicia data, the batch processing system would derive customized postage indicia data for each customized label in a manner similar to that previously described above, would create machine-readable customized postage indicia for each label using the previously-described barcode module (element 1210, FIG. 2B), would inject the machine-readable customized postage indicia for each label into the assembled order, and would send the customized postage order for printing. The batch processing system could also be operable to detect different types of orders, including orders for customized postage and generic Internet postage; for an order for generic Internet postage, the batch processing system would create a list of machine readable generic Internet postage indicia using the barcode module and send the list of generic Internet postage indicia for printing.

Figure 14B:
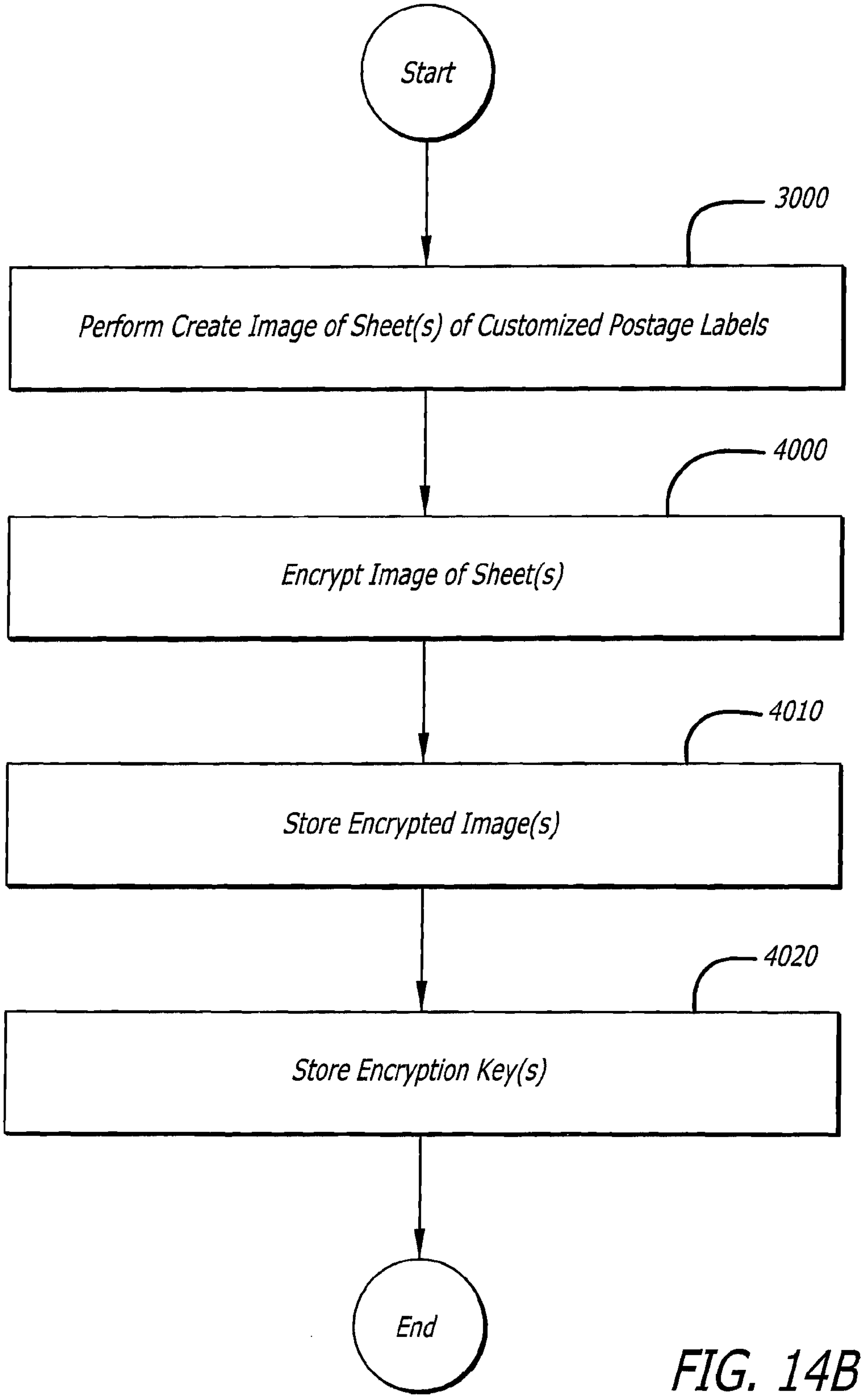
FIG. 14B depicts an overview of high-level logic functions for processing quality/assurance-approved orders in a further alternative exemplary embodiment of the present invention.
Figure 14C:
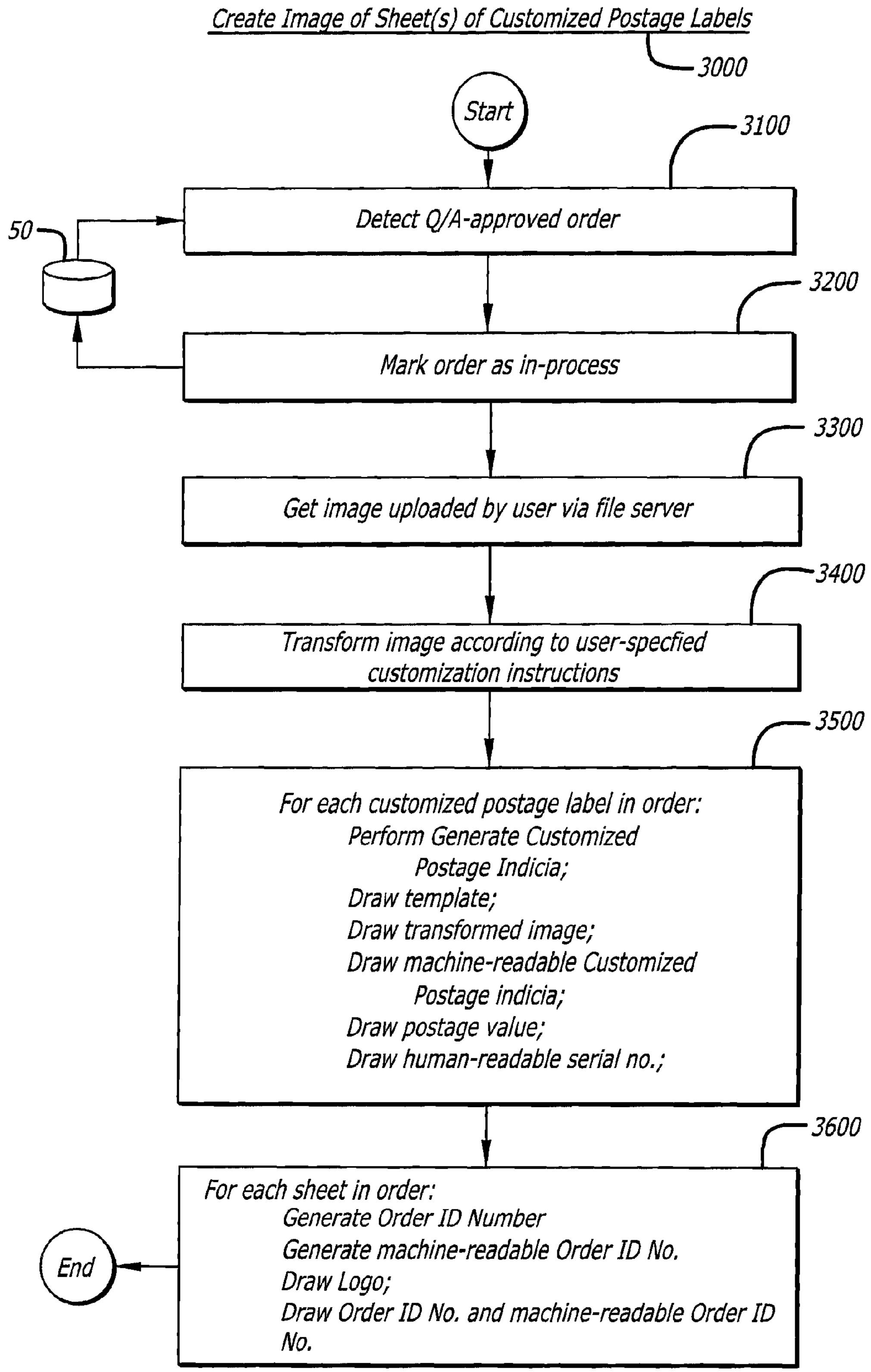
FIG. 14C is a high-level flow diagram depicting exemplary high-level logic functions for creating an image of customized postage labels in the further alternative exemplary embodiment of the present invention.
Figure 14D:
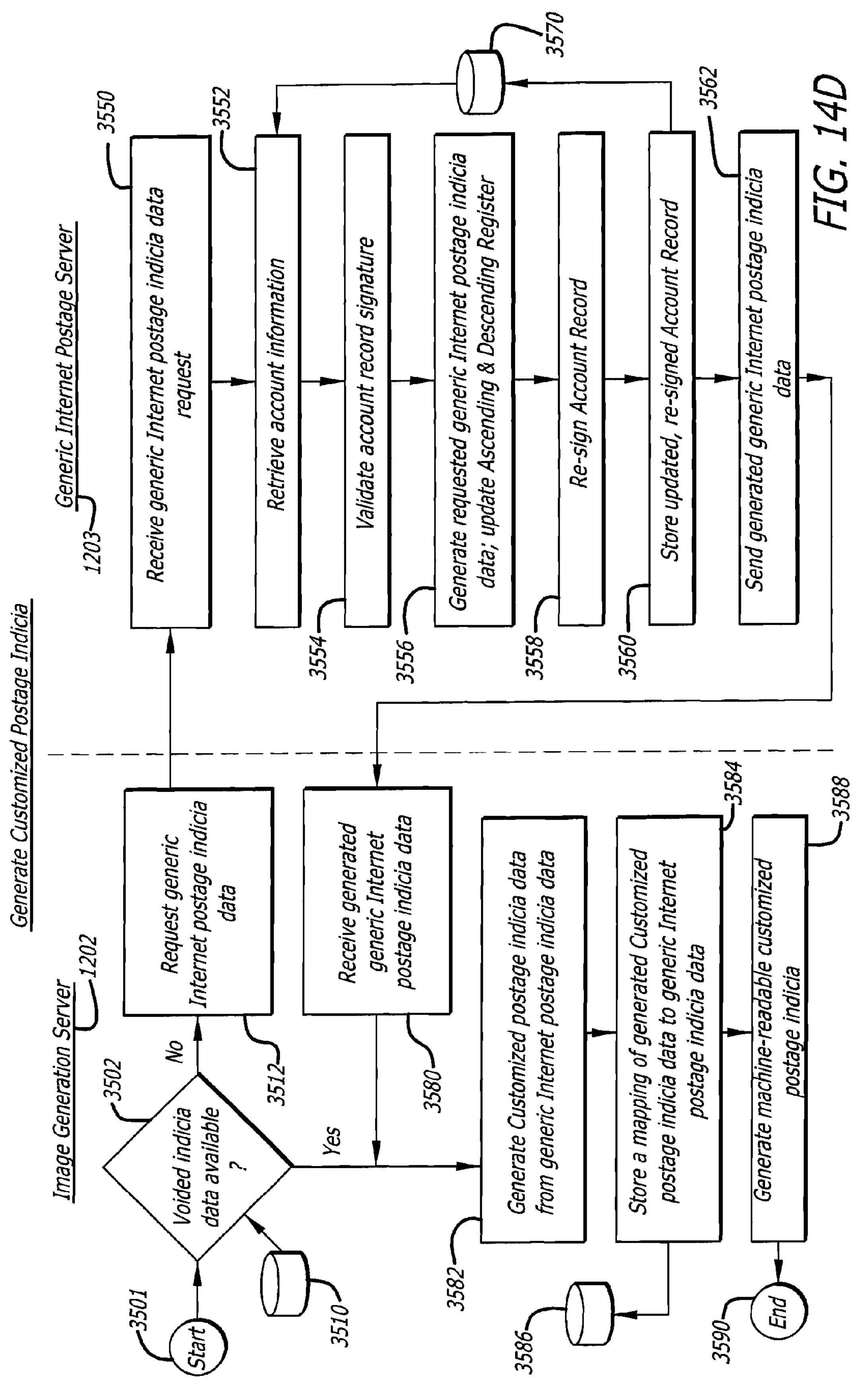
FIG. 14D is a high-level flow diagram depicting exemplary high-level logic functions for image of customized postage labels in the further alternative exemplary embodiment of the present invention.

FIGS. 14B through 14D are high-level flow diagrams depicting further alternative exemplary high-level logic functions for processing quality/assurance-approved orders in a further alternative exemplary embodiment of the present invention. More specifically, FIG. 14B depicts an overview of high-level logic functions for processing quality/assurance-approved orders in a further alternative exemplary embodiment of the present invention; FIG. 14C is a high-level flow diagram depicting exemplary high-level logic functions for creating an image of customized postage labels in the further alternative exemplary embodiment of the present invention; and FIG. 14D is a high-level flow diagram depicting exemplary high-level logic functions for image of customized postage labels in the further alternative exemplary embodiment of the present invention.

The further alternative exemplary high-level logic functions depicted in FIGS. 14B through 14D are an alternative detailed view of function 280 depicted in FIGS. 3A through 3C. Functions depicted in FIGS. 14B and 14C, and functions depicted on the left side of FIG. 14D (functions 3502, 3512, and 3580-3590) would be performed in the further alternative exemplary embodiment by software executing on the image generation server (element 1202, image generation server, depicted in FIG. 2B). Functions depicted on the right side of FIG. 14D (functions 3550-3562) would be performed in the further alternative exemplary embodiment by software executing on the generic Internet postage server (element 1203, generic Internet postage server, FIG. 2B).

As with the exemplary embodiment, with reference to FIG. 2B, although image generation server 1202 is described herein in the singular, in the further alternative exemplary embodiment, multiple image generations servers will be employed to operate virtually simultaneously.

As with the exemplary embodiment, in the further alternative exemplary embodiment, each image generation server 1202 will execute a "modified client" generic Internet postage software application.

As with the exemplary embodiment, in the further alternative exemplary embodiment, software executing on the exemplary image generation server would log in to a generic Internet Postage account once per session.

FIG. 14B depicts an overview of high-level logic functions for processing quality/assurance-approved orders in the further alternative exemplary embodiment of the present invention. As depicted in FIG. 14B, function 3000 will perform logic to create an image of sheet(s) of customized postage labels—the logic to do so is depicted in some detail in FIG. 14C.

As further depicted in FIG. 14B, function 4000 will encrypt the image of the sheet created as a result of function 3000; function 4010 will store the encrypted image(s); and function 4020 will store the encryption key(s).

As depicted in FIG. 14C, quality/assurance-passed orders on the order database 50 will be detected by software executing on the image generation server as depicted in function 3100; as such orders are detected, as previously mentioned above, a status in the entry for the order, in, e.g., order database 50, will be marked, as denoted in function 3200, to indicate that the order is in-process.

As depicted in FIG. 14C, function 3300 of the further alternative exemplary embodiment of the present invention will get the original image corresponding to a particular order as that image was uploaded by the corresponding user. Function 3300 will get the original image via the file server (element 1006, FIG. 2B). If an order includes multiple images, then each image will be retrieved.

In the further alternative exemplary embodiment, function 3400 would transform the original image according to the user-specified customization instructions (see, e.g., elements 110 and 220, FIG. 3A; see also FIG. 5). If an order includes multiple images, then each image will be transformed according to the user-specified customization instructions corresponding to each particular image relating to the particular order.

In the further alternative exemplary embodiment, for each customized postage label in the order being processed, function 3500 will perform logic functions to generate customized postage indicia (described in some detail below with respect to FIG. 14D); draw a template for the postage label; draw the transformed image (as resulted from function 3400); draw machine-readable customized postage indicia (as resulted from the final function 3588 depicted in FIG. 14D); draw the postage value (as ordered by the user); and draw a human-readable serial number.

In the further alternative exemplary embodiment, for each sheet in the order being processed, function 3600 will generate an Order ID Number (in a manner previously described above with respect to the exemplary embodiment); generate a machine-readable Order ID Number (also in a manner previously described above with respect to the exemplary embodiment); draw a logo (drawing a logo is an optional function; a logo would, e.g., be relevant to the Internet postage provider); and draw the Order ID Number and the machine-readable Order ID Number.

In such a way, the software executing on the further alternative exemplary image generation server would draw an image of a sheet of customized postage labels for each image (element 601, FIG. 8) ordered by the customer. In the further alternative exemplary embodiment, the further alternative exemplary image generation server function 3600 would draw a number of sheets of customized postage labels that correspond to the user's specification of quantity (see element 605, FIG. 8) for the corresponding image (element 601, FIG. 8).

As with the exemplary embodiment, in the further alternative exemplary embodiment, customized postage label features associated with an order are represented in PDF format. Therefore, in the further alternative exemplary embodiment, the drawing in further alternative exemplary image server function 3600 by the image generation server (element 1202, depicted in FIG. 2B) involves drawing multiple PDF-represented features for a particular postage label. For example, each customized postage label would be represented by a PDF-representation of the customized border image; a PDF-representation of the customized image uploaded by the user; a customized image of a postage amount; and the like. In the further alternative exemplary embodiment, the image generation server (element 1202, depicted in FIG. 2B) will draw a PDF-formatted representation of each image for which a customized postage label has been ordered in function 3500, and will assemble/draw in function 3600 an image of a sheet of postage labels for each sheet indicated in the order (according to the user's specification of quantity (see element 605, FIG. 8) for the corresponding image (element 601, FIG. 8)).

As in the exemplary embodiment, in the further alternative exemplary embodiment, communications 1205 (FIG. 2B) between the image generation server 1202 (FIG. 2B) and the generic Internet postage server 1203 (FIG. 2B) will be according to HTTPS protocol.

Further, as in the exemplary embodiment, in the further alternative exemplary embodiment, a respective general AR and a respective general DR will be associated with, and available to, each of the respective "modified clients" resident and executing on the respective image generation server(s) 1202.

As was previously mentioned above, the logic functions depicted in FIG. 14D will be performed (see function 3500 in FIG. 14C) for each customized postage label in an order. As depicted in FIG. 14D, after the start 3501, voided postage indicia, such as voided postage indicia records on a database, e.g., 3510, or stored in a memory or in another computer-readable storage medium, will be checked in function 3502 to determine whether or not any voided indicia data is available for use on the order being processed. If no voided indicia data is available, then function 3512 (the modified client, element 1209 in FIG. 2B) will request generic Internet postage indicia data. If on the other hand, voided indicia data is available, then function 3582 will execute, as will be described further below.

If no voided indicia data is available and a request has been made (by the modified client, element 1209 in FIG. 2B) in function 3512 for generic Internet postage indicia data, then in generic Internet postage server function 3550, the request will be received, or will otherwise be detected (by the generic Internet postage server, element 1203, FIG. 2B). In the further alternative exemplary embodiment, generic Internet postage server functions 3550 through 3562 would be traditional generic Internet postage server functions as described in the Generic VBI Invention; such functions will be performed by software executing on the generic Internet postage server (element 1203, FIG. 2B).

Function 3552 will retrieve account information from a PSD (Postal Security Device) database 3570; account information will include the current Ascending Register and Descending Register amounts. Database 3570 will contain PSD (Postal Security Device) records. Account information is information contained within PSD records. Function 3554 will validate that the retrieved account record is signed. Function 3556 will generate full, digitally-signed, generic Internet postage indicia data in response to the request and will update the Ascending Register and Descending Register according to the amount of postage indicated in the request. Function 3558 will re-sign the account record information. Function 3560 will store the updated, re-signed account record in the PSD database 3570. Function 3562 will send, return, or otherwise make available, the generated full, digitally-signed, generic Internet postage indicia data, to the image generation server (element 1202, FIG. 2B); image generation server function 3580 will receive, detect, or otherwise recognize the generated, full, digitally-signed, generic Internet postage indicia data.

Whether full, digitally-signed, generic Internet postage indicia data had to be newly generated by the generic Internet postage server (element 1203, FIG. 2B) as depicted in FIG. 14D in functions 3550 through 3562, or whether voided generic Internet postage indicia data is available for use, the particular full, digitally-signed generic Internet postage indicia data will be used in function 3582 to generate customized postage indicia data.

As with the exemplary embodiment, customized postage indicia data in the further alternative exemplary embodiment is derived from full, digitally-signed generic Internet postage indicia data and will comprise the data fields depicted in FIG. 4, and previously described above (a 20-byte field that will include a 1-byte IBI standard Indicia Version number 441, a 2-byte. Software ID 442, a 3-byte Postage Value 443, a 2-byte IBI Vendor number 444, a 2-byte Model ID 445, an 8-byte (12-digit) Indicia ID (serial) number 446 (see also, element 6, FIG. 1) that references the unique indicia generated by the secure vault, and a 2-byte field containing Encoder values 447).

In the further alternative exemplary embodiment, function 3584 will store in database 3586 a mapping of the generated customized postage indicia data to the full, digitally-signed generic Internet postage indicia data.

Continuing with reference to FIG. 14D, image generation server function 3588 will then, using the barcode module (element 1210, FIG. 2B), prepare a machine-readable representation, e.g., a 2-D matrix barcode, of the derived customized postage indicia for the customized postage label; after the end 3590, control will return to function 3500 depicted in FIG. 14C.

Returning with reference to FIGS. 3A through 3C, the images of sheets of customized postage 60 that would be created in function 280 and saved/stored (as depicted in e.g., function 350 in FIG. 14A, or in function 4010 in FIG. 14B) in encrypted form will be periodically downloaded as depicted in function 285. In the exemplary embodiment, the download (depicted in FIG. 2B as element 1303 as protected under HTTPS) will take place at the printer's location. The RSA private key to facilitate the download will be encrypted as follows:

1.) A pass phrase will be chosen at key-generation time.

2.) This pass phrase will be input into the .NET PasswordDeriveBytes class along with eight bytes of salt generated by the RNGCryptoServiceProvider class. (A "salt" can be used in password-protected cryptography; a salt can be viewed as an index into a large set of keys derived from a password; a salt value may comprise random data that is sometimes included as part of a session key—when added to a session key, the plain text salt data is placed in front of the encrypted key data; salt values are added to increase the work required to mount a brute-force (dictionary) attack against data encrypted with a symmetric-key cipher). The result will be 256-bytes that will be used as the AES key in step 4.) below.

3.) A RSACryptoServiceProvider class instance will be created and a random key will be generated.

4.) The random RSA key will be encrypted using AES-CBC with a random IV and the derived AES key.

5.) An XML file (the "private key file") will be created containing:

a.) The salt used in PasswordDeriveBytes (base64 encoded)

b.) The symmetric key size in bits.

c.) The AES IV (base64 encoded)

d.) The AES-encrypted RSA key (base64 encoded)

6.) Another XML file (the "public key file") will be created using the RSACryptoServiceProvider.ToXmlString( )method.

7.) The public key will be installed on the web server to use during PDF generation.

It will be understood by someone with ordinary skill in the art that an AES key is an example of a symmetric key.

In the exemplary embodiment, there will be no signature on the file. Source authentication will be handled by the SSL connection during the download.

The exemplary embodiment will provide a download utility with which to download the images of sheets of customized postage 60 (FIGS. 3A through 3C); the download utility will provide a download utility user interface. The exemplary download utility will be a .NET Windows Forms control hosted in Internet Explorer.

Download personnel (the "download user") will access the download utility user interface to request that the download utility load the RSA private key file (the exemplary creation of which was previously described above).

Once the RSA private key file is loaded, the download utility would decrypt the RSA private key using the salt and IV stored in the file. The download user would be prompted by the download utility user interface for the pass phrase. The download user would enter the pass phrase. The download utility would then provide the pass phrase, along with the salt, to a module named "PasswordDeriveBytes". The PasswordDeriveBytes module would generate the number of bytes specified in the file. The download utility would then use the number of bytes as the AES key to decrypt the RSA key.

In the exemplary embodiment, the private key file would not be copied to the local hard drive during the download process.

In the exemplary embodiment, the download would occur over an SSL connection using either a client certificate or username/password pair to authenticate the download client. Depending on the network setup at the printer, the exemplary embodiment may also restrict the IP address of the download client.

In the exemplary embodiment, a server certificate issued by the Internet Postage provider would be used on the server. In the exemplary embodiment, the download application would only trust a certificate issued by the Internet Postage provider. Use of an Internet-Postage-provider-issued certificate would mitigate any DNS-spoofing/phony certificate issues while attached to the printer's network. Ensuring physical custody of the download client device being strictly maintained by a trusted party, such as an employee of the Internet Postage provider, would serve to enhance the chances of successfully mitigating DNS-spoofing/phony certificate issues using the Internet-Postage-provider-issued-certificate approach. Properly firewalling and patching the download client device would similarly serve to enhance the chances of successfully mitigating DNS-spoofing/phony certificate issues using the Internet-Postage-provider-issued-certificate approach. That is, ensuring that the download client machine is in trusted hands and is uncompromised enhances security for downloading, delivering and printing the customized postage labels.

In the exemplary embodiment, printing, post-print quality assurance inspection/review, invoicing, and fulfillment would be accomplished in a single facility by personnel of the Internet Postage provider and/or by third-party personnel supervised by personnel of the Internet Postage provider. As will be understood by someone with ordinary skill in the art, alternative embodiments of the present invention would provide for printing by third-party personnel; configurable indicators would be monitored after-the-fact by Internet Postage provider personnel.

With reference to FIG. 2B, the generic Internet postage server 1203 will communicate, via, e.g., communication means 1206, to the Account Server 1008, each postage amount corresponding to each respective, generic Internet postage indicia data generated and the corresponding customer information associated with the each respective, generic Internet postage indicia data generated.

With reference to FIG. 2B, the exemplary embodiment will provide a Print Delivery Application 1302. In the exemplary embodiment, a dedicated computer, such as, for example, a laptop, would host the Print Delivery Application 1302. The Print Delivery Application 1302 will provide the download utility user interface previously described above with which post-print QA users would download encrypted PDF files of exemplary customized postage sheets from a queue 1303 over an HTTPS connection. In the exemplary embodiment, security within this download utility user interface will require Windows authentication paired with a pass code to the private key. The download utility user interface will act as a conduit to accept files from queue 1303 or optionally allow a user to specify files in a comma-delimited manner. The user will be able to control the location to which these files will be saved. In the exemplary embodiment, end-of-day procedures will include deletion of all working PDF files on the laptop and on the printer.

In the exemplary embodiment, a log procedure will be provided for printing customized postage label orders. In the exemplary log procedure, the printing device will be operated by a printer, who will be third-party personnel (an employee/representative of a company other than the Internet Postage provider); a printing supervisor will be an employee of the Internet Postage provider.

The first step of the exemplary log procedure will be for the printing supervisor to input, at the beginning of every print session, a start print counter number into an exemplary postage print log book. The start print counter number would be a number, a type of "odometer" reading, from the printing device. In the exemplary log procedure, the printing supervisor, an employee of the Internet Postage provider, and the third-party printer, will both sign the start print counter number indicated for the particular print session in the exemplary postage print log book.

In the exemplary embodiment, the printing supervisor, or another employee of the Internet Postage provider, will serve as the download user.

Once the start print counter number for the print session has been signed in by both the printing supervisor and the third-party printer, the download user will start the secure download of files across the internet over SSL at this point using the download utility user interface to initiate the download utility. Once the files have been downloaded onto the download client device (e.g., a laptop), the download client device will be disconnected from the Internet.

Once the download client device has been disconnected from the Internet and local network, the download user will use the download utility user interface to instruct the download utility to decrypt the downloaded PDF file.

In the exemplary embodiment, download client device will then be directly connected to the printing device, which in the exemplary embodiment will be an HP Indigo printer and the printing device will be taken off line from the local network.

The downloaded customized postage PDF file will be loaded onto the printing device by the printing supervisor, or by the download user, or by some other employee of the Internet Postage provider. The third-party printer will place the downloaded PDF file into the printer queue 1305 for printing, as the printing supervisor monitors the printing. At the end of the print session, all PDF files will be removed from the printer. The printing supervisor will then record an end print counter number; both the printing supervisor and the third-party printer will then sign off on the end print counter number entered in the postage print log book.

At the end of the print and fulfillment session (after all prints and reprints are done) the final print counter value will be recorded in the exemplary postage print log book and signed off by the printing supervisor and the third-party printer. All PDF files from the laptop will be removed at the end of the print and fulfillment session (after post-print quality assurance inspection and review (described further below) and after all prints and reprints).

In the exemplary embodiment, reconciliation would then be undertaken. The number of prints (the difference between the start print counter value and the end print counter value) should be equal to the number of pages in the PDF file plus any misprinted pages. Any misprints or spoils will be voided. Misprinted sheets and rejected orders will be forwarded/returned to personnel within the Internet Postage provider organization for manual handling to resolve misprint problems. A copy of the daily exemplary postage print log book will be handed into to personnel within the Internet Postage provider organization for manual handling to resolve misprint problems, along with any misprints. In the exemplary embodiment, the exemplary postage print log book will remain in the possession of the printing supervisor.

With reference to FIGS. 3A through 3C, in the exemplary embodiment, as depicted in function 285, sheets of customized postage labels 65 will be produced.

With reference to FIG. 2B, the Print Delivery Application 1303 and Printer 1304 would perform the function 285 depicted in FIGS. 3A through 3C.

Figure 15:
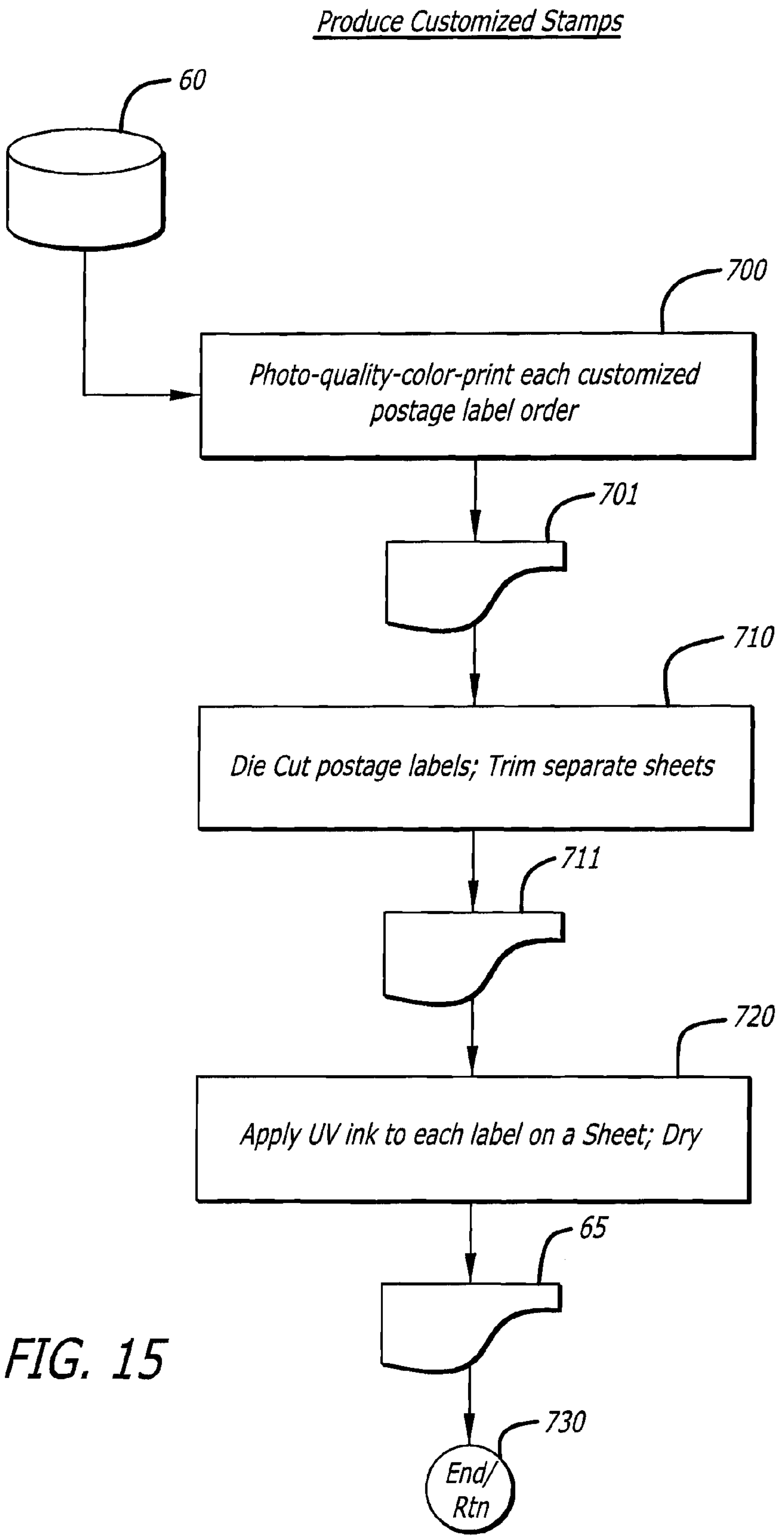
FIG. 15 is a high-level flow diagram depicting exemplary high-level logic functions for producing customized postage labels in an exemplary embodiment of the present invention.

FIG. 15 is a high-level flow diagram depicting exemplary high-level logic functions for producing customized postage labels in an exemplary embodiment of the present invention. As depicted in FIG. 15, for each image of a sheet of customized postage 60, a photo-quality color print 701 will be printed. In the exemplary embodiment, in function 700 printing will be performed on an HP Indigo 3000 or HP indigo press 3050, a six-color, direct digital printing press that utilizes liquid inks, not toner. Label stock media in the exemplary embodiment will be ULTRABAK PLUS for HP Indigo Digital Presses, 60# White Semi-Gloss. In an alternative embodiment, 80# sapphire coated, semi-gloss with permanent high strength adhesive backing could be used. Label stock will be either 12 inches by 18 inches, or 11 inches by 17 inches. That is, the label stock will accommodate two sheets of postage labels. Therefore, in the exemplary embodiment, the printer (an HP Indigo 3000 or HP indigo press 3050) will print two sheets of postage labels at the same time. Depending on the circumstances, one sheet of postage labels printed on a particular sheet of label stock would be associated with a first order; the second sheet of postage labels printed on the same particular sheet of label stock may be associated with the same order or with a second order. It would also be possible at the end of a job to print a single sheet of postage labels on a sheet of label stock leaving the second available sheet of postage labels blank.

Figure 17:
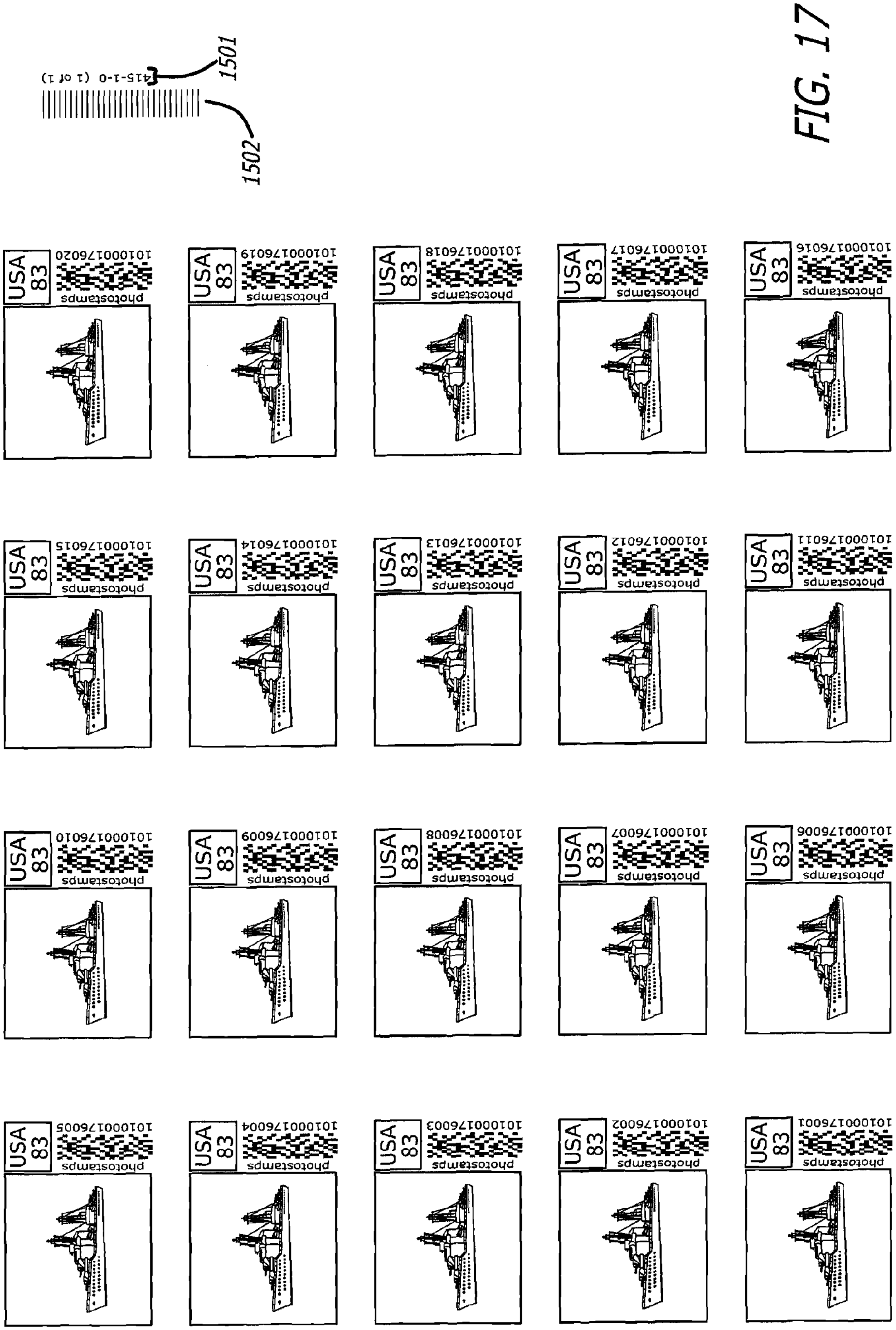
FIG. 17 depicts an exemplary sheet of customized postage labels in the exemplary embodiment of the present invention.

The respective Order ID number will be printed in both human-readable text and will be barcoded on each sheet of labels. FIG. 17 is a graphic representation of a printed sheet of customized postage labels bearing a human-readable Order ID number 1501 and a machine-readable Order ID number 1502.

Continuing with reference to FIG. 15, in function 710, printed postage labels 701 will be die-cut into individual peelable postage labels and large label stock will be trimmed to comprise 8.5 inch by 11 inch postage label sheets 711. In function 720, the 8.5 inch by 11 inch postage label sheets 711 will be processed to apply UV ink to each label on a sheet and then dried to comprise the completed printed order of customized postage labels 65, ending 730 the process for producing a particular order. Fluorescent ink tagging will be applied that will be invisible under normal (or ambient) light. In the exemplary embodiment, the ink used will be red fluorescent and will have a fluorescence frequency of 600-620 nm; the ink will have an excitation frequency under a short-UV (230-245 nm) light source. The fluorescent tagging in the exemplary embodiment will be a programmable characteristic as to the density, location and pattern of fluorescent ink applied.

In the exemplary embodiment, fluorescent ink will be applied in a pre-determined pattern on each computer-based postage label on a sheet of a plurality of computer-based postage labels. Each computer-based postage label comprises a perimeter (element 83, FIG. 1). In the exemplary embodiment, the application of fluorescent ink in the pre-determined pattern will be characterized by a pre-determined position relative to a particular location on the perimeter of each computer-based postage label. In the exemplary embodiment, the pre-determined pattern would be characterized by a pre-determined application density of fluorescent ink. In the exemplary embodiment, the pre-determined pattern would comprise a message. More specifically, in the exemplary embodiment, the pre-determined pattern would comprise an identifier, such as a serial number, that uniquely identifies the respective postage label on which it is applied. In the exemplary embodiment, a visible representation of the unique identifier (element 8, FIG. 1) would be provided on the respective stamp; the visible representation would be visible under normal (ambient) light.

It will be understood by someone with ordinary skill in the art that many features of fluorescent ink application can be programmed, including, in addition to the general characteristics mentioned above, the luminescence (amount of reflectance). That is, in a particular pattern, the ink applicator could be programmed so that fluorescent ink applied in a first location in the particular pattern could be applied with a first magnitude of luminescence that would be visible in a first range of light frequency; fluorescent ink applied in a second location in the same particular pattern could be applied with a second magnitude of luminescence that would be visible in a second range of light frequency; the first range of light frequency would not overlap the second range of light frequency. By varying luminescence in the above-described manner, only the portion of the pattern applied with the first magnitude of luminescence would be visible when subjected to illumination of a frequency within the first range; only the portion of the pattern applied with the second magnitude of luminescence would be visible when subjected to illumination of a frequency within the second range.

In the exemplary embodiment, a programmable computer-based ink applicator, such as, for example, a HEWLETT-PACKAGE® Inkjet printer, would be used and would be programmed to apply fluorescent ink in a pre-determined pattern, in a pre-determined position relative to a particular location of the perimeter of each customized computer-based postage label, according to a pre-determined density and/or luminescence of ink application.

Figure 22:
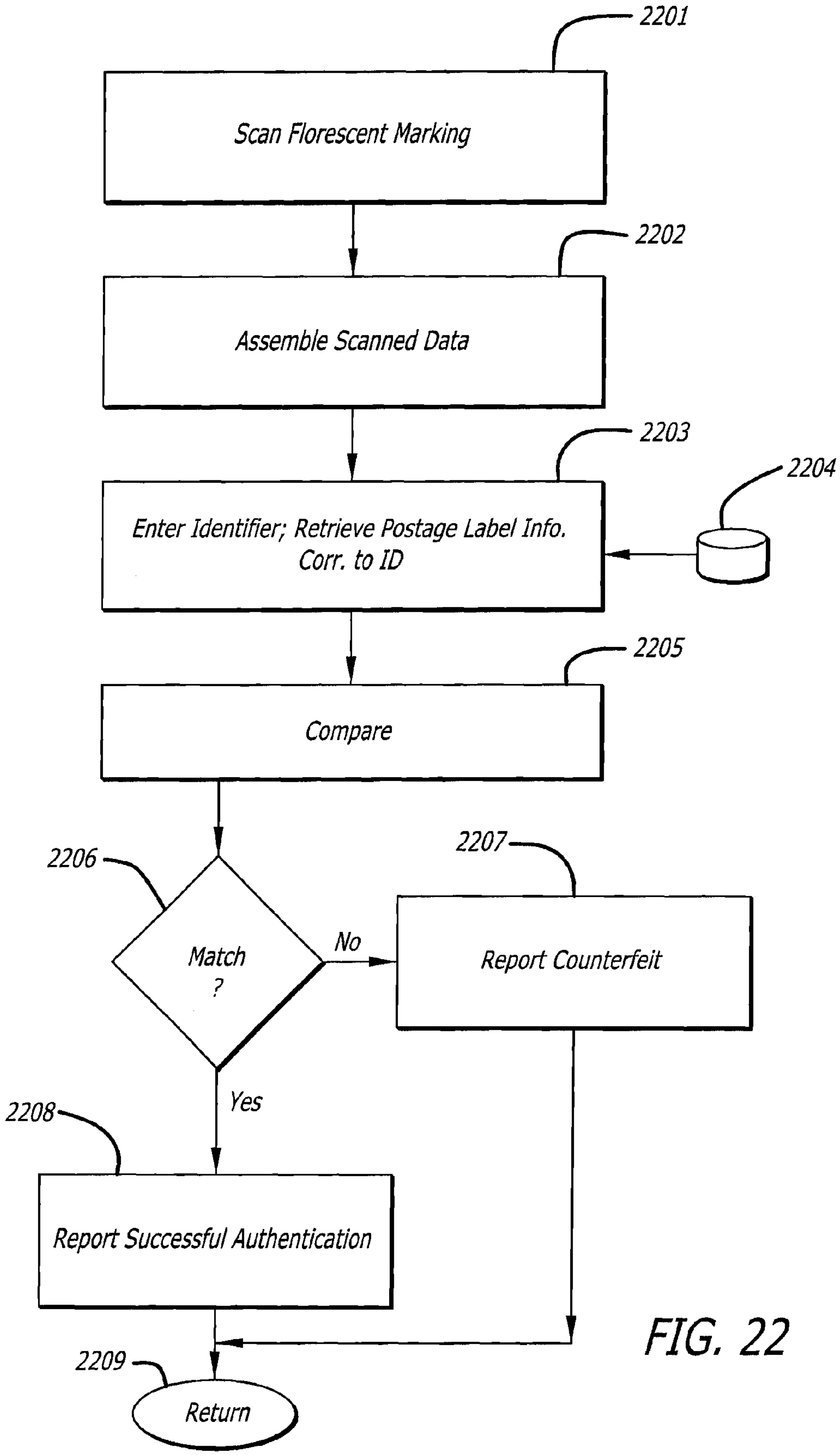
FIG. 22 is a high-level flow diagram depicting high-level logic functions of an exemplary value-bearing item authentication process in the exemplary embodiment of the present invention.

In the exemplary embodiment, the programmable computer-based fluorescent ink applicator would be programmed to apply fluorescent ink in a distinct manner for each postage label; the manner in which fluorescent ink would be applied to a particular postage label would be recorded in a database in association with a identifier, such as the serial number, of the particular postage label. The manner in which fluorescent ink was applied to a particular postage label would be available for authentication of a particular postage label. For example, the programmable computer-based fluorescent ink applicator would be programmed to apply fluorescent ink in a particular manner for a postage label with a particular serial number. The particular manner could comprise a particular pattern, a particular density, and/or a particular position relative to a particular location on the perimeter of the particular postage label, or other value-bearing item A particular postage label, or other value-bearing item, to which fluorescent ink had been applied and for which the manner of application had been recorded, could later be tested for authentication. FIG. 22 is a high-level flow diagram depicting high-level logic functions of an exemplary value-bearing item authentication process in the exemplary embodiment of the present invention. In the exemplary authentication process, a particular value-bearing item could be scanned for fluorescent marking as depicted in element 2201. The scanned data for the particular value-bearing item would then be assembled, as depicted in element 2202. At some point during the authentication process, an identifier for the particular value-bearing item would be entered, as depicted in element 2203. An identifier such as a serial number (as was described above with respect to the customized postage labels), could be manually entered based on human-readable characters on the value-bearing item, or could be scanned in from a scannable barcode visible on the particular value-bearing item. Alternatively, value-bearing item indicia in machine-readable form could be scanned in.

As depicted in FIG. 22, the identification data would be used to retrieve 2203 from a database 2204 on which fluorescent ink application data is recorded, information for the value-bearing item corresponding to the identification data. In the exemplary embodiment, information retrieved from database 2204 would comprise, among other things, information regarding fluorescent ink application for the particular value-bearing item corresponding to the identification data.

As depicted in element 2205 of FIG. 22, the data regarding fluorescent ink application for the particular value-bearing item retrieved from database 2204 would be compared to the assembled scanned data. If, in test element 2206, the assembled scanned data matched the retrieved data, the value-bearing item would be reported as successfully authenticated in element 2208 before returning 2209. Otherwise, if in test element 2206, the assembled scanned data did not match the retrieved data, or if there was not retrieved data, the value-bearing item would be reported as counterfeit in element 2207 before returning 2209.

Returning with reference to FIGS. 3A through 3C, the completed printed order of customized postage labels 65 will then be examined in function 286 by post-print quality assurance administration reviewer. In function 287, the post-print quality assurance administration reviewer will determine whether or not the printed sheets of customized postage labels 65 pass post-print quality assurance inspection.

With reference to FIG. 2B, printed sheets of postage labels will be reviewed by a post-print quality assurance inspector using a post-print quality assurance inspection interface 1120, who will either reject the order 1122 or will accept the order 1123.

In the exemplary embodiment, Printed Content will be reviewed for two reasons: a) to ensure that only acceptable content shall be used for USPS-approved mail and b) to ensure that the product is a high-quality print-job. In addition to rejecting content that falls in either the Critical or Intermediate categories of material content previously described above with respect to pre-print quality assurance, post-print quality assurance will also review printed customized postage labels to ensure that the print job is of high quality. An unacceptable print job in the exemplary embodiment will include:

1. Material that carries smearing, stains, blots, or smudges;
2. Material that has faulty adhesiveness;
3. Material that is off-centered, skewed, or slanted;
4. Material that carries no color or faulty coloring; and/or
5. Material that is badly cropped.

Material that is rejected because of unacceptable print quality will be reprinted at not cost to the user; the unacceptable print quality material will be destroyed.

Figure 16:
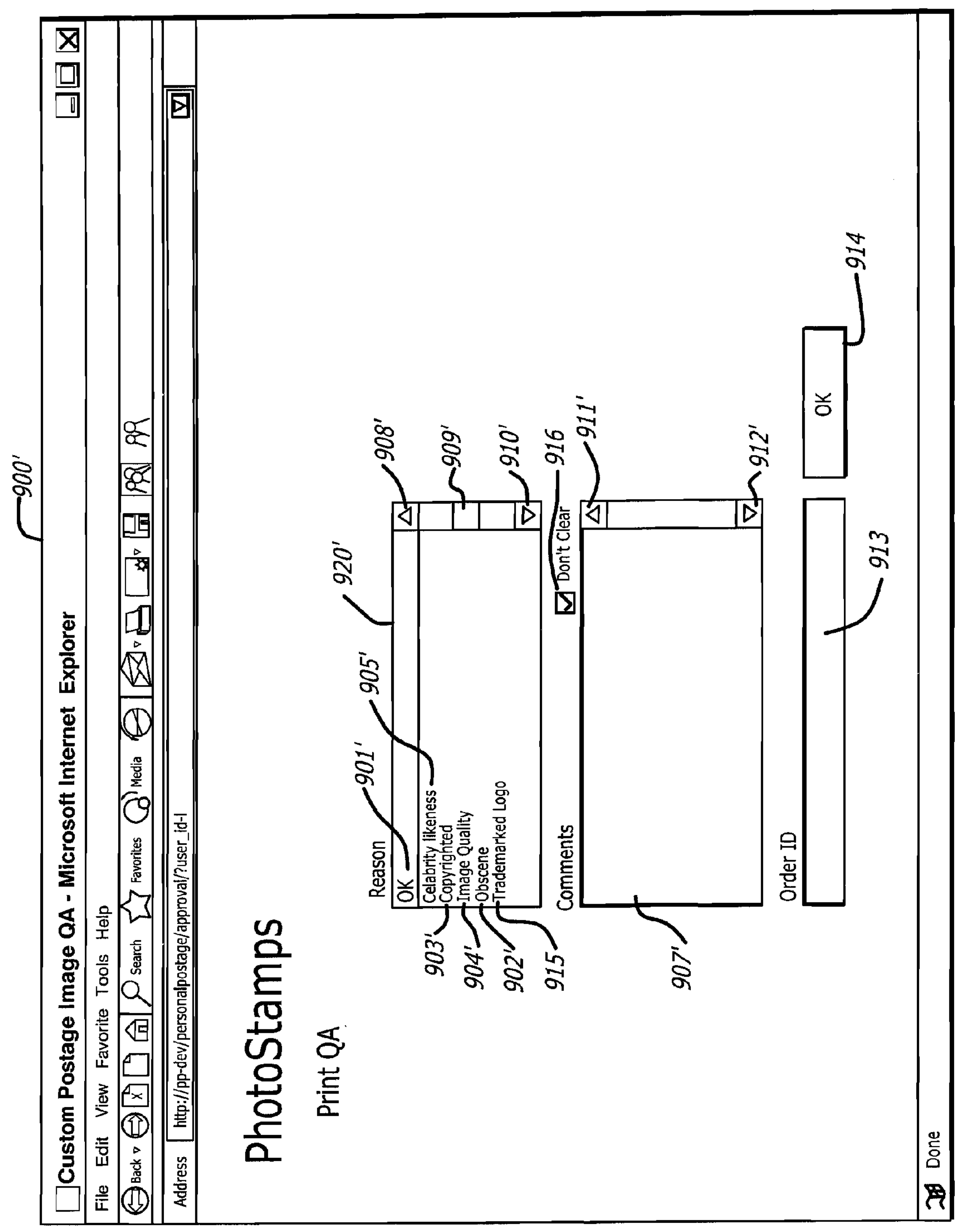
FIG. 16 is a graphic representation depicting a screen shot of an exemplary post-print image quality assurance review screen in the exemplary embodiment of the present invention.

The exemplary embodiment will provide a post-print quality assurance computer interface to facilitate post-print quality assurance inspection and review. FIG. 16 is a graphic representation depicting a screen shot of an exemplary post-print image quality assurance review screen 900' in the exemplary embodiment of the present invention. There are many similarities between the exemplary post-print image quality assurance review screen 900' and the exemplary pre-print image quality assurance review screen 900 previously described above with respect to FIG. 13. Accordingly, some of the elements described below with respect to the exemplary post-print image quality assurance review screen 900' are depicted with element numbers with a prime mark (') to reflect the similarity to the parallel elements in the exemplary pre-print image quality assurance review screen 900 previously described above with respect to FIG. 13.

In the exemplary embodiment, a post-print quality assurance inspector/reviewer will visually inspect each sheet of labels. The post-print quality assurance inspector/reviewer will use a bar-code scanner connected to a computer to scan the barcode that has been printed onto each respective sheet of printed customized postage labels. Once the barcode is scanned, the post-print quality assurance computer interface would cause the Order identifier scanned from the barcode to be displayed in the Order ID field 913 in the exemplary post-print image quality assurance review screen 900'. If no scanner is available, a post-print quality assurance inspector/reviewer could manually enter each order identifier; the manually entered Order identifier would be displayed in the Order ID field 913 in the exemplary post-print image quality assurance review screen 900'.

The post-print quality assurance inspector/reviewer would then review the printed images corresponding to the scanned/entered Order identifier and would highlight one of the review reasons in the Reason window 920'. If the post-print quality assurance inspector/reviewer approved the image, the inspector/reviewer would highlight "OK" (element 901', FIG. 16) as the reason; the disposition for the corresponding scanned/entered Order identifier would be designated as approved and stored in a temporary table until the table is "committed" (processed). If the post-print quality assurance inspector/reviewer rejected the image, the inspector/reviewer would highlight one of the other reasons in the Reason window 920', such as, for example Celebrity Likeness 905', Copyrighted 903', Image Quality 904', Obscene 902', or Trademarked Logo 915.

The post-print quality assurance reasons, e.g., 901' through 905', and 915, are illustrative and non-limiting; additional quality assurance reasons could be listed; a post-print quality assurance inspector/reviewer would scroll through additional reasons using a window up key 908', down key 910', or tab 909'.

If the inspector/reviewer highlighted any reason (e.g., any of elements 902' through 905', or 915, as depicted in FIG. 16) other than "OK" (element 901', FIG. 16), the sheet of labels corresponding to the scanned/entered Order identifier would be designated as rejected.

The post-print quality assurance inspector/reviewer would be able to input comments in the comment field 907', and would be able to scroll through the comments using a comment window up key 911' or down key 912'. The post-print quality assurance inspector/reviewer could check the Don't Clear field 916 to preserve the comments entered in the comment field 907'.

Once the post-print quality assurance inspector/reviewer was satisfied with their assessment of the printed images corresponding to the scanned/entered Order identifier displayed in Order ID field 913, the post-print quality assurance inspector/reviewer would click on the OK button 914.

In the exemplary embodiment, rescanning an Order identifier barcode for an image that has not yet been "committed" would allow a new reason code to be designated for the image.

In the exemplary embodiment, any order containing at least one rejected image (one image corresponds in the exemplary embodiment to one Order identifier) would be cancelled and the customer would not be charged; all printed sheets in the order would be returned to a central administrative entity within the Internet Postage provider organization (sometimes referred to herein as "Commerce") to be reconciled; a physical count of the sheets must equal the corresponding count of sheets recorded in the database. Commerce would physically secure the printed sheets pending USPS inspection, after which the sheets would be shredded.

The exemplary embodiment would provide a Postage Database. This exemplary Postage Database would be a cache of the following: generic Internet Postage Master Serial Number; generic Internet Postage minor serial number extension; Indicium Bits. Any postage refunded or otherwise not used will be re-assigned into the Postage Database; the Postage Database would be updated to return the amount of postage charged.

In the exemplary embodiment, in both pre-print and post-print Quality Assurance inspection and review, a QA Supervisor shall arbitrarily review image assessments made by non-supervisory QA users (non-supervisory QA inspectors/reviewers). A QA Supervisor shall also monitor queue length and date of oldest files as will be recorded and reported by the exemplary embodiment. In the exemplary embodiment, the Quality Assurance inspection interface (the Inspector Admin Tool) will provide configurable indicators; the exemplary embodiment will report information related to the configurable indicators to show items or general status of quality assurance processing that falls out of acceptable service levels.

Returning with reference to FIGS. 3A through 3C, if the customized postage labels 65 do not pass post-print quality assurance inspection (elements 286, 287), the print problem/rejected labels/order 67, will need to be resolved in error-handling function 288. For example, the image of the rejected labels/order 67 corresponding to the respective customized postage label on the image file 60 could be re-initiated for further processing.

With reference to FIGS. 3A through 3C, if the customized postage labels 65 pass post-print quality assurance inspection (elements 286, 287), resulting in post-print-Q/A-passed customized postage labels 66, the order corresponding to the post-print-Q/A-passed customized postage labels 66 and the corresponding post-print-Q/A-passed customized postage labels 66 will be packaged and shipped in function 290. In function 290 (FIGS. 3A through 3C), the post-print-Q/A-passed customized postage labels 66 will be shipped to the respective user, or to a recipient designated by the respective user.

With reference to FIG. 2B, once all Order ID numbers in an order have successfully passed post-print quality assurance inspection/review, the printed order would be packaged 1402 and shipped 1403 and a shipping notification 1406 would be provided to the Account Server 1008, which would facilitate generation of an invoice and generation of an email 1010 to the user that the order has been shipped.

In the exemplary embodiment, in the event that a completed order is shipped and later discovered to have contained an image that violates QA standards, records in the system (depending on the embodiment, e.g., in database 351, FIG. 14A; or in database 3586, FIG. 14D) related to the image-customized computer-based postage-indicia-bearing items will be marked to designate that the image-customized computer-based postage-indicia-bearing items have been voided, and an email message will be sent to the ordering user and the receiving user; the email message will notify the ordering user and the receiving user that the printed order contains an impermissible image and that the image-customized computer-based postage-indicia-bearing items are void; and an adjustment to the ordering user's bill will be made to refund the amount of postage (but not the amount for shipping).

With reference to FIGS. 3A through 3C, the order corresponding to the passed customized postage labels 66 will be invoiced in function 295 to a credit card designated by the ordering user; also in function 295, files/databases will be updated to reflect completion of the order. An invoice would contain the following:

Branding
Sold to information
Shipping information
Barcode and human readable order number
Addressed adhesive label that shall be affixed to the appropriate envelope; this adhesive label would contain shipping name and address and aforementioned barcode.
Identifier of QA reviewer
Order Number
Order Date
Payment Method
Shipment Date
Method of Shipment
Overview of order line items, including:
  Iconic representation of image printed
  Textual description
  Unit (Sheet) Price
  Quantity of Sheets Ordered per SKU
  Extended Price
Sub Total
Shipping Cost (e.g., Flat-rate $2.99)
Tax ($0.00)
Invoice Total Price Once respective orders have been fulfilled, the postage label customization process is complete, as depicted in the “end” function 298.

With reference to FIG. 2B, payment from a user/credit card company enters the exemplary embodiment system through a payment gateway 1015 which provides payment information, via a communications means 1014, e.g., an HTTPS communications means, to a payment processor server 1011. The payment processor server 1011 serves payment information to the account server 1008, via a communications means 1012, e.g., an HTTPS communications means; account server 1008 would update account information with payment information.

Other features of the invention are implicit in the above-provided description and/or are depicted and/or implicit in the accompanying Figures.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A computer system for securing computer-based value-bearing items, said computer system programmed to:
- encrypt each computer-based value-bearing item, wherein each computer-based value-bearing item comprises a computer-based postage-indicia-bearing item that comprises at least one image uploaded to the computer system according to a respective user-provided instruction;
- save each encrypted computer-based value-bearing item to a computer-readable medium;
- generate a symmetric key and a private key;
- encrypt the symmetric key; and
- save the encrypted symmetric key to the computer-readable medium.

2. The computer system of claim 1, said computer system further programmed to generate the symmetric key using a random generator.

3. The computer system of claim 1, said computer system further programmed to:
- generate a public key;
- using the public key, encrypt a file decryption key for decrypting the encrypted computer-based value-bearing item; and
- save the encrypted file decryption key on the computer-readable medium.

4. The computer system of claim 3, said computer system further programmed to:
- using the private key, decrypt the encrypted the decryption key; and
- decrypt the encrypted computer-based value-bearing item using the decrypted file decryption key.

5. A computer-implemented method for securing computer-based value-bearing items, said method comprising at least one computer device programmed to:
- encrypt a computer-based value-bearing item, wherein the computer-based value-bearing item comprises a computer-based postage-indicia-bearing item that comprises at least one image uploaded to the computer system according to a respective user-provided instruction;
- save the encrypted computer-based value-bearing item to a computer-readable medium;
- generate a symmetric key and a private key;
- encrypt the symmetric key; and
- save the encrypted symmetric key to the computer-readable medium.

6. The method of claim 5, said at least one computer further programmed to:
- generate the symmetric key using a random generator.

7. The method of claim 5, said at least one computer further programmed to:
- generate a public key;
- using the public key, encrypt a file decryption key for decrypting the encrypted computer-based value-bearing item; and
- save the encrypted file decryption key on the computer-readable medium.

8. The method of claim 7, said at least one computer further programmed to:
- using the private key, decrypt the encrypted file decryption key; and
- decrypt the encrypted computer-based value-bearing item using the decrypted file decryption key.

* * * * *